United States Patent
Fleming et al.

(10) Patent No.: US 11,346,938 B2
(45) Date of Patent: May 31, 2022

(54) SAFETY DEVICE FOR PROVIDING OUTPUT TO AN INDIVIDUAL ASSOCIATED WITH A HAZARDOUS ENVIRONMENT

(71) Applicant: MSA Technology, LLC, Cranberry Township, PA (US)

(72) Inventors: Clinton Sean Fleming, Cranberry Township, PA (US); Jason Paul Eaton, Hunker, PA (US); Alec Cantor, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 207 days.

(21) Appl. No.: 16/818,124

(22) Filed: Mar. 13, 2020

(65) Prior Publication Data
US 2020/0292694 A1    Sep. 17, 2020

Related U.S. Application Data

(60) Provisional application No. 62/818,831, filed on Mar. 15, 2019.

(51) Int. Cl.
*G01S 13/89* (2006.01)
*H01Q 21/20* (2006.01)
(Continued)

(52) U.S. Cl.
CPC ........... *G01S 13/89* (2013.01); *H01Q 3/2605* (2013.01); *H01Q 21/205* (2013.01); *H04B 10/1123* (2013.01)

(58) Field of Classification Search
CPC .... G01S 13/89; H01Q 3/2605; H01Q 21/205; H01Q 10/1123
(Continued)

(56) References Cited

U.S. PATENT DOCUMENTS 6,504,794 B2   1/2003   Haase et al.
6,815,636 B2   11/2004  Chung et al.
(Continued)

FOREIGN PATENT DOCUMENTS

AU   2013101173 A4   9/2013
AU   2015278274 B2   12/2015
(Continued)

OTHER PUBLICATIONS

Chun et al., "Focusing in thermal imagery using morphological gradient operator", Pattern Recognition Letters, 2014, pp. 20-25, vol. 38.
(Continued)

*Primary Examiner* — Bo Fan
(74) *Attorney, Agent, or Firm* — Jones Day

(57) ABSTRACT

Provided are computer-implemented methods that include receiving one or more messages from a device in a transmit state, including: a first message received at a first power level, the first message including data associated with a power level at which the first message was transmitted by the device in the transmit state, and a second message received at a second power level, the second message including data associated with a power level at which the second message was transmitted by the device in the transmit state; and determining a heading toward the device in the transmit state based on the first message and the second message. In some non-limiting embodiments or aspects, the method may include outputting data associated with an indication of the heading toward the device in the transmit state. Systems and computer program products are also provided.

20 Claims, 35 Drawing Sheets

(51) Int. Cl.
*H04B 10/112* (2013.01)
*H01Q 3/26* (2006.01)

(58) Field of Classification Search
USPC ........................................................ 342/179
See application file for complete search history.

(56) References Cited

U.S. PATENT DOCUMENTS

| | | | |
|---|---|---|---|
| 7,151,454 B2 | 12/2006 | Washington | |
| 7,157,705 B2 | 1/2007 | Hamrelius et al. | |
| 7,224,319 B2 | 5/2007 | Kubba et al. | |
| 7,245,216 B2 | 7/2007 | Burkley et al. | |
| 7,263,379 B1 | 8/2007 | Parkulo et al. | |
| 7,307,793 B2 | 12/2007 | Ottney et al. | |
| 7,369,174 B2 | 5/2008 | Olita et al. | |
| 7,377,835 B2 | 5/2008 | Parkulo et al. | |
| 7,403,112 B2 | 7/2008 | Kampel et al. | |
| 7,426,231 B1 | 9/2008 | Dorfman | |
| 7,429,959 B2 | 9/2008 | Gerder et al. | |
| 7,448,140 B2 | 11/2008 | Nash | |
| 7,463,145 B2 | 12/2008 | Jentoft | |
| 7,491,935 B2 | 2/2009 | Burne et al. | |
| 7,492,262 B2 | 2/2009 | Washington | |
| 7,508,343 B1 | 3/2009 | Maloratsky et al. | |
| 7,513,964 B2 | 4/2009 | Ritter et al. | |
| 7,539,533 B2 | 5/2009 | Tran | |
| 7,567,200 B1 | 7/2009 | Osterweil | |
| 7,589,689 B2 | 9/2009 | Welch et al. | |
| 7,598,856 B1 | 10/2009 | Nick et al. | |
| 7,652,571 B2 | 1/2010 | Parkulo et al. | |
| 7,699,521 B2 | 4/2010 | Shepard | |
| 7,724,134 B2 | 5/2010 | Icove et al. | |
| 7,733,224 B2 | 6/2010 | Tran | |
| 7,795,569 B2 | 9/2010 | Manning | |
| 7,855,638 B2 | 12/2010 | Huston | |
| 7,864,432 B2 | 1/2011 | Ottney | |
| 7,884,717 B2 | 2/2011 | Icove et al. | |
| 7,916,066 B1 | 3/2011 | Osterweil | |
| 8,004,564 B1 | 8/2011 | Hughes | |
| 8,013,734 B2 | 9/2011 | Saigh et al. | |
| 8,013,739 B2 | 9/2011 | Parkulo et al. | |
| 8,068,051 B1 | 11/2011 | Osterweil | |
| 8,097,857 B2 | 1/2012 | Cochran et al. | |
| 8,114,021 B2 | 2/2012 | Robertson et al. | |
| 8,149,109 B2 | 4/2012 | Lontka | |
| 8,164,440 B2 | 4/2012 | Lontka | |
| 8,190,357 B2 | 5/2012 | Abhyanker et al. | |
| 8,208,026 B2 | 6/2012 | Hogasten et al. | |
| 8,212,211 B2 | 7/2012 | Drews et al. | |
| 8,212,671 B2 | 7/2012 | Icove et al. | |
| 8,233,043 B2 | 7/2012 | Washington | |
| 8,248,263 B2 | 8/2012 | Shervey et al. | |
| 8,253,559 B2 | 8/2012 | Howard et al. | |
| 8,289,372 B2 | 10/2012 | Hamrelius et al. | |
| 8,344,823 B2 | 1/2013 | Bloy et al. | |
| 8,344,858 B2 | 1/2013 | Bloy | |
| 8,421,631 B2 | 4/2013 | Bloy et al. | |
| 8,469,455 B2 | 6/2013 | Hackelboerger et al. | |
| 8,494,481 B1 | 7/2013 | Bacco et al. | |
| 8,520,072 B1 | 8/2013 | Slavin et al. | |
| 8,558,748 B2 | 10/2013 | Chen et al. | |
| 8,599,016 B2 | 12/2013 | Parkulo et al. | |
| 8,644,792 B2 | 2/2014 | Lontka | |
| 8,659,430 B2 | 2/2014 | Bloy et al. | |
| 8,688,375 B2 | 4/2014 | Funk et al. | |
| 8,698,575 B2 | 4/2014 | Bloy et al. | |
| 8,698,634 B2 | 4/2014 | Guedes Lopes Da Fonseca et al. | |
| 8,705,702 B1 | 4/2014 | Sieg | |
| 8,706,414 B2 | 4/2014 | Funk et al. | |
| 8,742,896 B2 | 6/2014 | Eloy | |
| 8,755,839 B2 | 6/2014 | Parkulo et al. | |
| 8,786,189 B2 | 7/2014 | Mayfield et al. | |
| 8,811,907 B2 | 8/2014 | Hosoya et al. | |
| 8,896,427 B1 | 11/2014 | Ramirez | |
| 8,919,979 B2 | 12/2014 | Mabry et al. | |
| 8,947,528 B2 | 2/2015 | Hinman et al. | |
| 9,024,748 B2 | 5/2015 | Haase et al. | |
| 9,025,735 B2 | 5/2015 | Sieg | |
| 9,047,745 B2 | 6/2015 | Terre et al. | |
| 9,116,230 B2 | 8/2015 | Vartanian et al. | |
| 9,135,808 B2 | 9/2015 | Johnson et al. | |
| 9,148,579 B1 | 9/2015 | Schwartz | |
| 9,191,583 B2 | 11/2015 | Hamrelius et al. | |
| 9,194,937 B2 | 11/2015 | Bahl et al. | |
| 9,204,062 B2 | 12/2015 | Bergstrom et al. | |
| 9,232,142 B2 | 1/2016 | McManus et al. | |
| 9,241,151 B2 | 1/2016 | Joo | |
| 9,251,595 B2 | 2/2016 | Bailey et al. | |
| 9,251,695 B2 | 2/2016 | McNutt et al. | |
| 9,270,319 B2 | 2/2016 | Bietz et al. | |
| 9,280,812 B2 | 3/2016 | Strandemar | |
| 9,291,695 B2 | 3/2016 | Oakley et al. | |
| 9,370,302 B2 | 6/2016 | Krueger | |
| 9,383,426 B2 | 7/2016 | Mohamadi | |
| 9,398,856 B2 | 7/2016 | Abreu | |
| 9,460,596 B1 | 10/2016 | Moses | |
| 9,462,210 B2 | 10/2016 | Dagit, III | |
| 9,466,199 B2 | 10/2016 | McNabb et al. | |
| 9,498,013 B2 | 11/2016 | Handshaw et al. | |
| 9,515,378 B2 | 12/2016 | Prasad | |
| 9,549,290 B2 | 1/2017 | Smith | |
| 9,578,159 B2 | 2/2017 | Muthukumar | |
| 9,589,448 B1 | 3/2017 | Schneider et al. | |
| 9,612,341 B2 | 4/2017 | Large et al. | |
| 9,613,410 B2 | 4/2017 | Strandemar | |
| 9,615,006 B2 | 4/2017 | Terre et al. | |
| 9,618,613 B2 | 4/2017 | Murakami et al. | |
| 9,631,806 B2 | 4/2017 | Mabry et al. | |
| 9,652,851 B2 | 5/2017 | Artan et al. | |
| 9,656,842 B2 | 5/2017 | Sullivan | |
| 9,683,856 B2 | 6/2017 | Iyer et al. | |
| 9,684,963 B2 | 6/2017 | Grant et al. | |
| 9,689,955 B2 | 6/2017 | Rosenbaum | |
| 9,699,431 B2 | 7/2017 | Lamb et al. | |
| 9,727,954 B2 | 8/2017 | Engberg et al. | |
| 9,746,941 B2 | 8/2017 | Raffa et al. | |
| 9,747,802 B2 | 8/2017 | Fisher et al. | |
| 9,763,071 B2 | 9/2017 | Balram et al. | |
| 9,769,420 B1 | 9/2017 | Moses | |
| 9,773,174 B2 | 9/2017 | Huang et al. | |
| 9,781,348 B1 | 10/2017 | Bart et al. | |
| 9,788,714 B2 | 10/2017 | Krueger | |
| 9,792,788 B2 | 10/2017 | Joseph et al. | |
| 9,807,319 B2 | 10/2017 | Teich et al. | |
| 9,848,312 B2 | 12/2017 | Sundel et al. | |
| 9,854,227 B2 | 12/2017 | Grossman et al. | |
| 9,860,459 B2 | 1/2018 | Barbee et al. | |
| 9,865,176 B2 | 1/2018 | Tran | |
| 9,940,525 B2 | 4/2018 | Wolf | |
| 9,948,872 B2 | 4/2018 | Frank et al. | |
| 9,977,117 B2 | 5/2018 | Parker et al. | |
| 9,984,447 B2 | 5/2018 | Strandemar | |
| 9,990,730 B2 | 6/2018 | Bergstrom et al. | |
| 9,998,687 B2 | 6/2018 | Lavoie | |
| 10,026,302 B1 | 7/2018 | Bacco et al. | |
| 10,032,348 B2 | 7/2018 | Wedig et al. | |
| 10,039,445 B1 | 8/2018 | Torch | |
| 10,070,074 B2 | 9/2018 | Boulanger et al. | |
| 10,083,591 B2 | 9/2018 | Carr et al. | |
| 10,089,787 B2 | 10/2018 | Roth | |
| 10,092,232 B2 | 10/2018 | Tzvieli et al. | |
| 10,094,855 B1 | 10/2018 | Fuhr et al. | |
| 10,116,884 B2 | 10/2018 | Beall et al. | |
| 10,116,885 B2 | 10/2018 | Beall | |
| 10,129,490 B2 | 11/2018 | Beall | |
| 10,139,282 B2 | 11/2018 | Chrostowski | |
| 10,147,195 B2 | 12/2018 | Schulte | |
| 10,147,295 B2 | 12/2018 | Chung et al. | |
| 10,152,811 B2 | 12/2018 | Johnson et al. | |
| 10,153,204 B2 | 12/2018 | McKenzie et al. | |
| 10,156,631 B2 | 12/2018 | Parker et al. | |
| 10,169,666 B2 | 1/2019 | Boulanger | |
| 10,186,020 B2 | 1/2019 | Engberg et al. | |
| 10,192,420 B2 | 1/2019 | Boss et al. | |

(56) References Cited

U.S. PATENT DOCUMENTS

| | | |
|---|---|---|
| 10,212,399 B2 | 2/2019 | Kim et al. |
| 10,225,492 B1 | 3/2019 | Steffanson et al. |
| 10,230,426 B1 | 3/2019 | Henry et al. |
| 10,230,907 B2 | 3/2019 | Wang |
| 10,230,908 B2 | 3/2019 | Wang |
| 10,230,912 B2 | 3/2019 | Williams et al. |
| 10,250,822 B2 | 4/2019 | Terre et al. |
| 10,281,570 B2 | 5/2019 | Parker et al. |
| 10,284,559 B2 | 5/2019 | Salyers et al. |
| 10,292,573 B2 | 5/2019 | Stigall et al. |
| 10,328,292 B2 | 6/2019 | Kanakala et al. |
| 10,341,212 B2 | 7/2019 | Carr et al. |
| 10,353,061 B2 | 7/2019 | Tanaka et al. |
| 10,366,258 B2 | 7/2019 | DeBates et al. |
| 10,366,496 B2 | 7/2019 | Bergstrom et al. |
| 10,388,049 B2 | 8/2019 | Songa et al. |
| 10,401,478 B2 | 9/2019 | Pais et al. |
| 10,410,064 B2 | 9/2019 | Newman |
| 10,411,505 B2 | 9/2019 | Shao et al. |
| 10,417,497 B1 | 9/2019 | Cossman et al. |
| 10,465,495 B2 | 11/2019 | Chavez Rico et al. |
| 10,471,054 B2 | 11/2019 | Zhang et al. |
| 10,476,550 B2 | 11/2019 | Henry et al. |
| 10,482,756 B2 | 11/2019 | Kumar et al. |
| 10,516,999 B1 | 12/2019 | Desai |
| 10,536,528 B2 | 1/2020 | Parkulo et al. |
| 10,540,882 B2 | 1/2020 | Stenneth |
| 10,586,437 B1 | 3/2020 | Slavin et al. |
| 10,628,714 B2 | 4/2020 | Pradeep et al. |
| 10,728,468 B2 | 7/2020 | McManus et al. |
| 10,748,318 B2 | 8/2020 | Santos et al. |
| 10,788,671 B2 | 9/2020 | Patil et al. |
| 10,810,862 B2 | 10/2020 | Hodge |
| 10,816,328 B2 | 10/2020 | Jiang et al. |
| 10,824,921 B2 | 11/2020 | Bathiche et al. |
| 10,830,894 B2 | 11/2020 | Karadeniz et al. |
| 10,887,486 B2 | 1/2021 | Wexler et al. |
| 10,896,492 B2 | 1/2021 | Long, II et al. |
| 10,909,835 B1 | 2/2021 | Singh et al. |
| 10,914,569 B2 | 2/2021 | Zweigle et al. |
| 10,916,120 B2 | 2/2021 | Hodge |
| 2006/0022801 A1* | 2/2006 | Husak .............. G06K 17/0029 340/10.5 |
| 2015/0153175 A1 | 6/2015 | Skaaksrud |
| 2016/0050264 A1 | 2/2016 | Breed et al. |
| 2016/0113517 A1 | 4/2016 | Lee et al. |
| 2016/0203694 A1 | 7/2016 | Hogasten et al. |
| 2016/0214534 A1 | 7/2016 | Richards et al. |
| 2016/0266246 A1 | 9/2016 | Hjelmstad |
| 2016/0316154 A1 | 10/2016 | Elmfors et al. |
| 2016/0360970 A1 | 12/2016 | Tzvieli et al. |
| 2017/0085718 A1 | 3/2017 | Sieg |
| 2017/0094042 A1 | 3/2017 | Dagit, III |
| 2017/0108892 A1 | 4/2017 | Lenzi |
| 2017/0126940 A1 | 5/2017 | Yount et al. |
| 2017/0208262 A1 | 7/2017 | Sheridan et al. |
| 2017/0270775 A1 | 9/2017 | Haase et al. |
| 2017/0311125 A1 | 10/2017 | Hedley et al. |
| 2017/0328995 A1 | 11/2017 | Marschalkowski et al. |
| 2017/0352236 A1 | 12/2017 | Moses |
| 2018/0008141 A1 | 1/2018 | Krueger |
| 2018/0032744 A1 | 2/2018 | Cavanaugh |
| 2018/0046878 A1 | 2/2018 | Wang et al. |
| 2018/0059014 A1 | 3/2018 | Ruback et al. |
| 2018/0062785 A1 | 3/2018 | Hodge |
| 2018/0062786 A1 | 3/2018 | Hodge |
| 2018/0067204 A1 | 3/2018 | Frizzell |
| 2018/0069438 A1 | 3/2018 | Bit-Babik et al. |
| 2018/0107289 A1 | 4/2018 | Raffa et al. |
| 2018/0109740 A1 | 4/2018 | Pickett et al. |
| 2018/0189957 A1 | 7/2018 | Sanchez Bermudez et al. |
| 2018/0232581 A1 | 8/2018 | Reinpoldt et al. |
| 2018/0268237 A1 | 9/2018 | Stanimirovic et al. |
| 2018/0288339 A1 | 10/2018 | Wadelius |
| 2018/0357380 A1 | 12/2018 | Wang et al. |
| 2019/0005336 A1 | 1/2019 | Schulte |
| 2019/0033594 A1 | 1/2019 | Patil et al. |
| 2019/0039448 A1 | 2/2019 | Komer et al. |
| 2019/0082113 A1 | 3/2019 | Yu |
| 2019/0084678 A1 | 3/2019 | Heck |
| 2019/0130535 A1 | 5/2019 | Williams et al. |
| 2019/0130621 A1 | 5/2019 | Johnson et al. |
| 2019/0148813 A1 | 5/2019 | Bruchiel |
| 2019/0164005 A1 | 5/2019 | Huang et al. |
| 2019/0172329 A1 | 6/2019 | Shi |
| 2019/0182438 A1 | 6/2019 | Kleiner et al. |
| 2019/0187019 A1 | 6/2019 | Ekeroth |
| 2019/0197874 A1 | 6/2019 | Scheer |
| 2019/0206042 A1 | 7/2019 | Janssens et al. |
| 2019/0208395 A1 | 7/2019 | Chau et al. |
| 2019/0300001 A1 | 10/2019 | Watanabe |
| 2019/0323895 A1 | 10/2019 | Kostopoulos et al. |
| 2019/0324134 A1 | 10/2019 | Cattle |
| 2019/0340472 A1 | 11/2019 | Liu et al. |
| 2020/0025911 A1 | 1/2020 | Rappaport |
| 2020/0028277 A1 | 1/2020 | Watson |
| 2020/0074839 A1 | 3/2020 | Trigg |
| 2020/0077892 A1 | 3/2020 | Tran |
| 2020/0103286 A1 | 4/2020 | Ikeda et al. |
| 2020/0116814 A1 | 4/2020 | Hui et al. |
| 2020/0134992 A1 | 4/2020 | Wedig et al. |
| 2020/0260228 A1 | 8/2020 | Arunachalam et al. |
| 2020/0273277 A1 | 8/2020 | Kerning et al. |
| 2020/0320855 A1 | 10/2020 | Huseth et al. |
| 2020/0355488 A1 | 11/2020 | Zweigle et al. |
| 2020/0376307 A1 | 12/2020 | Misra et al. |
| 2020/0387644 A1 | 12/2020 | Santos et al. |
| 2020/0393680 A1 | 12/2020 | Hogstedt et al. |
| 2020/0394894 A1 | 12/2020 | Siminoff et al. |
| 2021/0010869 A1 | 1/2021 | Nguyen et al. |
| 2021/0027600 A1 | 1/2021 | Daniel et al. |
| 2021/0029506 A1 | 1/2021 | Howard et al. |
| 2021/0035423 A1 | 2/2021 | Renkis |
| 2021/0041299 A1 | 2/2021 | Solheim |
| 2021/0043065 A1 | 2/2021 | Wright et al. |
| 2021/0044928 A1 | 2/2021 | Pal et al. |

FOREIGN PATENT DOCUMENTS

| | | |
|---|---|---|
| CA | 2501035 C | 4/2009 |
| CA | 2886220 C | 4/2014 |
| CA | 2906623 A1 | 9/2014 |
| CA | 2951418 A1 | 12/2015 |
| CA | 2965247 A1 | 11/2017 |
| CA | 2886220 C | 7/2019 |
| CN | 101673448 B | 3/2012 |
| CN | 102061935 B | 9/2012 |
| CN | 103091249 A | 5/2013 |
| CN | 102607715 B | 6/2013 |
| CN | 101821785 B | 8/2013 |
| CN | 204015220 U | 12/2014 |
| CN | 101945224 B | 3/2015 |
| CN | 104408706 A | 3/2015 |
| CN | 101997175 B | 4/2015 |
| CN | 102598533 B | 6/2015 |
| CN | 104935808 A | 9/2015 |
| CN | 205004319 U | 1/2016 |
| CN | 102461156 B | 3/2016 |
| CN | 105447838 A | 3/2016 |
| CN | 103063314 B | 5/2016 |
| CN | 103105234 B | 5/2016 |
| CN | 104103146 B | 8/2016 |
| CN | 103493112 B | 9/2016 |
| CN | 103507712 B | 11/2016 |
| CN | 103583037 B | 4/2017 |
| CN | 106693261 A | 5/2017 |
| CN | 107103623 A | 8/2017 |
| CN | 107251364 A | 10/2017 |
| CN | 107256542 A | 10/2017 |
| CN | 104899866 B | 3/2018 |
| CN | 107833182 A | 3/2018 |
| CN | 108088565 A | 5/2018 |
| CN | 108109129 A | 6/2018 |
| CN | 108376391 A | 8/2018 |

(56) References Cited

FOREIGN PATENT DOCUMENTS

| | | |
|---|---|---|
| CN | 108605102 A | 9/2018 |
| CN | 104715595 B | 10/2018 |
| CN | 108763811 A | 11/2018 |
| CN | 108853832 A | 11/2018 |
| CN | 108932721 A | 12/2018 |
| CN | 109045531 A | 12/2018 |
| CN | 109276832 A | 1/2019 |
| CN | 106251344 B | 2/2019 |
| CN | 105957030 B | 3/2019 |
| CN | 109419497 A | 3/2019 |
| CN | 109565557 A | 4/2019 |
| CN | 109642846 A | 4/2019 |
| CN | 106548467 B | 5/2019 |
| CN | 109792508 A | 5/2019 |
| CN | 109922282 A | 6/2019 |
| CN | 106488073 B | 7/2019 |
| CN | 110008831 A | 7/2019 |
| CN | 110047241 A | 7/2019 |
| CN | 105678310 B | 8/2019 |
| CN | 209253994 U | 8/2019 |
| CN | 209270687 U | 8/2019 |
| CN | 110443099 A | 11/2019 |
| DE | 102004027314 B4 | 3/2006 |
| DE | 102004036878 A1 | 3/2006 |
| DE | 102004017769 B4 | 1/2008 |
| DE | 102008004785 B4 | 6/2012 |
| DE | 102011106810 A1 | 1/2013 |
| DE | 102013019488 A1 | 10/2014 |
| DE | 102017011533 A1 | 6/2019 |
| DE | 102017222756 A1 | 6/2019 |
| DE | 112017004427 T5 | 6/2019 |
| EP | 1577679 B1 | 5/2007 |
| EP | 1466718 B1 | 6/2011 |
| EP | 1779180 B1 | 10/2011 |
| EP | 2204671 B1 | 4/2012 |
| EP | 2645349 A1 | 10/2013 |
| EP | 2099095 B1 | 11/2013 |
| EP | 2803963 A1 | 11/2014 |
| EP | 2866052 A1 | 4/2015 |
| EP | 1910786 B1 | 5/2015 |
| EP | 2015549 B1 | 8/2015 |
| EP | 2921995 A1 | 9/2015 |
| EP | 3064899 A1 | 9/2016 |
| EP | 3136339 A1 | 3/2017 |
| EP | 2973459 B1 | 5/2017 |
| EP | 3182390 A1 | 6/2017 |
| EP | 3208743 A1 | 8/2017 |
| EP | 2271073 B1 | 3/2018 |
| EP | 1470703 B1 | 7/2018 |
| EP | 2188868 B1 | 7/2018 |
| EP | 3343507 A1 | 7/2018 |
| EP | 3244647 B1 | 12/2018 |
| EP | 3434334 A1 | 1/2019 |
| EP | 2188791 B1 | 3/2019 |
| EP | 3471050 A1 | 4/2019 |
| EP | 3495835 A1 | 6/2019 |
| EP | 3499269 A1 | 6/2019 |
| EP | 2590138 B1 | 9/2019 |
| EP | 3534326 A1 | 9/2019 |
| EP | 2829056 B1 | 10/2019 |
| FR | 2918801 B1 | 2/2016 |
| GB | 2456610 A | 7/2009 |
| GB | 2570777 A | 8/2019 |
| GB | 2573229 A | 10/2019 |
| JP | 4146385 B2 | 9/2008 |
| JP | 201646771 A | 4/2016 |
| JP | 201648282 A | 4/2016 |
| JP | 6058898 B2 | 1/2017 |
| JP | 6101287 B2 | 3/2017 |
| JP | 6101288 B2 | 3/2017 |
| JP | 6272634 B2 | 1/2018 |
| JP | 6430447 B2 | 11/2018 |
| JP | 20194415 A | 1/2019 |
| WO | 2012115878 A1 | 8/2012 |
| WO | 2012115881 A1 | 8/2012 |
| WO | 2014145030 A2 | 9/2014 |
| WO | 2016028781 A1 | 2/2016 |
| WO | 2016054691 A1 | 4/2016 |
| WO | 2016142045 A1 | 9/2016 |
| WO | 2016164904 A1 | 10/2016 |
| WO | 2016176370 A1 | 11/2016 |
| WO | 2016191018 A1 | 12/2016 |
| WO | 2017019299 A1 | 2/2017 |
| WO | 2017052498 A1 | 3/2017 |
| WO | 2017099899 A1 | 6/2017 |
| WO | 2017100696 A1 | 6/2017 |
| WO | 2017107077 A1 | 6/2017 |
| WO | 2017133217 A1 | 8/2017 |
| WO | 2017181090 A1 | 10/2017 |
| WO | 2017185445 A1 | 11/2017 |
| WO | 2017208199 A1 | 12/2017 |
| WO | 2018005221 A1 | 1/2018 |
| WO | 2018011810 A1 | 1/2018 |
| WO | 2018026589 A1 | 2/2018 |
| WO | 2018044509 A1 | 3/2018 |
| WO | 2018045107 A1 | 3/2018 |
| WO | 2018064408 A1 | 4/2018 |
| WO | 2018076732 A1 | 5/2018 |
| WO | 2018086141 A1 | 5/2018 |
| WO | 2018095054 A1 | 5/2018 |
| WO | 2018227032 A1 | 12/2018 |
| WO | 2019012879 A1 | 1/2019 |
| WO | 2019041412 A1 | 3/2019 |
| WO | 2019048102 A1 | 3/2019 |
| WO | 2019050790 A1 | 3/2019 |
| WO | 2019069248 A1 | 4/2019 |
| WO | 2019144581 A1 | 8/2019 |
| WO | 2019145886 A1 | 8/2019 |
| WO | 2019146997 A1 | 8/2019 |
| WO | 2019209752 A2 | 10/2019 |
| WO | 2020015741 A1 | 1/2020 |

OTHER PUBLICATIONS

Duarte et al., "Segmentation algorithms for thermal images", Procedia Technology, 2014, pp. 1560-1569, vol. 16.

Gudipalli et al., "Comprehensive Infrared Image Edge Detection Algorithm", International Journal of Image Processing, 2012, pp. 297-305, vol. 6:5.

Jakubowski, "Thermal Imaging Cameras Help Firefighters See Through Smoke", Firefighter Nation, 2010, pp. 1-3, Retrieved from https://www.firefighternation.com/firerescue/thermal-imaging-cameras-help-firefighters-see-through-smoke/#gref.

Kihn, "Thermal Imaging: Thermal Imaging Enhances Wildland Firefighter Safety and Effectiveness", Fire Apparatus, 2019, pp. 1-4, Retrieved from https://www.fireapparatmagazine.com/equipment/thermal-imaging-thermal-imaging-enhances-wildland-firefighter-safety-and-effectiveness/#gref.

Narendran et al., "A Review on Object Detection in Thermal Imaging and Analysing Object and Target Parameters", International Journal of Electrical, Electronics, And Data Communication, 2017, pp. 69-72, vol. 5:11.

"New augmented reality technology could help firefighters save lives", CBS News, 2018, Retrieved from https://www.cbsnews.com/news/c-thru-new-augmented-reality-technology-would-aid-firefighters/.

Reichert, "How 5G can save lives by aiding first responders", CNET, 2019, pp. 1-12, Retrieved from https://www.cnet.com/news/how-5g-can-save-lives-by-aiding-first-responders/.

Sergyan, "Edge detection techniques of thermal images", IEEE, 2012, Retrieved from https://ieeexplore.ieee.org/document/6339520.

Wang et al., "Edge detection of infrared image with CNN_DGA algorithm", Optik—International Journal for Light and Electron Optics, 2014, pp. 464-467, vol. 125:1.

Weinmann et al., "Thermal 3D Mapping for Object Detection in Dynamic Scenes", ISPRS Annals of the Photogrammetry, Remote Sensing and Spatial Information Sciences, 2014, pp. 53-60, vol. 2:1.

(56) References Cited

OTHER PUBLICATIONS

Zhou et al., "Boundary Extraction in Thermal Images by Edge Map", 2004 ACM Symposium on Applied Computing, 2004, pp. 254-258.

* cited by examiner

315

| Message ID: | Power level at which the message was received (in RSSI) |
|---|---|
| 0001 | 0 |
| 0002 | -110 |
| 0003 | -50 |
| 0004 | 4 |
| 0005 | 0 |
| 0006 | -105 |
| 0007 | -50 |
| 0008 | 4 |
| 0009 | 0 |
| 0010 | -100 |
| 0011 | -50 |
| 0012 | 4 |
| 0013 | -120 |
| 0014 | -95 |
| 0015 | -35 |
| 0016 | 4 |

Safety Device
102a

Determine values associated with power levels at which each message was received
325

FIG. 3C

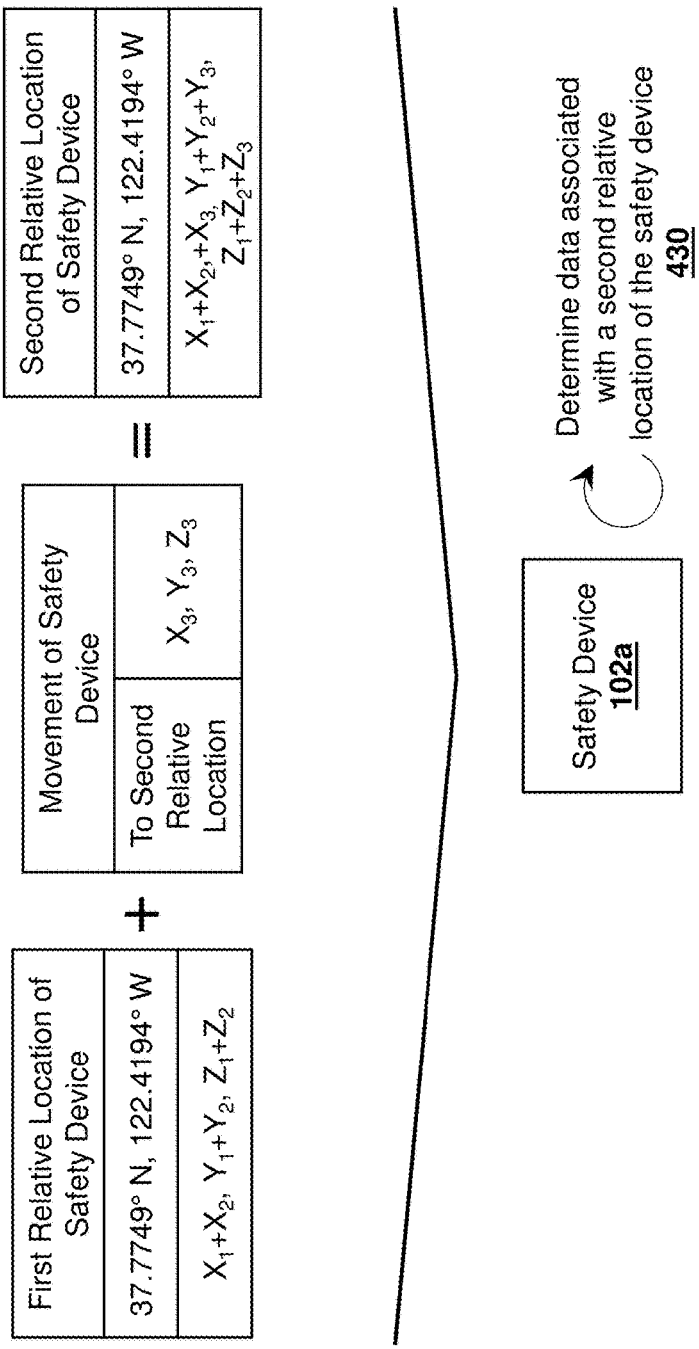

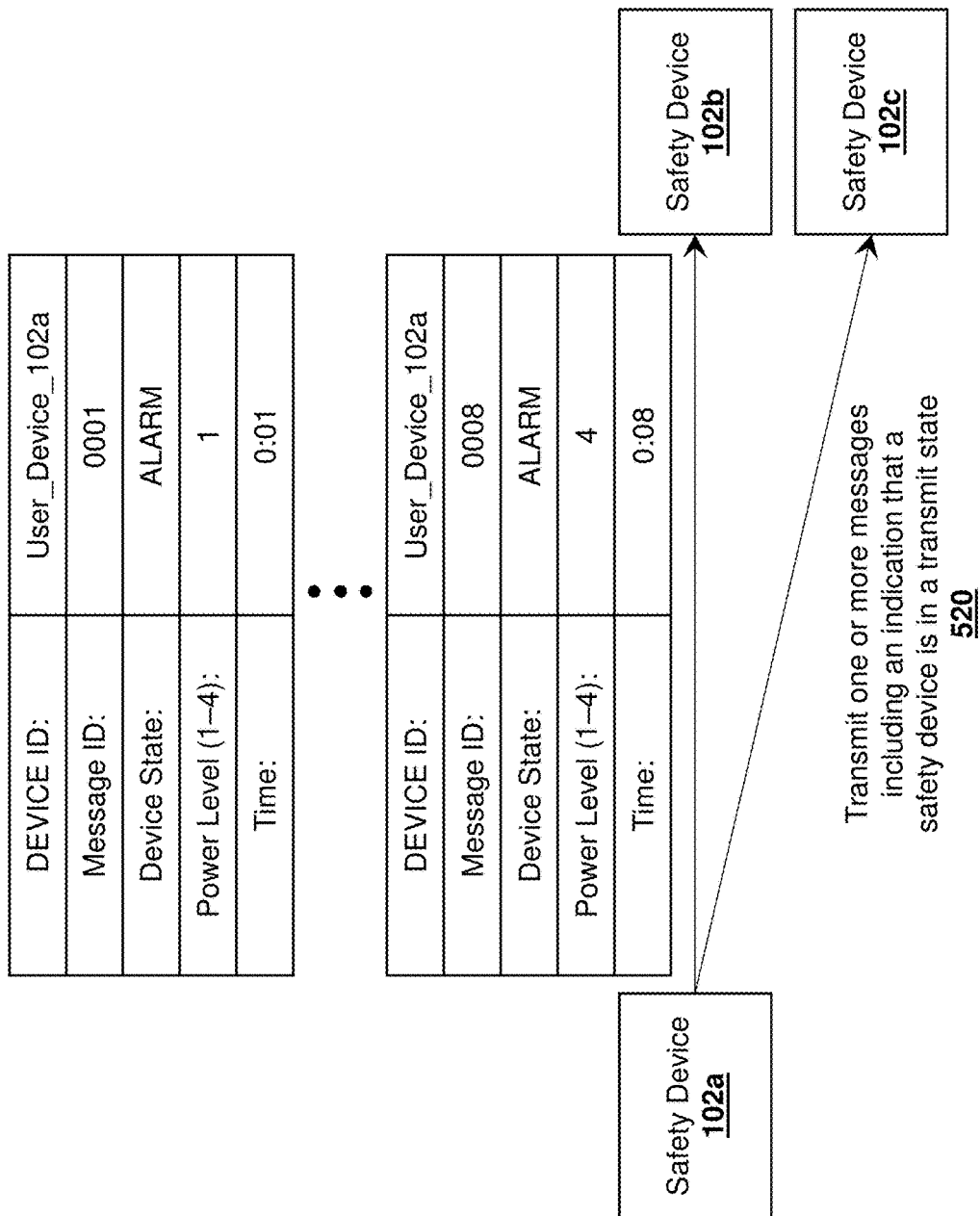

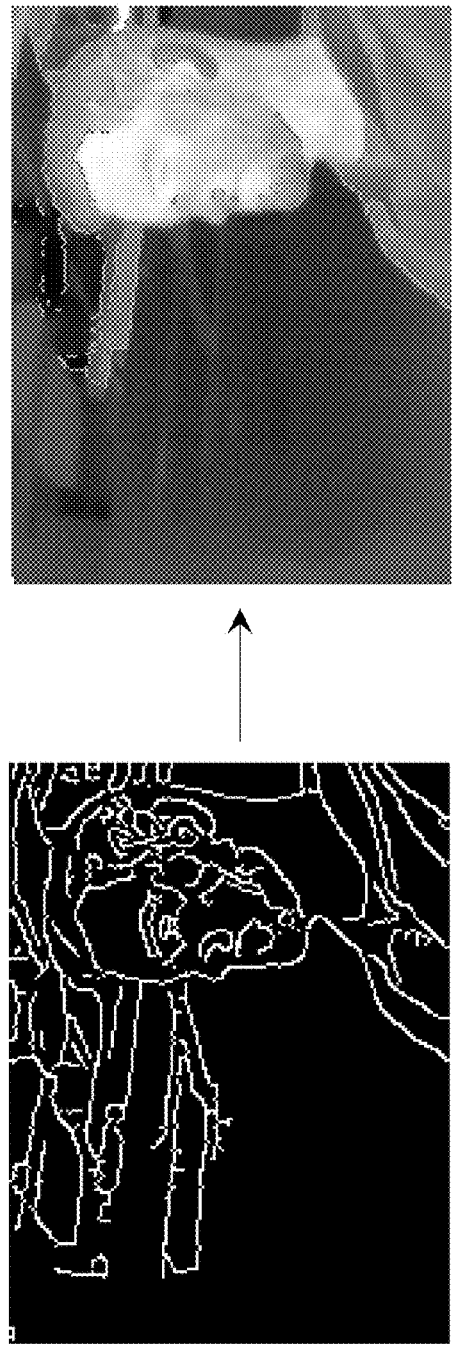

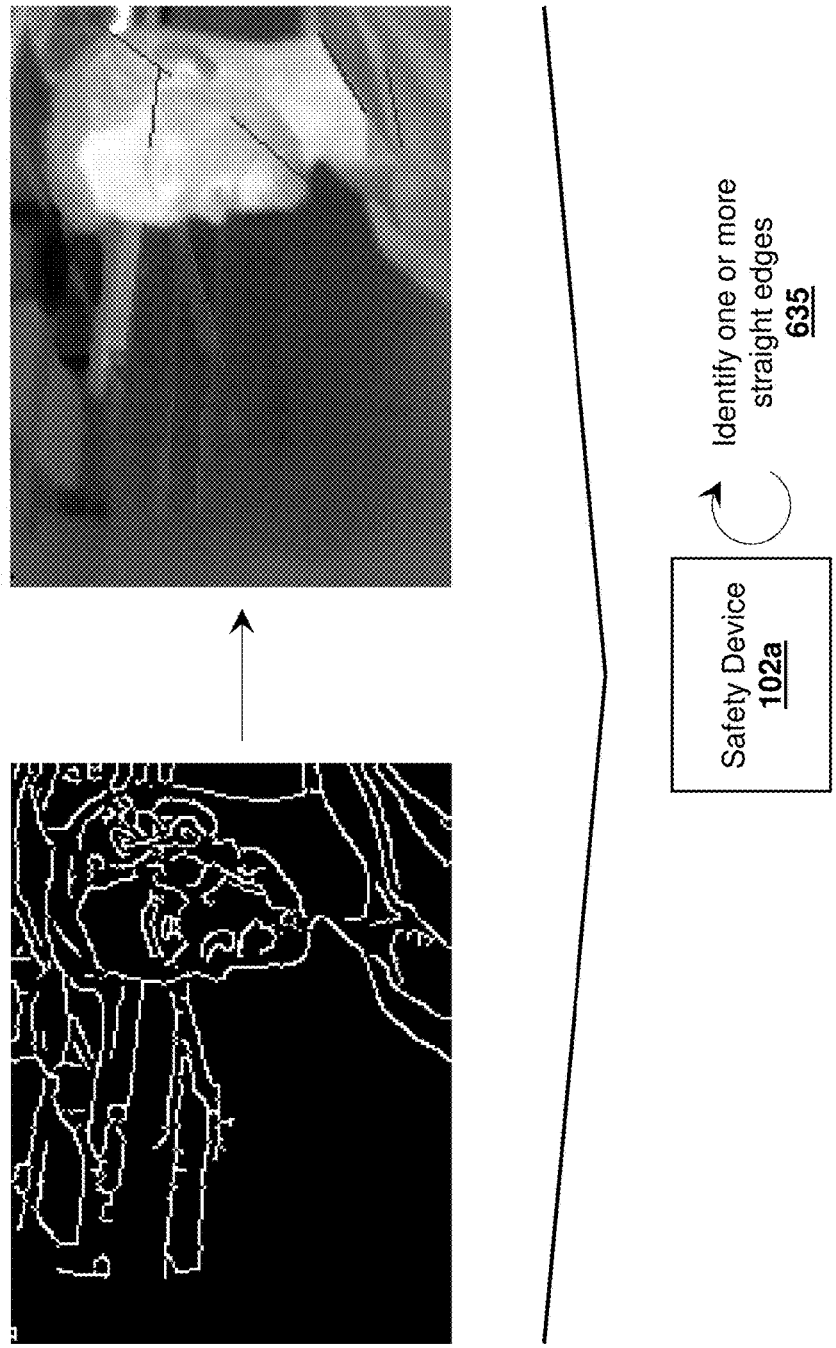

SAFETY DEVICE FOR PROVIDING OUTPUT TO AN INDIVIDUAL ASSOCIATED WITH A HAZARDOUS ENVIRONMENT

CROSS-REFERENCE TO RELATED APPLICATIONS

The present application claims priority to U.S. Provisional Patent Application No. 62/818,831, filed on Mar. 15, 2019, the disclosure of which is hereby incorporated by reference in its entirety.

BACKGROUND

Technical Field

This disclosure relates generally to a device for use in a hazardous environment and, in some non-limiting embodiments or aspects, to devices, methods, and computer program products for providing output to an individual associated with a hazardous environment based on data received from one or more other devices associated with the hazardous environment.

Technical Considerations

First responders (e.g., emergency personnel, such as firefighters, paramedics, police officers, and/or the like) may arrive at a hazardous environment (e.g., a structure such as a house, office building, warehouse, and/or the like that may be on fire, may be filled with smoke or other harmful gases, and/or the like) and may enter the hazardous environment to address one or more hazards in the hazardous environment (e.g., to extinguish one or more fires, to retrieve one or more individuals in the hazardous environment, and/or the like). For example, first responders may arrive at an apartment building where a fire originated in a kitchen. In such an example, the first responders either individually or as one or more groups move through the hazardous environment to address the one or more hazards. When doing so, a first responder may be injured (e.g., may become unconscious, may be hurt and unable to move, and/or the like) and may need assistance exiting the hazardous environment. To request help, the first responder in distress may call (e.g., via a radio, shout, and/or the like) one or more other first responders to help the first responder in distress exit the hazardous environment.

However, the one or more other first responders may find it difficult to identify the location of or identify a path to travel to the location of the first responder in distress because of the hazards in the hazardous environment. For example, the one or more other first responders may take wrong turns or otherwise move away from the first responder in distress (e.g., by virtue of human error, because visibility is reduced, because there is too much noise in the hazardous environment, and/or the like) and, in turn, take longer to find the first responder in distress. This increases the danger to both the first responder in distress and other first responders by increasing time in and exposure to a potentially hazardous environment. Further, first responders in distress that are unconscious will not be able to provide an indication of their location to the one or more other first responders.

SUMMARY

Accordingly, disclosed are devices, methods, and computer program products for providing output to an individual associated with a hazardous environment.

According to some non-limiting embodiments or aspects, provided is a safety device, comprising: a thermal imager configured to detect infrared light; one or more directional antennae, and one or more processors programmed or configured to: receive one or more messages via the one or more directional antennae, determine one or more radio frequency (RF) signal parameters associated with the one or more messages, and output data associated with an indication of an alignment with a device in a transmit state based on the one or more RF signal parameters associated with the one or more messages, wherein the thermal imager is aligned with the one or more directional antennae such that an optical axis of the thermal imager is aligned with a boresight of the one or more directional antennae.

According to some non-limiting embodiments or aspects, provided is a safety device, comprising: a thermal imager configured to detect infrared light; one or more directional antennae, and one or more processors programmed or configured to: receive one or more messages via the one or more directional antennae, determine data associated with one or more parameters at which the one or more messages were received, and output data associated with an indication of a heading toward a device in a transmit state based on values of the one or more parameters at which the one or more messages were received, wherein an optical axis of the thermal imager is aligned with a boresight of the one or more directional antennae.

According to some non-limiting embodiments or aspects, provided is a safety device, comprising: a thermal imager configured to detect infrared light; one or more directional antennae, and one or more processors programmed or configured to: receive one or more messages via the one or more directional antennae, determine one or more power levels at which the one or more messages were received, and output data associated with an indication of a heading toward a device in a transmit state based on the one or more power levels at which the one or more messages were received, wherein an optical axis of the thermal imager is aligned with a boresight of the one or more directional antennae.

According to some non-limiting embodiments or aspects, provided is a computer-implemented method, including: receiving, with at least one processor, data associated with a location of a device generated by a global position system (GPS) receiver and data associated with the location of the device from an inertial measurement unit (IMU) of the device; determining, with at least one processor, an absolute location of the device based on the data associated with the location of the device generated by the GPS receiver and the IMU of the device; receiving, with at least one processor, data associated with movement of the device from the absolute location to a relative location from the IMU; determining, with at least one processor, the relative location of the device based on the absolute location of the device and the movement of the device to the relative location; receiving, with at least one processor, data associated with an indication that a safety device is in a transmit state; and transmitting, with at least one processor, data associated with the relative location of the device.

According to some non-limiting embodiments or aspects, provided is a device including: at least one processor programmed and/or configured to: receive data associated with a location of a device generated by a global position system (GPS) receiver and data associated with the location of the device generated by an inertial measurement unit (IMU) of the device; determine an absolute location of the device based on the data associated with the location of the device generated by the GPS receiver and the IMU of the device;

receive data associated with movement of the device from the absolute location to a relative location generated by the IMU; determine the relative location of the device based on the absolute location of the device and the movement of the device to the relative location; receive data associated with an indication that a safety device is in a transmit state; and transmit data associated with the relative location of the device.

According to some non-limiting embodiments or aspects, provided is a computer program product including at least one non-transitory computer-readable medium comprising one or more instructions that, when executed by at least one processor, cause the at least one processor to: receive data associated with a location of a device generated by global position system (GPS) receiver and data associated with the location of the device generated by an inertial measurement unit (IMU) of the device; determine an absolute location of the device based on the data associated with the location of the device generated by the GPS receiver and the IMU of the device; receive data associated with movement of the device from the absolute location to a relative location generated by the IMU; determine the relative location of the device based on the absolute location of the device and the movement of the device to the relative location; receive data associated with an indication that a safety device is in a transmit state; and transmit data associated with the relative location of the device.

According to some non-limiting embodiments or aspects, provided is a computer-implemented method, including: transmitting one or more messages including an indication that a device is in a transmit state, receiving a first location message from a first safety device in a search state, the first location message comprising: data associated with a location of the first safety device, and transmitting a coordination message to a second safety device based on receiving the first location message from the first safety device in the search state, the coordination message comprising: data associated with the location of the first safety device relative to the device in the transmit state.

According to some non-limiting embodiments or aspects, provided is a device including: at least one processor programmed and/or configured to: transmit one or more messages including an indication that a device is in a transmit state, receive a first location message from a first safety device in a search state, the first location message comprising: data associated with a location of the first safety device, and transmit a coordination message to a second safety device based on receiving the first location message from the first safety device in the search state, the coordination message comprising: data associated with the location of the first safety device relative to the device in the transmit state.

According to some non-limiting embodiments or aspects, provided is a computer program product including at least one non-transitory computer-readable medium comprising one or more instructions that, when executed by at least one processor, cause the at least one processor to: transmit one or more messages including an indication that a device is in a transmit state, receive a first location message from a first safety device in a search state, the first location message comprising: data associated with a location of the first safety device, and transmit a coordination message to a second safety device based on receiving the first location message from the first safety device in the search state, the coordination message comprising: data associated with the location of the first safety device relative to the device in the transmit state.

According to some non-limiting embodiments or aspects, provided is a computer-implemented method, comprising: receiving data associated with infrared light detected by a thermal imager included in a safety device, the data associated with the infrared light representing an image, determining one or more edges included in the image, the one or more edges corresponding to one or more edges of one or more objects in a field of view of the thermal imager; generating a colorized image based on the data associated with the infrared light; overlaying the one or more edges onto the colorized image; and outputting data associated with the colorized image that includes the one or more edges overlaid onto the colorized image.

According to some non-limiting embodiments or aspects, provided is a system for generating an image to be output by a device, the system comprising: at least one processor programmed or configured to: receive data associated with infrared light detected by a thermal imager included in a safety device, the data associated with the infrared light representing an image, determine one or more edges included in the image, the one or more edges corresponding to one or more edges of one or more objects in a field of view of the thermal imager; generate a colorized image based on the data associated with the infrared light; overlay the one or more edges onto the colorized image; and output data associated with the colorized image that includes the one or more edges overlaid onto the colorized image.

According to some non-limiting embodiments or aspects, provided is a computer program product comprising at least one non-transitory computer-readable medium comprising one or more instructions that, when executed by at least one processor, cause the at least one processor to: receive data associated with infrared light detected by a thermal imager included in a safety device, the data associated with the infrared light representing an image, determine one or more edges included in the image, the one or more edges corresponding to one or more edges of one or more objects in a field of view of the thermal imager; generate a colorized image based on the data associated with the infrared light; overlay the one or more edges onto the colorized image; and output data associated with the colorized image that includes the one or more edges overlaid onto the colorized image.

According to some non-limiting embodiments or aspects, provided is a safety device, comprising: a thermal imager configured to detect infrared light; one or more directional antennae, and one or more processors programmed or configured to: receive one or more messages via the one or more directional antennae, determine one or more radio frequency (RF) signal parameters associated with the one or more messages, and output data associated with an indication of an alignment with a device in a transmit state based on the one or more RF signal parameters associated with the one or more messages, wherein the thermal imager is aligned with the one or more directional antennae such that an optical axis of the thermal imager is aligned with a boresight of the one or more directional antennae.

According to some non-limiting embodiments or aspects, provided is a safety device, comprising: a thermal imager configured to detect infrared light; one or more directional antennae, and one or more processors programmed or configured to: receive one or more messages via the one or more directional antennae, determine data associated with one or more parameters at which the one or more messages were received, and output data associated with an indication of a heading toward a device in a transmit state based on values of the one or more parameters at which the one or more messages were received, wherein an optical axis of the thermal imager is aligned with a boresight of the one or more directional antennae.

According to some non-limiting embodiments or aspects, provided is a safety device, comprising: a thermal imager configured to detect infrared light; one or more directional antennae, and one or more processors programmed or configured to: receive one or more messages via the one or more directional antennae, determine one or more power levels at which the one or more messages were received, and output data associated with an indication of a heading toward a device in a transmit state based on the one or more power levels at which the one or more messages were received, wherein an optical axis of the thermal imager is aligned with a boresight of the one or more directional antennae.

Further non-limiting aspects or embodiments are set forth in the following numbered clauses:

Clause 1: A safety device, comprising: a thermal imager configured to detect infrared light; one or more directional antennae, and one or more processors programmed or configured to: receive one or more messages via the one or more directional antennae, determine one or more radio frequency (RF) signal parameters associated with the one or more messages, and output data associated with an indication of an alignment with a device in a transmit state based on the one or more RF signal parameters associated with the one or more messages, wherein the thermal imager is aligned with the one or more directional antennae such that an optical axis of the thermal imager is aligned with a boresight of the one or more directional antennae.

Clause 2: The safety device of clause 1, further comprising: one or more omnidirectional antennae configured to transmit one or more messages at one or more power levels, the one or more messages including one or more of: data associated with a device identifier, data associated with a transmit period, data associated with a state of one or more devices in communication with the safety device, and data associated with one or more safety devices that are in a search state.

Clause 3: The safety device of clauses 1 or 2, wherein the one or more omnidirectional antennae comprises: a first omnidirectional antenna associated with a first radiation field; and a second omnidirectional antenna associated with a second radiation field, wherein the first omnidirectional antenna and the second omnidirectional antenna are positioned about the safety device such that the first radiation field does not correspond to the second radiation field.

Clause 4: The safety device of any of clauses 1-3, further comprising: a display device; wherein, when receiving the one or more messages via the one or more directional antennae, the one or more processors are programmed or configured to receive data associated with an indication of a heading toward a device in a transmit state, and wherein the one or more processors are further programmed or configured to: receive data associated with infrared light detected by the thermal imager, and output data associated with an image based on the indication of the heading toward the device in the transmit state and the infrared light detected by the thermal imager, the data associated with the image configured to cause the display device to display the image.

Clause 5: The safety device of any of clauses 1-4, further comprising: a display device; a digital camera configured to receive one or more digital images; wherein, when receiving the one or more messages via the one or more directional antennae, the one or more processors are programmed or configured to receive data associated with an indication of a heading toward a device in a transmit state, and wherein the one or more processors are further programmed or configured to: receive, from the thermal imager, data associated with infrared light detected by the thermal imager, receive, from the digital camera, data associated with one or more digital images captured by the digital camera, and output data associated with an image based on the indication of the heading toward the device in the transmit state, the infrared light detected by the thermal imager, and the one or more digital images captured by the digital camera, the data associated with the image configured to cause the display device to display the image.

Clause 6: The safety device of any of clauses 1-5, further comprising: a housing; a display device extending along a first plane; and a circuit board disposed in the housing, the circuit board including the thermal imager and the one or more directional antennae disposed thereon, the circuit board extending along a second plane that is associated with a common plane, wherein the first plane is parallel to or intersects the second plane at an angle of $\pm\Theta°$ from the first plane to the second plane, wherein $\Theta$ is in a range of about 0 to 90.

Clause 7: The safety device of any of clauses 1-6, wherein the one or more directional antennae are included on the circuit board extending along the second plane, and wherein the boresight of the one or more directional antennae is substantially orthogonal to the second plane.

Clause 8: The safety device of any of clauses 1-7, further comprising: a signal-absorbing material included in the housing, the signal-absorbing material configured to absorb signals directed toward the one or more directional antennae in a direction that the one or more directional antennae are not configured to receive the signals from.

Clause 9: A safety device, comprising: a thermal imager configured to detect infrared light; one or more directional antennae, and one or more processors programmed or configured to: receive one or more messages via the one or more directional antennae, determine data associated with one or more parameters at which the one or more messages were received, and output data associated with an indication of a heading toward a device in a transmit state based on values of the one or more parameters at which the one or more messages were received, wherein an optical axis of the thermal imager is aligned with a boresight of the one or more directional antennae.

Clause 10: The safety device of clause 9, further comprising: one or more omnidirectional antennae configured to transmit one or more messages at one or more power levels, the one or more messages including one or more of: data associated with a device identifier, data associated with a transmit period, data associated with a state of one or more devices in communication with the safety device, and data associated with one or more safety devices that are in a search state.

Clause 11: The safety device of clauses 9 or 10, wherein the one or more omnidirectional antennae comprises: a first omnidirectional antenna associated with a first radiation field; and a second omnidirectional antenna associated with a second radiation field, wherein the first omnidirectional antenna and the second omnidirectional antenna are positioned about the safety device such that the first radiation field does not correspond to the second radiation field.

Clause 12: The safety device of any of clauses 9-11, wherein the one or more omnidirectional antennae comprises: a first omnidirectional antenna associated with a first polarization; and a second omnidirectional antenna associated with a second polarization, wherein the first omnidirectional antenna is positioned in the safety device relative to the second omnidirectional antenna such that the first polarization is at least partially unaligned with the second polarization.

Clause 13: The safety device of any of clauses 9-12, further comprising: a display device; wherein, when receiving the one or more messages via the one or more directional antennae, the one or more processors are programmed or configured to receive data associated with an indication of a heading toward a device in a transmit state, and wherein the one or more processors are further programmed or configured to: receive data associated with infrared light detected by the thermal imager, and output data associated with an image based on the indication of the heading toward the device in the transmit state and the infrared light detected by the thermal imager, the data associated with the image configured to cause the display device to display the image.

Clause 14: The safety device of any of clauses 9-13, further comprising: a housing including a display device extending along a first plane; and a circuit board disposed in the housing, the circuit board including the thermal imager and a digital camera disposed thereon, the circuit board extending along a second plane, wherein the first plane is parallel to or intersects the second plane at an angle of $\pm\Theta°$ from the first plane to the second plane, wherein $\Theta$ is in a range of about 0 to 90.

Clause 15: The safety device of any of clauses 9-14, wherein the one or more directional antennae are included on the circuit board extending along the second plane, and wherein the boresight of the one or more directional antennae is substantially orthogonal to the second plane.

Clause 16: A safety device, comprising: a thermal imager configured to detect infrared light; one or more directional antennae, and one or more processors programmed or configured to: receive one or more messages via the one or more directional antennae, determine one or more power levels at which the one or more messages were received, and output data associated with an indication of a heading toward a device in a transmit state based on the one or more power levels at which the one or more messages were received, wherein an optical axis of the thermal imager is aligned with a boresight of the one or more directional antennae.

Clause 17: The safety device of clause 16, wherein the optical axis of the thermal imager is aligned with the boresight of the one or more directional antennae such that a center portion of a field of view associated with the thermal imager intersects the boresight of the one or more directional antennae.

Clause 18: The safety device of clauses 16 or 17, further comprising: a radio frequency (RF) ranging sensor, and a display device; wherein the one or more processors are further programmed or configured to: receive, via the RF ranging sensor, data associated with a distance between a first location of the safety device and a second location of a device that is in a transmit state, receive data associated with infrared light detected by the thermal imager, and output data associated with an image based on the indication of the heading toward the device in the transmit state, the distance between the first location of the safety device and the second location of the device that is in the transmit state, and the infrared light detected by the thermal imager, the data associated with the image configured to cause the display device to display the image.

Clause 19: The safety device of any of clauses 16-18, further comprising: a housing; a display device extending along a first plane; and a circuit board disposed in the housing, the circuit board including the thermal imager and a digital camera disposed thereon, the circuit board extending along a second plane, wherein the first plane is parallel to or intersects the second plane at an angle of $\pm\Theta°$ from the first plane to the second plane, wherein $\Theta$ is in a range of about 0 to 90.

Clause 20: The safety device of any of clauses 16-19, wherein the one or more directional antennae are included on the circuit board, and wherein the boresight of the one or more directional antennae is orthogonal to the second plane.

Clause 21: A device, comprising: at least one processor programmed or configured to: receive data associated with a location of a device generated by global position system (GPS) receiver and data associated with the location of the device generated by an inertial measurement unit (IMU) of the device; determine an absolute location of the device based on the data associated with the location of the device generated by the GPS receiver and the IMU of the device; receive data associated with movement of the device from the absolute location to a relative location generated by the IMU; determine the relative location of the device based on the absolute location of the device and the movement of the device to the relative location; receive data associated with an indication that a safety device is in a transmit state; and transmit data associated with the relative location of the device.

Clause 22: The device of clause 21, wherein, when receiving data associated with the indication that the safety device is in the transmit state, the at least one processor is programmed or configured to: receive the data associated with the indication that the safety device is in the transmit state from the safety device that is in the transmit state.

Clause 23: The device of clauses 21 or 22, wherein, when receiving data associated with the indication that the safety device is in the transmit state, the at least one processor is programmed or configured to: receive the data associated with the indication that the safety device is in the transmit state from a local monitoring device, wherein the local monitoring device comprises a safety device configured to be in communication with the safety device in the transmit state or a beacon device configured to be in communication with the safety device that is in the transmit state.

Clause 24: The device of any of clauses 21-23, wherein, when receiving data associated with the indication that the safety device is in the transmit state, the at least one processor is programmed or configured to: receive the data associated with the indication that the safety device is in the transmit state from a central server.

Clause 25: The device of any of clauses 21-24, wherein, when transmitting the data associated with the relative location of the device, the at least one processor is programmed or configured to: transmit the data associated with the relative location of the device to the safety device that is in the transmit state.

Clause 26: The device of any of clauses 21-25, wherein, when transmitting the data associated with the relative location of the device, the at least one processor is programmed or configured to: transmit the data associated with the relative location of the device to a local monitoring device wherein the local monitoring device comprises a safety device configured to be in communication with the safety device in the transmit state or a beacon device configured to be in communication with the safety device that is in the transmit state.

Clause 27: The device of any of clauses 21-26, wherein, when transmitting the data associated with the relative location of the device, the at least one processor is programmed or configured to: transmit the data associated with the relative location of the device to the safety device that is in the transmit state to a central server.

Clause 28: The device of any of clauses 21-27, wherein the device is the safety device in the transmit state, and wherein, when transmitting the data associated with the relative location of the device, the at least one processor is programmed or configured to: transmit a plurality of messages, wherein a message of the plurality of messages comprises: data associated with a power level at which the at least one message was transmitted and the data associated with the relative location of the device.

Clause 29: The device of any of clauses 21-28, wherein the at least one processor is further programmed or configured to: receive one or more messages of a plurality of messages from the device in the transmit state via a short-range wireless communication connection; and transmit data associated with the one or more messages received from the device in the transmit state to a local monitoring device via the short-range wireless communication connection, wherein the local monitoring device comprises a safety device configured to be in communication with the safety device in the transmit state or a beacon device configured to be in communication with the safety device that is in the transmit state.

Clause 30: The device of any of clauses 21-29, wherein the at least one processor is further programmed or configured to: receive one or more messages of a plurality of messages from the device in the transmit state via a short-range wireless communication connection; and transmit data associated with one or more messages received from the device in the transmit state to a central server via a communication network.

Clause 31: The device of any of clauses 21-30, wherein the safety device in the transmit state is a first safety device, and wherein the at least one processor is further programmed or configured to: receive data associated with a location of a second safety device, receive, via a ranging antenna, data associated with a first distance from a location of the device to a location of the first safety device, determine a second distance between the location of the second safety device and the location of the first safety device, and determine that the location of the device is closer to the location of the first safety device than the location second safety device based on: comparing the first distance to the second distance, and determining that the location of the device is closer to the location of the first safety device than the location of the second safety device, and transition to a search state based on determining that the location of the device is closer to the location of first safety device than the location of the second safety device.

Clause 32: The device of any of clauses 21-31, wherein the at least one processor is further programmed or configured to: transition the device to a search state based on the data associated with the indication that a safety device is in a transmit state, wherein, when the device is in the search state, the at least one processor is programmed or configured to: broadcast one or more messages including data associated with at least one of: the location of the safety device in the transmit state and data associated with a location of a second safety device.

Clause 33: The device of any of clauses 21-32, wherein the at least one processor is further programmed or configured to: receive data associated with a location of the safety device in the transmit state; receive data associated with a location of a local monitoring device; and determine an area in which the safety device in the transmit state is located based on the location of the safety device in the transmit state, the relative location of the device, and the location of the local monitoring device, wherein the local monitoring device comprises a safety device configured to be in communication with the safety device in the transmit state.

Clause 34: The device of any of clauses 21-33, wherein the at least one processor is further programmed or configured to: receive data associated with a location of the safety device in the transmit state; receive data associated with a location of a local monitoring device; and determine an area in which the safety device in the transmit state is located based on the location of the safety device in the transmit state, the relative location of the device, and the location of the local monitoring device, wherein the local monitoring device comprises a beacon device configured to be in communication with the safety device in the transmit state and the device.

Clause 35: The device of any of clauses 21-34, wherein the at least one processor is further programmed or configured to: receive data associated with a location of the safety device in the transmit state; receive data associated with a location of a local monitoring device; and determine an area in which the safety device in the transmit state is not located based on the location of the safety device in the transmit state and the location of the local monitoring device, wherein the local monitoring device comprises a safety device configured to be in communication with the safety device in the transmit state or a beacon device configured to be in communication with the safety device that is in the transmit state.

Clause 36: The device of any of clauses 21-35, wherein the at least one processor is further programmed or configured to: receive data associated with a location of the safety device in the transmit state; receive data associated with a location of a local monitoring device; and generate a map based on one or more of the location of the device in the transmit state, the location of the local monitoring device, and the relative location of the device.

Clause 37: A computer program product comprising at least one non-transitory computer-readable medium comprising one or more instructions that, when executed by at least one processor, cause the at least one processor to: receive data associated with a location of a device generated by a global position system (GPS) receiver and data associated with the location of the device generated by an inertial measurement unit (IMU) of the device; determine an absolute location of the device based on the data associated with the location of the device generated by the GPS receiver and the IMU of the device; receive data associated with movement of the device from the absolute location to a relative location generated by the IMU; determine the relative location of the device based on the absolute location of the device and the movement of the device to the relative location; receive data associated with an indication that a safety device is in a transmit state; and transmit data associated with the relative location of the device.

Clause 38: The computer program product of clause 37, wherein the one or more instructions that cause the at least one processor to receive data associated with the indication that the safety device is in the transmit state cause the at least one processor to: receive the data associated with the indication that the safety device is in the transmit state from the safety device that is in the transmit state.

Clause 39: The computer program product of clauses 37 or 38, wherein, when receiving data associated with the indication that the safety device is in the transmit state, the at least one processor is programmed or configured to: receive the data associated with the indication that the safety device is in the transmit state from a local monitoring device, wherein the local monitoring device comprises a safety device configured to be in communication with the safety device in the transmit state or a beacon device configured to be in communication with the safety device that is in the transmit state.

Clause 40: The computer program product of any of clauses 37-39, wherein, when receiving data associated with the indication that the safety device is in the transmit state, the at least one processor is programmed or configured to: receive the data associated with the indication that the safety device is in the transmit state from a central server.

Clause 41: The computer program product of any of clauses 37-40, wherein, when transmitting the data associated with the relative location of the device, the at least one processor is programmed or configured to: transmit the data associated with the relative location of the device to the safety device that is in the transmit state.

Clause 42: The computer program product of any of clauses 37-41, wherein, when transmitting the data associated with the relative location of the device, the at least one processor is programmed or configured to: transmit the data associated with the relative location of the device to a local monitoring device wherein the local monitoring device comprises a safety device configured to be in communication with the safety device in the transmit state or a beacon device configured to be in communication with the safety device that is in the transmit state.

Clause 43: The computer program product of any of clauses 37-42, wherein, when transmitting the data associated with the relative location of the device, the at least one processor is programmed or configured to: transmit the data associated with the relative location of the device to the safety device that is in the transmit state to a central server.

Clause 44: The computer program product of any of clauses 37-43, wherein the device is the safety device in the transmit state, and wherein, when transmitting the data associated with the relative location of the device, the at least one processor is programmed or configured to: transmit a plurality of messages, wherein each message of the plurality of messages comprises: data associated with a power level at which the message was transmitted and the data associated with the relative location of the device.

Clause 45: The computer program product of any of clauses 37-44, wherein the at least one processor is further programmed or configured to: receive one or more messages of a plurality of messages from the device in the transmit state via a short-range wireless communication connection; and transmit data associated with the one or more messages received from the device in the transmit state to a local monitoring device via the short-range wireless communication connection, wherein the local monitoring device comprises a safety device configured to be in communication with the safety device in the transmit state or a beacon device configured to be in communication with the safety device that is in the transmit state.

Clause 46: The computer program product of any of clauses 37-45, wherein the at least one processor is further programmed or configured to: receive one or more messages of a plurality of messages from the device in the transmit state via a short-range wireless communication connection; and transmit data associated with one or more messages received from the device in the transmit state to a central server via a communication network.

Clause 47: The computer program product of any of clauses 37-46, wherein the safety device in the transmit state is a first safety device, and wherein the at least one processor is further programmed or configured to: receive data associated with a location of a second safety device, receive, via a ranging antenna, data associated with a first distance from a location of the device to a location of the first safety device, determine a second distance between the location of the second safety device and the location of the first safety device, and determine that the location of the device is closer to the location of the first safety device than the location second safety device based on: comparing the first distance to the second distance, and determining that the location of the device is closer to the location of the first safety device than the location of the second safety device, and transition to a search state based on determining that the location of the device is closer to the location of first safety device than the location of the second safety device.

Clause 48: The computer program product of any of clauses 37-47, wherein the at least one processor is further programmed or configured to: transition the device to a search state based on the data associated with the indication that a safety device is in a transmit state, wherein, when the device is in the search state, the at least one processor is programmed or configured to: broadcast one or more messages including data associated with at least one of: the location of the safety device in the transmit state and data associated with a location of a second safety device.

Clause 49: The computer program product of any of clauses 37-48, wherein the at least one processor is further programmed or configured to: receive data associated with a location of the safety device in the transmit state; receive data associated with a location of a local monitoring device; and determine an area in which the safety device in the transmit state is located based on the location of the safety device in the transmit state, the relative location of the device, and the location of the local monitoring device, wherein the local monitoring device comprises a safety device configured to be in communication with the safety device in the transmit state.

Clause 50: The computer program product of any of clauses 37-49, wherein the at least one processor is further programmed or configured to: receive data associated with a location of the safety device in the transmit state; receive data associated with a location of a local monitoring device; and determine an area in which the safety device in the transmit state is located based on the location of the safety device in the transmit state, the relative location of the device, and the location of the local monitoring device, wherein the local monitoring device comprises a beacon device configured to be in communication with the safety device in the transmit state and the device.

Clause 51: The computer program product of any of clauses 37-50, wherein the at least one processor is further programmed or configured to: receive data associated with a location of the safety device in the transmit state; receive data associated with a location of a local monitoring device; and determine an area in which the safety device in the transmit state is not located based on the location of the safety device in the transmit state and the location of the local monitoring device, wherein the local monitoring device comprises a safety device configured to be in communication with the safety device in the transmit state or a beacon device configured to be in communication with the safety device that is in the transmit state.

Clause 52: The computer program product of any of clauses 37-51, wherein the at least one processor is further programmed or configured to: receive data associated with a location of the safety device in the transmit state; receive data associated with a location of a local monitoring device;

and generate a map based on one or more of the location of the device in the transmit state, the location of the local monitoring device, and the relative location of the device.

Clause 53: A computer-implemented method, comprising: receiving data associated with a location of a device generated by a global position system (GPS) receiver and data associated with the location of the device generated by an inertial measurement unit (IMU) of the device; determining an absolute location of the device based on the data associated with the location of the device generated by the GPS receiver and the IMU of the device; receiving data associated with movement of the device from the absolute location to a relative location generated by the IMU; determining the relative location of the device based on the absolute location of the device and the movement of the device to the relative location; receiving data associated with an indication that a safety device is in a transmit state; and transmitting data associated with the relative location of the device.

Clause 54: The computer-implemented method of clause 53, receiving data associated with the indication that the safety device is in the transmit state comprises: receiving the data associated with the indication that the safety device is in the transmit state from the safety device that is in the transmit state.

Clause 55: The computer-implemented method of clauses 53 or 54, wherein receiving data associated with the indication that the safety device is in the transmit state comprises: receiving the data associated with the indication that the safety device is in the transmit state from a local monitoring device, wherein the local monitoring device comprises a safety device configured to be in communication with the safety device in the transmit state or a beacon device configured to be in communication with the safety device that is in the transmit state.

Clause 56: The computer-implemented method of any of clauses 53-55, wherein receiving data associated with the indication that the safety device is in the transmit state comprises: receive the data associated with the indication that the safety device is in the transmit state from a central server.

Clause 57: The computer-implemented method of any of clauses 53-56, wherein transmitting the data associated with the relative location of the device comprises: transmitting the data associated with the relative location of the device to the safety device that is in the transmit state Clause 58: The computer-implemented method of any of clauses 53-57, wherein transmitting the data associated with the relative location of the device comprises: transmitting the data associated with the relative location of the device to a local monitoring device wherein the local monitoring device comprises a safety device configured to be in communication with the safety device in the transmit state or a beacon device configured to be in communication with the safety device that is in the transmit state.

Clause 59: The computer-implemented method of any of clauses 53-58, wherein transmitting the data associated with the relative location of the device comprises: transmitting the data associated with the relative location of the device to the safety device that is in the transmit state to a central server.

Clause 60: The computer-implemented method of any of clauses 53-59, wherein the device is the safety device in the transmit state, and wherein transmitting the data associated with the relative location of the device comprises: transmitting a plurality of messages, wherein a message of the plurality of messages comprises: data associated with a power level at which each message was transmitted and the data associated with the relative location of the device.

Clause 61: The computer-implemented method of any of clauses 53-60, further comprising: receiving one or more messages of a plurality of messages from the device in the transmit state via a short-range wireless communication connection; and transmitting data associated with the one or more messages received from the device in the transmit state to a local monitoring device via the short-range wireless communication connection, wherein the local monitoring device comprises a safety device configured to be in communication with the safety device in the transmit state or a beacon device configured to be in communication with the safety device that is in the transmit state.

Clause 62: The computer-implemented method of any of clauses 53-61, further comprising: receiving one or more messages of a plurality of messages from the device in the transmit state via a short-range wireless communication connection; and transmitting data associated with one or more messages received from the device in the transmit state to a central server via a communication network.

Clause 63: The computer-implemented method of any of clauses 53-62, wherein the safety device in the transmit state is a first safety device, the computer-implemented method further comprising: receiving data associated with a location of a second safety device, receiving, via a ranging antenna, data associated with a first distance from a location of the device to a location of the first safety device, determining a second distance between the location of the second safety device and the location of the first safety device, and determining that the location of the device is closer to the location of the first safety device than the location second safety device based on: comparing the first distance to the second distance, and determining that the location of the device is closer to the location of the first safety device than the location of the second safety device, and transitioning to a search state based on determining that the location of the device is closer to the location of first safety device than the location of the second safety device.

Clause 64: The computer-implemented method of any of clauses 53-63, further comprising: transitioning the device to a search state based on the data associated with the indication that a safety device is in a transmit state; and broadcasting one or more messages including data associated with at least one of: the location of the safety device in the transmit state and data associated with a location of a second safety device.

Clause 65: The computer-implemented method of any of clauses 53-64, further comprising: receiving data associated with a location of the safety device in the transmit state; receiving data associated with a location of a local monitoring device; and determining an area in which the safety device in the transmit state is located based on the location of the safety device in the transmit state, the relative location of the device, and the location of the local monitoring device, wherein the local monitoring device comprises a safety device configured to be in communication with the safety device in the transmit state.

Clause 66: The computer-implemented method of any of clauses 53-65, further comprising: receiving data associated with a location of the safety device in the transmit state; receiving data associated with a location of a local monitoring device; and determining an area in which the safety device in the transmit state is located based on the location of the safety device in the transmit state, the relative location of the device, and the location of the local monitoring device, wherein the local monitoring device comprises a beacon device configured to be in communication with the safety device in the transmit state and the device.

Clause 67: The computer-implemented method of any of clauses 53-66, further comprising: receiving data associated with a location of the safety device in the transmit state; receiving data associated with a location of a local monitoring device; and determining an area in which the safety device in the transmit state is not located based on the location of the safety device in the transmit state and the location of the local monitoring device, wherein the local monitoring device comprises a safety device configured to be in communication with the safety device in the transmit state or a beacon device configured to be in communication with the safety device that is in the transmit state.

Clause 68: The computer-implemented method of any of clauses 53-67, further comprising: receiving data associated with a location of the safety device in the transmit state; receiving data associated with a location of a local monitoring device; and generating a map based on one or more of the location of the device in the transmit state, the location of the local monitoring device, and the relative location of the device.

Clause 69: A system, comprising: at least one processor programmed or configured to: transmit one or more messages including an indication that a device is in a transmit state, receive a first location message from a first safety device in a search state, the first location message comprising: data associated with a location of the first safety device, and transmit a coordination message to a second safety device based on receiving the first location message from the first safety device in the search state, the coordination message comprising: data associated with the location of the first safety device relative to the device in the transmit state.

Clause 70: The system of clause 69, wherein the at least one processor is further programmed or configured to: receive a second location message comprising data associated with a location of the second safety device; determine a first distance from the first safety device in the search state to the device in the transmit state; determine a second distance from the second safety device in the search state to the device in the transmit state; and determine whether the first safety device or the second safety device is closer to the device in the transmit state based on comparing the first distance to the second distance.

Clause 71: The system of clauses 69 or 70, wherein, when transmitting the coordination message to the second safety device, the at least one processor is further programmed or configured to: transmit the coordination message comprising: the data associated with the location of the first safety device relative to the safety device in the transmit state; and data associated with an indication that the second safety device should transition to a search state based on determining that the second safety device is closer to the device in the transmit state.

Clause 72: The system of any of clauses 69-71, wherein the location of the first safety device is an absolute location of the first safety device, and wherein the at least one processor is further programmed or configured to: receive data associated with a distance between the device in the transmit state and the first safety device, and determine an absolute location of the device in the transmit state based on the absolute location of the first safety device, the distance between the device in the transmit state and the first safety device, and a relative location of the device in the transmit state.

Clause 73: The system of any of clauses 69-72, wherein, when transmitting the coordination message to the second safety device, the at least one processor is further programmed or configured to: transmit the coordination message comprising: data associated with the absolute location of the first safety device, wherein the coordination message causes a display device of the second safety device to display the absolute location of the first safety device relative to a relative location of the second safety device or an absolute location of the second safety device.

Clause 74: The system of any of clauses 69-73, wherein the location of the first safety device is an absolute location of the first safety device, and wherein the at least one processor is further programmed or configured to: receive data associated with a first distance between the device in the transmit state and the first safety device, receive data associated with a second distance between the device in the transmit state and the second safety device; receive a second location message comprising data associated with a location of the second safety device, the location of the second safety device comprising a relative location of the second safety device or an absolute location of the second safety device; and determine an absolute location of the device in the transmit state based on the absolute location of the first safety device, the distance between the device in the transmit state and the first safety device, and the location of the second safety device.

Clause 75: The system of any of clauses 69-74, wherein the at least one processor is further programmed or configured to: transmit data associated with an prompt to transition to a search state based on the location of the first safety device, the location of the second safety device, and the absolute location of the device in the transmit state.

Clause 76: A computer program product comprising at least one non-transitory computer-readable medium comprising one or more instructions that, when executed by at least one processor, cause the at least one processor to: transmit one or more messages including an indication that a device is in a transmit state, receive a first location message from a first safety device in a search state, the first location message comprising: data associated with a location of the first safety device, and transmit a coordination message to a second safety device based on receiving the first location message from the first safety device in the search state, the coordination message comprising: data associated with the location of the first safety device relative to the device in the transmit state.

Clause 77: The computer program product of clause 76, wherein the one or more instructions further cause the at least one processor to: receive a second location message comprising data associated with a location of the second safety device; determine a first distance from the first safety device in the search state to the device in the transmit state; determine a second distance from the second safety device in the search state to the device in the transmit state; and determine whether the first safety device or the second safety device is closer to the device in the transmit state based on comparing the first distance to the second distance.

Clause 78: The computer program product of clauses 76 or 77, wherein the one or more instructions that cause the at least one processor to transmit the coordination message to the second safety device cause the at least one processor to: transmit the coordination message comprising: the data associated with the location of the first safety device relative to the safety device in the transmit state; and data associated with an indication that the second safety device should transition to a search state based on determining that the second safety device is closer to the device in the transmit state.

Clause 79: The computer program product of any of clauses 76-78, wherein the location of the first safety device is an absolute location of the first safety device, and wherein the one or more instructions further cause the at least one processor to: receive data associated with a distance between the device in the transmit state and the first safety device, and determine an absolute location of the device in the transmit state based on the absolute location of the first safety device, the distance between the device in the transmit state and the first safety device, and a relative location of the device in the transmit state.

Clause 80: The computer program product of any of clauses 76-79, wherein the one or more instructions that cause the at least one processor to transmit the coordination message to the second safety device cause the at least one processor to: transmit the coordination message comprising: data associated with the absolute location of the first safety device, wherein the coordination message causes a display device of the second safety device to display the absolute location of the first safety device relative to a relative location of the second safety device or an absolute location of the second safety device.

Clause 81: The computer program product of any of clauses 76-80, wherein the location of the first safety device is an absolute location of the first safety device, and wherein the one or more instructions further cause the at least one processor to: receive data associated with a first distance between the device in the transmit state and the first safety device, receive data associated with a second distance between the device in the transmit state and the second safety device; receive a second location message comprising data associated with a location of the second safety device, the location of the second safety device comprising a relative location of the second safety device or an absolute location of the second safety device; and determine an absolute location of the device in the transmit state based on the absolute location of the first safety device, the distance between the device in the transmit state and the first safety device, and the location of the second safety device.

Clause 82: The computer program product of any of clauses 76-81, wherein the one or more instructions further cause the at least one processor to: transmit data associated with an prompt to transition to a search state based on the location of the first safety device, the location of the second safety device, and the absolute location of the device in the transmit state.

Clause 83: A computer-implemented method, comprising: transmitting one or more messages including an indication that a device is in a transmit state, receiving a first location message from a first safety device in a search state, the first location message comprising: data associated with a location of the first safety device, and transmitting a coordination message to a second safety device based on receiving the first location message from the first safety device in the search state, the coordination message comprising: data associated with the location of the first safety device relative to the device in the transmit state.

Clause 84: The computer-implemented method of clause 83, further comprising: receiving a second location message comprising data associated with a location of the second safety device; determining a first distance from the first safety device in the search state to the device in the transmit state; determining a second distance from the second safety device in the search state to the device in the transmit state; and determining whether the first safety device or the second safety device is closer to the device in the transmit state based on comparing the first distance to the second distance.

Clause 85: The computer-implemented method of clauses 83 or 84, wherein transmitting the coordination message to the second safety device comprises: transmitting the coordination message comprising: the data associated with the location of the first safety device relative to the safety device in the transmit state; and data associated with an indication that the second safety device should transition to a search state based on determining that the second safety device is closer to the device in the transmit state.

Clause 86: The computer-implemented method of any of clauses 83-85, wherein the location of the first safety device is an absolute location of the first safety device, the computer-implemented method further comprising: receiving data associated with a distance between the device in the transmit state and the first safety device, and determining an absolute location of the device in the transmit state based on the absolute location of the first safety device, the distance between the device in the transmit state and the first safety device, and a relative location of the device in the transmit state.

Clause 87: The computer-implemented method of any of clauses 83-86, wherein transmitting the coordination message to the second safety device comprises: transmitting the coordination message, wherein the coordination message comprises data associated with the absolute location of the first safety device, wherein the coordination message causes a display device of the second safety device to display the absolute location of the first safety device relative to a relative location of the second safety device or an absolute location of the second safety device.

Clause 88: The computer-implemented method of any of clauses 83-87, wherein the location of the first safety device is an absolute location of the first safety device, the computer-implemented method further comprising: receiving data associated with a first distance between the device in the transmit state and the first safety device, receiving data associated with a second distance between the device in the transmit state and the second safety device; receiving a second location message comprising data associated with a location of the second safety device, the location of the second safety device comprising a relative location of the second safety device or an absolute location of the second safety device; and determining an absolute location of the device in the transmit state based on the absolute location of the first safety device, the distance between the device in the transmit state and the first safety device, and the location of the second safety device.

Clause 89: The computer-implemented method of any of clauses 83-88, further comprising: transmitting data associated with an prompt to transition to a search state based on the location of the first safety device, the location of the second safety device, and the absolute location of the device in the transmit state.

Clause 90: A system for generating an image to be output by a device, the system comprising: at least one processor programmed or configured to: receive data associated with infrared light detected by a thermal imager included in a safety device, the data associated with the infrared light representing an image, determine one or more edges included in the image, the one or more edges corresponding to one or more edges of one or more objects in a field of view of the thermal imager; generate a colorized image based on the data associated with the infrared light; overlay the one or more edges onto the colorized image; and output data associated with the colorized image that includes the one or more edges overlaid onto the colorized image.

Clause 91: The system of clause 90, wherein, when determining the one or more edges included in the image, the at least one processor is programmed or configured to: identify the one or more edges in the image corresponding to the one or more edges of one or more objects in the field of view of the thermal imager using an edge detection algorithm.

Clause 92: The system of clauses 90 or 91, wherein, when determining the one or more edges included in the image, the at least one processor is programmed or configured to: identify one or more straight edges corresponding to the one or more edges of one or more objects in the field of view of the thermal imager using a straight line detection algorithm and the one or more edges that were identified in the image using the edge detection algorithm, and wherein, when overlaying the one or more edges onto the colorized image, the at least one processor is programmed or configured to: overlay the one or more straight edges corresponding to the one or more edges of one or more objects in a field of view of the thermal imager onto the colorized image after colorizing the image to generate the colorized image.

Clause 93: The system of any of clauses 90-92, wherein, when determining the one or more edges included in the image, the at least one processor is programmed or configured to: identify one or more sets of straight edges corresponding to the one or more edges of one or more objects in a field of view of the thermal imager using a straight line detection algorithm and the one or more edges that were identified using the image and the edge detection algorithm, and wherein, when overlaying the one or more edges onto the colorized image, the at least one processor is programmed or configured to: overlay the one or more sets of straight edges corresponding to the one or more edges of one or more objects in a field of view of the thermal imager onto the colorized image after colorizing the image to generate the colorized image.

Clause 94: The system any of clauses 90-93, wherein, when overlaying the one or more edges onto the colorized image, the at least one processor is programmed or configured to: overlay one or more non-linear edges of the one or more edges that were identified in the image using the edge detection algorithm onto the colorized image after colorizing the image to generate the colorized image.

Clause 95: The system of any of clauses 90-94, wherein, when overlaying the one or more edges onto the colorized image, the at least one processor is programmed or configured to: overlay one or more straight edges in a first color onto the colorized image; and overlay one or more non-linear edges in a second color onto the colorized image, wherein the first color is different from the second color.

Clause 96: The system of any of clauses 90-95, wherein, when identifying the one or more straight edges, the at least one processor is programmed or configured to: identify the one or more straight edges corresponding to the one or more edges of one or more objects in a field of view of the thermal imager based on performing a Hough transformation on data associated with the one or more edges that were identified using the edge detection algorithm.

Clause 97: A computer program product comprising at least one non-transitory computer-readable medium comprising one or more instructions that, when executed by at least one processor, cause the at least one processor to: receive data associated with infrared light detected by a thermal imager included in a safety device, the data associated with the infrared light representing an image, determine one or more edges included in the image, the one or more edges corresponding to one or more edges of one or more objects in a field of view of the thermal imager; generate a colorized image based on the data associated with the infrared light; overlay the one or more edges onto the colorized image; and output data associated with the colorized image that includes the one or more edges overlaid onto the colorized image.

Clause 98: The computer program product of clause 97, wherein the one or more instructions that cause the at least one processor to determine the one or more edges included in the image cause the at least one processor to: identify the one or more edges in the image corresponding to the one or more edges of one or more objects in the field of view of the thermal imager using an edge detection algorithm.

Clause 99: The computer program product of clauses 97 or 98, wherein the one or more instructions that cause the at least one processor to determine the one or more edges included in the image cause the at least one processor to: identify one or more straight edges corresponding to the one or more edges of one or more objects in the field of view of the thermal imager using a straight line detection algorithm and the one or more edges that were identified in the image using the edge detection algorithm, and wherein the one or more instructions that cause the at least one processor to overlaying the one or more edges onto the colorized image cause the at least one processor to: overlay the one or more straight edges corresponding to the one or more edges of one or more objects in a field of view of the thermal imager onto the colorized image after colorizing the image to generate the colorized image.

Clause 100: The computer program product of any of clauses 97-99, wherein the one or more instructions that cause the at least one processor to determine the one or more edges included in the image cause the at least one processor to: identify one or more sets of straight edges corresponding to the one or more edges of one or more objects in a field of view of the thermal imager using a straight line detection algorithm and the one or more edges that were identified using the image and the edge detection algorithm, and wherein the one or more instructions that cause the at least one processor to overlay the one or more edges onto the colorized image cause the at least one processor to: overlay the one or more sets of straight edges corresponding to the one or more edges of one or more objects in a field of view of the thermal imager onto the colorized image after colorizing the image to generate the colorized image.

Clause 101: The computer program product of any of clauses 97-100, wherein the one or more instructions that cause the at least one processor to overlay the one or more edges onto the colorized image cause the at least one processor to: overlay one or more non-linear edges of the one or more edges that were identified in the image using the edge detection algorithm onto the colorized image after colorizing the image to generate the colorized image.

Clause 102: The computer program product of any of clauses 97-101, wherein the one or more instructions that cause the at least one processor to overlay the one or more edges onto the colorized image cause the at least one processor to: overlay one or more straight edges in a first color onto the colorized image; and overlay one or more non-linear edges in a second color onto the colorized image, wherein the first color is different from the second color.

Clause 103: The computer program product of any of clauses 97-102, wherein the one or more instructions that cause the at least one processor to identify the one or more straight edges cause the at least one processor to: identify the one or more straight edges corresponding to the one or more edges of one or more objects in a field of view of the thermal imager based on performing a Hough transformation on data associated with the one or more edges that were identified using the edge detection algorithm.

Clause 104: A computer-implemented method, comprising: receiving data associated with infrared light detected by a thermal imager included in a safety device, the data associated with the infrared light representing an image, determining one or more edges included in the image, the one or more edges corresponding to one or more edges of one or more objects in a field of view of the thermal imager; generating a colorized image based on the data associated with the infrared light; overlaying the one or more edges onto the colorized image; and outputting data associated with the colorized image that includes the one or more edges overlaid onto the colorized image.

Clause 105: The computer-implemented method of clause 104, wherein determining the one or more edges included in the image comprises: identifying the one or more edges in the image corresponding to the one or more edges of one or more objects in the field of view of the thermal imager using an edge detection algorithm.

Clause 106: The computer-implemented method of clauses 104 or 105, wherein determining the one or more edges included in the image comprises: identifying one or more straight edges corresponding to the one or more edges of one or more objects in the field of view of the thermal imager using a straight line detection algorithm and the one or more edges that were identified in the image using the edge detection algorithm, and wherein overlaying the one or more edges onto the colorized image comprises: overlaying the one or more straight edges corresponding to the one or more edges of one or more objects in a field of view of the thermal imager onto the colorized image after colorizing the image to generate the colorized image.

Clause 107: The computer-implemented method of any of clauses 104-106, wherein determining the one or more edges included in the image comprises: identifying one or more sets of straight edges corresponding to the one or more edges of one or more objects in a field of view of the thermal imager using a straight line detection algorithm and the one or more edges that were identified using the image and the edge detection algorithm, and wherein overlaying the one or more edges onto the colorized image comprises: overlaying the one or more sets of straight edges corresponding to the one or more edges of one or more objects in a field of view of the thermal imager onto the colorized image after colorizing the image to generate the colorized image.

Clause 108: The computer-implemented method of any of clauses 104-107, wherein overlaying the one or more edges onto the colorized image comprises: overlaying one or more non-linear edges of the one or more edges that were identified in the image using the edge detection algorithm onto the colorized image after colorizing the image to generate the colorized image.

Clause 109: The computer-implemented method of any of clauses 104-108, wherein overlaying the one or more edges onto the colorized image comprises: overlaying one or more straight edges in a first color onto the colorized image; and overlaying one or more non-linear edges in a second color onto the colorized image, wherein the first color is different from the second color.

Clause 110: The computer-implemented method of any of clauses 104-109, wherein identifying the one or more straight edges comprises: identifying the one or more straight edges corresponding to the one or more edges of one or more objects in a field of view of the thermal imager based on performing a Hough transformation on data associated with the one or more edges that were identified using the edge detection algorithm.

Clause 111: A safety device, comprising: a thermal imager configured to detect infrared light; one or more directional antennae, and one or more processors programmed or configured to: receive one or more messages via the one or more directional antennae, determine one or more radio frequency (RF) signal parameters associated with the one or more messages, and output data associated with an indication of an alignment with a device in a transmit state based on the one or more RF signal parameters associated with the one or more messages, wherein the thermal imager is aligned with the one or more directional antennae such that an optical axis of the thermal imager is aligned with a boresight of the one or more directional antennae.

Clause 112: The safety device of clause 111, further comprising: one or more omnidirectional antennae configured to transmit one or more messages at one or more power levels, the one or more messages including one or more of: data associated with a device identifier, data associated with a transmit period, data associated with a state of one or more devices in communication with the safety device, and data associated with one or more safety devices that are in a search state.

Clause 113: The safety device of clauses 111 or 112, wherein the one or more omnidirectional antennae comprises: a first omnidirectional antenna associated with a first radiation field; and a second omnidirectional antenna associated with a second radiation field, wherein the first omnidirectional antenna and the second omnidirectional antenna are positioned about the safety device such that the first radiation field does not correspond to the second radiation field.

Clause 114: The safety device of any of clauses 111-113, further comprising: a display device; wherein, when receiving the one or more messages via the one or more directional antennae, the one or more processors are programmed or configured to receive data associated with an indication of a heading toward a device in a transmit state, and wherein the one or more processors are further programmed or configured to: receive data associated with infrared light detected by the thermal imager, and output data associated with an image based on the indication of the heading toward the device in the transmit state and the infrared light detected by the thermal imager, the data associated with the image configured to cause the display device to display the image.

Clause 115: The safety device of any of clauses 111-114, further comprising: a display device; a digital camera configured to receive one or more digital images; wherein, when receiving the one or more messages via the one or more directional antennae, the one or more processors are programmed or configured to receive data associated with an indication of a heading toward a device in a transmit state, and wherein the one or more processors are further programmed or configured to: receive, from the thermal imager, data associated with infrared light detected by the thermal imager, receive, from the digital camera, data associated with one or more digital images captured by the digital camera, and output data associated with an image based on the indication of the heading toward the device in the transmit state, the infrared light detected by the thermal imager, and the one or more digital images captured by the digital camera, the data associated with the image configured to cause the display device to display the image.

Clause 116: The safety device of any of clauses 111-115, further comprising: a housing; a display device extending along a first plane; and a circuit board disposed in the housing, the circuit board including the thermal imager and the one or more directional antennae disposed thereon, the circuit board extending along a second plane that is associated with the common plane, wherein the first plane is parallel to or intersects the second plane at an angle of $\pm\Theta°$ from the first plane to the second plane, wherein $\Theta$ is in a range of about 0 to 90.

Clause 117: The safety device of any of clauses 111-116, wherein the one or more directional antennae are included on the circuit board extending along the second plane, and wherein the boresight of the one or more directional antennae is substantially orthogonal to the second plane.

Clause 118: The safety device of any of clauses 111-117, further comprising: a signal-absorbing material included in the housing, the signal-absorbing material configured to absorb signals directed toward the one or more directional antennae in a direction that the one or more directional antennae are not configured to receive the signals from.

Clause 119: A safety device, comprising: a thermal imager configured to detect infrared light; one or more directional antennae, and one or more processors programmed or configured to: receive one or more messages via the one or more directional antennae, determine data associated with one or more parameters at which the one or more messages were received, and output data associated with an indication of a heading toward a device in a transmit state based on values of the one or more parameters at which the one or more messages were received, wherein an optical axis of the thermal imager is aligned with a boresight of the one or more directional antennae.

Clause 120: The safety device of clause 119, further comprising: one or more omnidirectional antennae configured to transmit one or more messages at one or more power levels, the one or more messages including one or more of: data associated with a device identifier, data associated with a transmit period, data associated with a state of one or more devices in communication with the safety device, and data associated with one or more safety devices that are in a search state.

Clause 121: The safety device of clauses 119 or 120, wherein the one or more omnidirectional antennae comprises: a first omnidirectional antenna associated with a first radiation field; and a second omnidirectional antenna associated with a second radiation field, wherein the first omnidirectional antenna and the second omnidirectional antenna are positioned about the safety device such that the first radiation field does not correspond to the second radiation field.

Clause 122: The safety device of any of clauses 119-121, wherein the one or more omnidirectional antennae comprises: a first omnidirectional antenna associated with a first polarization; and a second omnidirectional antenna associated with a second polarization, wherein the first omnidirectional antenna is positioned in the safety device relative to the second omnidirectional antenna such that the first polarization is at least partially unaligned with the second polarization.

Clause 123: The safety device of any of clauses 119-122, further comprising: a display device; wherein, when receiving the one or more messages via the one or more directional antennae, the one or more processors are programmed or configured to receive data associated with an indication of a heading toward a device in a transmit state, and wherein the one or more processors are further programmed or configured to: receive data associated with infrared light detected by the thermal imager, and output data associated with an image based on the indication of the heading toward the device in the transmit state and the infrared light detected by the thermal imager, the data associated with the image configured to cause the display device to display the image.

Clause 124: The safety device of any of clauses 119-123, further comprising: a housing including a display device extending along a first plane; and a circuit board disposed in the housing, the circuit board including the thermal imager and a digital camera disposed thereon, the circuit board extending along a second plane, wherein the first plane is parallel to and/or intersects the second plane at an angle of $\pm\Theta°$ from the first plane to the second plane, wherein $\Theta$ is in a range of about 0 to 90.

Clause 125: The safety device of any of clauses 119-124, wherein the one or more directional antennae are included on the circuit board extending along the second plane, and wherein the boresight of the one or more directional antennae is substantially orthogonal to the second plane.

Clause 126: A safety device, comprising: a thermal imager configured to detect infrared light; one or more directional antennae, and one or more processors programmed or configured to: receive one or more messages via the one or more directional antennae, determine one or more power levels at which the one or more messages were received, and output data associated with an indication of a heading toward a device in a transmit state based on the one or more power levels at which the one or more messages were received, wherein an optical axis of the thermal imager is aligned with a boresight of the one or more directional antennae.

Clause 127: The safety device of clause 126, wherein the optical axis of the thermal imager is aligned with the boresight of the one or more directional antennae such that a center portion of a field of view associated with the thermal imager intersects the boresight of the one or more directional antennae.

Clause 128: The safety device of clauses 126 or 127, further comprising: a radio frequency (RF) ranging sensor, and a display device; wherein the one or more processors are further programmed or configured to: receive, via the RF ranging sensor, data associated with a distance between a first location of the safety device and a second location of a device that is in a transmit state, receive data associated with infrared light detected by the thermal imager, and output data associated with an image based on the indication of the heading toward the device in the transmit state, the distance between the first location of the safety device and the second location of the device that is in the transmit state, and the infrared light detected by the thermal imager, the data associated with the image configured to cause the display device to display the image.

Clause 129: The safety device of any of clauses 126-128, further comprising: a housing; a display device extending along a first plane; and a circuit board disposed in the housing, the circuit board including the thermal imager and a digital camera disposed thereon, the circuit board extending along a second plane, wherein the first plane is parallel to or intersects the second plane at an angle of $\pm\Theta°$ from the first plane to the second plane, wherein $\Theta$ is in a range of about 0 to 90.

Clause 130: The safety device of any of clauses 126-129, wherein the one or more directional antennae are included on the circuit board, and wherein the boresight of the one or more directional antennae is orthogonal to the second plane.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 3B-3H are diagrams of an implementation of a non-limiting aspect or embodiment of a process for providing output to an individual associated with a hazardous environment;

FIGS. 4B-4H are diagrams of an implementation of a non-limiting aspect or embodiment of a process for providing output to an individual associated with a hazardous environment;

FIGS. 5B-5D are diagrams of an implementation of a non-limiting aspect or embodiment of a process for providing output to an individual associated with a hazardous environment;

FIGS. 6B-6H are diagrams of an implementation of a non-limiting aspect or embodiment of a process for providing output to an individual associated with a hazardous environment.

DETAILED DESCRIPTION

Figure 1:
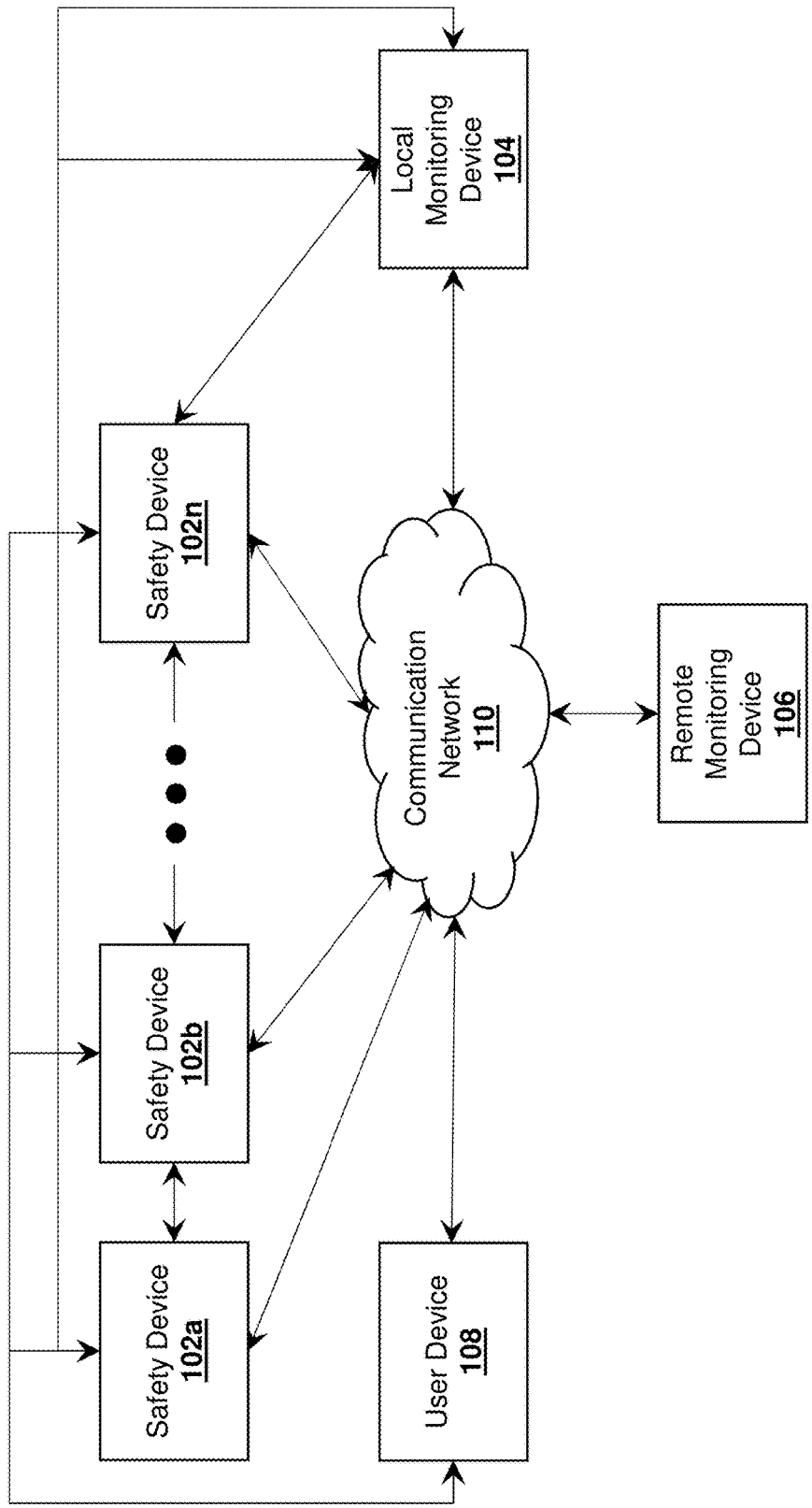
FIG. 1 is a diagram of a non-limiting aspect or embodiment of a system for providing output to an individual associated with a hazardous environment.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a component of a device, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if one or more intermediary units (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the term "server" may refer to one or more devices, such as processors, storage devices, and/or similar computer components that communicate with client devices and/or other devices over a network, such as the Internet or private networks and, in some examples, facilitate communication among other servers and/or client devices.

Provided are improved devices, methods, and computer program products for providing output to an individual associated with a hazardous environment. In some non-limiting embodiments or aspects, devices, methods, and computer program products may receive one or more messages from a device in an alarm state, the one or more messages comprising: a first message received at a first power level, the first message comprising data associated with a power level at which the first message was transmitted by the device in the alarm state, and a second message received at a second power level, the second message comprising data associated with a power level at which the second message was transmitted by the device in the alarm state; determine a heading toward the device in the alarm state based on the first message and the second message; an output data associated with an indication of the heading toward the device in the alarm state.

In this way, a device may be provided that enables first responders to identify the location of one or more other first responders in distress or identify a path to travel to the location of the first responder in distress while the first responder in distress is located within a hazardous environment. For example, the one or more other first responders may be provided with an indication of a location of the first responder in distress via a safety device and may move toward the first responder in distress based on being provided the indication. As a result, the one or more other first responders may take less time to find the first responder in distress. Further, a safety device may transition to a transmit state while a first responder in distress is unconscious and unable to cause the safety device to transition to the transmit state, causing the safety device of the first responder to transmit messages to provide an indication of the location of the first responder in distress to the one or more other first responders.

Referring now to FIG. 1, FIG. 1 is a diagram of an example environment 100 in which devices, systems, methods, and/or products described herein may be implemented. As shown in FIG. 1, environment 100 includes safety devices 102a-102n (referred collectively as "safety devices 102" and individually as "safety device 102" unless otherwise specified), local monitoring device 104, remote monitoring device 106, and user device 108. In some non-limiting embodiments or aspects, safety devices 102, local monitoring device 104, remote monitoring device 106, and/or user device 108 may interconnect (e.g., establish a connection to communicate, and/or the like) via wireless connections.

Safety device 102 may include one or more devices configured to be in communication with other safety devices 102, local monitoring device 104, remote monitoring device 106, and/or user device 108 via communication network 110. For example, safety device 102 may include a device such as, for example, a client device, an individual device (e.g., a mobile device), and/or the like. Safety device 102 may be configured to transmit to and/or receive data from one or more other safety devices 102 and/or local monitoring device 104 via a short-range wireless communication connection (e.g., a two way radio communication connection, one or more (e.g., two) communication connections established within one or more industrial, scientific, and medical (ISM) frequency bands), one or more communication connections established within a direct-sequence spread spectrum (DSSS) band (e.g., 2.4 GHz), an NFC (near-field communication) communication connection, an RFID (radio frequency identification) communication connection, a Bluetooth® communication connection, and/or the like). In some non-limiting embodiments or aspects, safety device 102 may be associated with (e.g., carried by) an individual (e.g., an individual operating a device, such as a first responder), an individual coordinating actions performed by one or more first responders (e.g., an individual providing instructions to one or more first responders), and/or the like. In some non-limiting embodiments or aspects, safety device 102 may be configured to transition to, and/or operate in, a transmit state and/or a search state as described herein. In some non-limiting embodiments or aspects, safety device 102 may be configured to output data associated with an indication of a heading toward a device in a transmit state, as described herein. In some non-limiting embodiments or aspects, safety device 102 may be configured to transmit data associated with a location of one or more safety devices 102. In some non-limiting embodiments or aspects, safety device 102 may be configured to transmit one or more coordination messages, as described herein. In some non-limiting embodiments or aspects, safety device 102 may be configured to output data associated with a colorized image that includes one or more edges overlaid onto the colorized image, as described herein. In some non-limiting embodiments or aspects, safety devices 102a may be configured to be in communication with a self-contained breathing apparatus (SCBA) (e.g., one or more sensors included in an SCBA such as one or more air pressure sensors). In some non-limiting embodiments or aspects, one or more components of safety device 102 may be integrated together and/or as separate components in one or more other devices. For example, one or more components of safety device 102 may be integrated in a helmet, a pressure gauge (e.g., a pressure gauge included in an SCBA), and/or the like.

Local monitoring device 104 may include one or more devices configured to be in communication with safety devices 102, remote monitoring device 106, and/or user device 108 via communication network 110. For example, local monitoring device 104 may include one or more devices such as a server, a desktop computer, a mobile device (e.g., a smartphone, a tablet, and/or the like), and/or the like. Local monitoring device 104 may be configured to transmit and/or receive data to and/or from one or more safety devices 102 via a short-range wireless communication connection. In some non-limiting embodiments or aspects, local monitoring device 104 may be associated with (e.g., operated by) an individual as described herein.

Remote monitoring device 106 may include one or more devices configured to be in communication with safety devices 102, local monitoring device 104, and/or user device 108 via communication network 110. For example, remote monitoring device 106 may include one or more devices such as a server, a desktop computer, a mobile device (e.g., a smartphone, a tablet, and/or the like), and/or the like. In some non-limiting embodiments or aspects, remote monitoring device 106 may be associated with (e.g., operated by) an individual as described herein.

User device 108 may include one or more devices configured to be in communication with safety devices 102, local monitoring device 104, and/or remote monitoring device 106 via communication network 110. For example, remote monitoring device 106 may include one or more devices such as a mobile device and/or the like. In some non-limiting embodiments or aspects, user device 108 may be associated with (e.g., operated by) an individual as described herein. In some non-limiting embodiments or aspects, user device 108 may be configured to transmit and/or receive data associated with one or more data logs (e.g., logs of sensor measurements determined during operation of safety device 102), data associated with one or more configurations (e.g., an operating system), data associated with personalization of safety device 102, and/or the like.

Communication network 110 may include one or more wired and/or wireless networks. For example, communication network 110 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally, or alternatively, a set of systems or a set of devices (e.g., one or more systems, one or more devices) of environment 100 may perform one or more functions described as being performed by another set of systems or another set of devices of environment 100.

Figure 2:
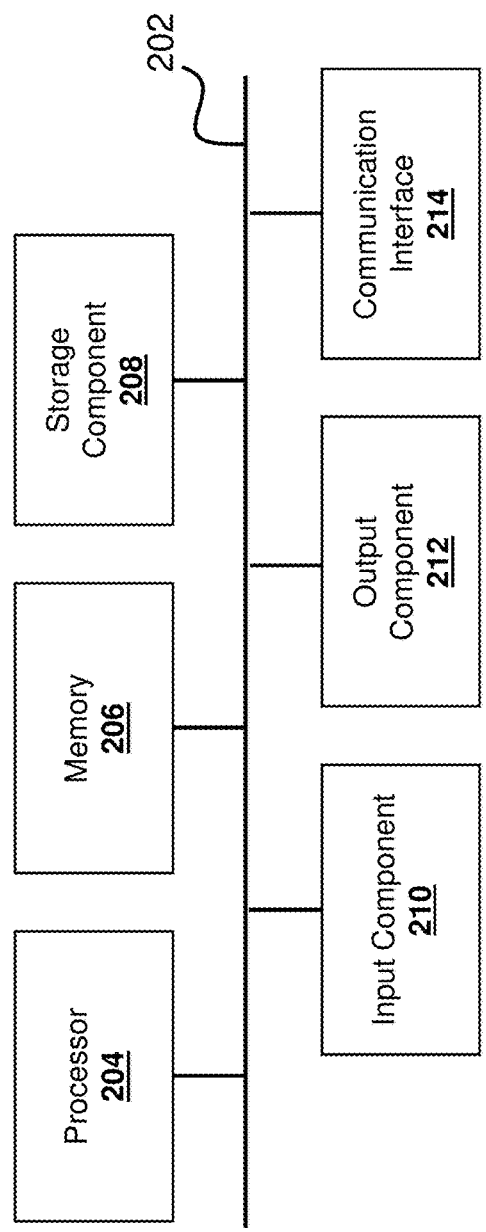
FIG. 2 is a diagram of a non-limiting aspect or embodiment of components of one or more devices and/or one or more systems of FIG. 1.

Referring now to FIG. 2, illustrated is a diagram of example components of device 200. Device 200 may correspond to safety device 102, local monitoring device 104, and/or remote monitoring device 106. In some non-limiting embodiments or aspects, safety device 102, local monitoring device 104, and/or remote monitoring device 106, may include one or more devices 200 and/or one or more components of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include input data, output data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
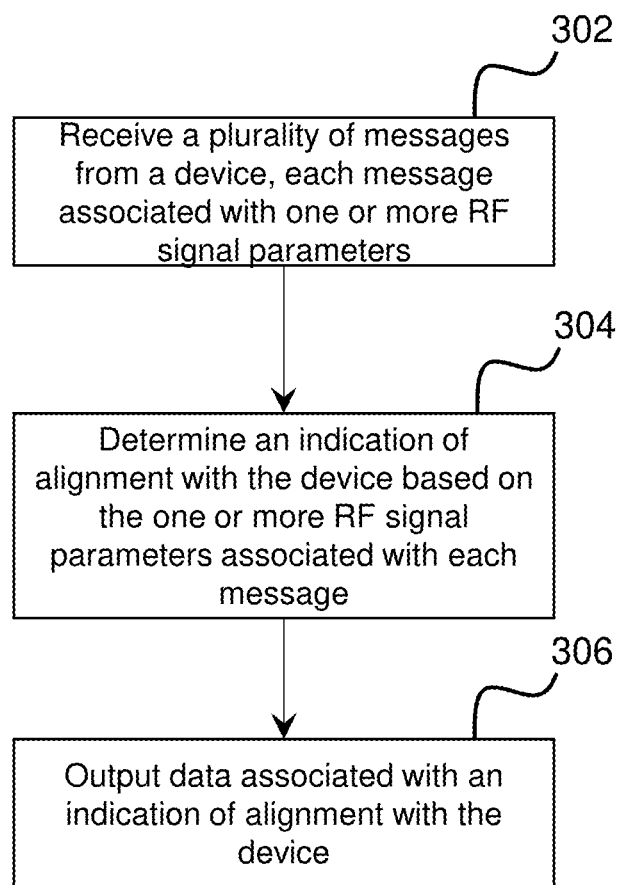
FIG. 3A is a flowchart of a non-limiting aspect or embodiment of a process for operating a safety device associated with a hazardous environment to determine a location of a device.

Referring now to FIG. 3A, FIG. 3A is a flowchart of a non-limiting aspect or embodiment of a process 300 for operating a safety device associated with a hazardous environment to determine a location of a device. In some non-limiting embodiments or aspects, one or more of the functions described with respect to process 300 may be performed (e.g., completely, partially, etc.) by safety device 102 (e.g., safety device 102a). In some non-limiting embodiments or aspects, one or more of the steps of process 300 may be performed (e.g., completely, partially, and/or the like) by another device or a group of devices separate from and/or including safety device 102, such as another safety device 102, local monitoring device 104, and/or remote monitoring device 106. For example, one or more steps of process 300 may be performed (e.g., completely, partially, and/or the like) by local monitoring device 104 and/or remote monitoring device 106 based on one or more devices of safety devices 102, local monitoring device 104, and/or remote monitoring device 106 transmitting a message, data that was included in a message, and/or the like, as described herein to local monitoring device 104 and/or remote monitoring device 106. Additionally, or alternatively, one or more steps of process 300 may be performed (e.g., completely, partially, and/or the like) by local monitoring device 104 and/or remote monitoring device 106 based on one or more devices of safety devices 102, local monitoring device 104, and/or remote monitoring device 106 transmitting (e.g., repeating the transmission) a message, data that was included in a message, and/or the like, received from one or more other devices of safety devices 102, local monitoring device 104, and/or remote monitoring device 106 as described herein to local monitoring device 104 and/or remote monitoring device 106.

As shown in FIG. 3A, at step 302, process 300 may include receiving a plurality of messages from a device, each message associated with one or more RF signal parameters. For example, safety device 102 may receive a plurality of messages from a device, each message associated with one or more RF signal parameters. In some non-limiting embodiments or aspects, the one or more RF signal parameters may include one or more RF signal parameters of reception and/or one or more RF signal parameters of transmission. In some non-limiting embodiments or aspects, the one or more RF signal parameters of reception may include a power level at which a message was received, a quality factor associated with reception of a message, and/or a phase measurement associated with reception of a message. In some non-limiting embodiments or aspects, the one or more RF signal parameters of transmission may include a power level at which a message was transmitted.

In some non-limiting embodiments or aspects, safety device 102 may receive a message associated with an RF signal parameter of reception. For example, safety device 102 may receive a message transmitted by a device, where the message was received at a power level, at a quality factor, and/or with a phase measurement. In some non-limiting embodiments or aspects, the message may include data associated with an RF signal parameter of transmission. For example, the message may include data associated with a power level at which the message was transmitted.

In some non-limiting embodiments or aspects, safety device 102 may receive a plurality of messages from a device, each message received at a power level. For example, safety device 102 may receive the plurality of messages at a power level from a device (e.g., a beacon device, a radio, another safety device 102, and/or the like) that transmits each message at a specified power level.

In some non-limiting embodiments, the device that transmits the plurality of messages may be in a transmit state. For example, the device that transmits the plurality of messages may include safety device 102 that is in a transmit state. In some non-limiting embodiments or aspects, the device that is in the transmit state may transmit a message (e.g., one or more messages, a plurality of messages, and/or the like) that is to be used (e.g., by safety device 102, by local monitoring device 104, and/or by remote monitoring device 106) to determine a location of the device that transmitted the message.

In some non-limiting embodiments or aspects, the device that transmits the plurality of messages may transmit the plurality of messages at a predetermined rate (e.g., one message per millisecond, one message per second, and/or the like). For example, the device may transmit a plurality of messages in a time interval (e.g., one millisecond, one second, and/or the like). In some non-limiting embodiments or aspects, the device may transmit all of the plurality of messages in a second. For example, the device may transmit four messages in a second, twenty messages per second, forty messages per second, 372 messages per second, 1,488 messages per second, and/or the like. In some non-limiting embodiments or aspects, the device may transmit the plurality of messages at a power level during a time interval. For example, the device may transmit a plurality of messages, where each message is transmitted at the same power level during the time interval.

In some non-limiting embodiments or aspects, the device may transmit the plurality of messages during a time interval, where each message is transmitted at a specified power level. For example, the device may transmit a first message at a first power level during the time interval, a second message at a second power level during the time interval, a third message at a third power level during the time interval, and a fourth message at a fourth power level during the time interval. In some non-limiting embodiments or aspects, each of the power levels may be different. Additionally, or alternatively, one or more of the power levels may be different from one or more of the other power levels. In some non-limiting embodiments or aspects, the device may transmit a first plurality of messages during a first time interval and a second plurality of messages during a second time interval. For example, the device may transmit the first plurality of messages at one or more power levels, and the second plurality of messages during the second time interval, where the power level of one or more messages of the first plurality of messages corresponds to (e.g., matches) one or more power levels of one or more messages of the second plurality of messages.

In some non-limiting embodiments or aspects, the device may transmit the plurality of messages via a broadcast scheme. For example, the device may transmit the plurality of messages via a broadcast scheme using one or more omnidirectional antennae.

In some non-limiting embodiments or aspects, the device may transmit one or more messages via an ISM frequency band. For example, the device may transmit one or more messages via an ISM frequency band based on the device determining that communication via communication network 110 is unavailable.

In some non-limiting embodiments or aspects, the transmit state may include an alarm state associated with an individual in distress associated with a hazardous environment. In some non-limiting embodiments or aspects, a device that is in the alarm state may transmit a message (e.g., one or more messages, a plurality of messages, and/or the like) that includes an indication that an individual associated with the device (e.g., the individual carrying the device, the individual near the device, the individual assigned to the device, and/or the like) is in distress. Additionally, or alternatively, the transmit state may include a beacon state associated with a device located at a point of ingress and/or egress in the hazardous environment. In some non-limiting embodiments or aspects, a device that is in the beacon state may transmit a message (e.g., one or more messages, a plurality of messages, and/or the like) that includes an indication that the device is associated with a point of ingress and/or egress (e.g., the device is located near the point of ingress and/or egress, the device is located at the point of ingress and/or egress, the device is attached to the point of ingress and/or egress and/or the like) in the hazardous environment.

In some non-limiting embodiments or aspects, a device may transmit one or more messages while in a transmit state, the one or more messages including one or more of: data associated with a distance between a location of the device that is in the transmit state and another device that is in a search state, data associated with a tolerance (e.g., a confidence score) of a value associated with a distance between a location of the device that is in the transmit state and another device that is in a search state, data associated with a device heading of the device in the transmit state, data associated with a signal strength corresponding to a heading of the device in the transmit state, data associated with an identity of an individual operating a device at a location that is closer to the device in the transmit state than a location of another device, data associated with one or more identities of one or more individuals operating devices that are in a search state with a stronger (e.g., higher) value associated with a heading than one or more other individuals operating devices that are in a search state, and/or the like. Additionally, or alternatively, a device may transmit one or more messages while in a transmit state, the one or more messages including one or more of: data associated with an SCBA configured to be in communication with the device in the transmit state, data associated with the state of the device in the transmit state, data associated with an amount of time in which the device in the transmit state has been in the transmit state, data associated with a temperature measured at the device in the transmit state (e.g., via a temperature sensor included in the device), data associated with a location of the device in a transmit state, and/or the like.

In some non-limiting embodiments or aspects, safety device 102 may receive the plurality of messages transmitted by the device that is in the transmit state. For example, safety device 102 that receives the plurality of messages (e.g., transmitted by the device that is in the transmit state) may include safety device 102 that is in a search state. In some non-limiting embodiments or aspects, safety device 102 that is in the search state may receive a message (e.g., one or more messages, a plurality of messages, and/or the like) to determine the location of the device that is transmitting the message. In some non-limiting embodiments or aspects, safety device 102 that is in the search state may receive a message (e.g., one or more messages, a plurality of messages, and/or the like) that is to be used (e.g., by safety device 102, by local monitoring device 104, and/or by remote monitoring device 106) to determine a location of the device that transmitted the message.

In some non-limiting embodiments or aspects, the search state may include a search-for-individual state associated with searching for an individual in distress associated with a hazardous environment or a search-for-exit state associated with searching for a point of ingress and/or egress of a structure that may include the hazardous environment.

In some non-limiting embodiments or aspects, the transmit state may include a search-for-individual state associated with searching for an individual in distress associated with a hazardous environment. In some non-limiting embodiments or aspects, a safety device that is in the search-for-individual state may receive a message (e.g., one or more messages, a plurality of messages, and/or the like) that includes an indication that an individual associated with the device (e.g., the individual carrying the device, the individual near the device, the individual assigned to the device, and/or the like) is in distress. Additionally, or alternatively, the search state may include a search-for-exit state associated with searching for a point of ingress and/or egress in the hazardous environment. In some non-limiting embodiments or aspects, a safety device that is in the search-for-exit state may receive a message (e.g., one or more messages, a plurality of messages, and/or the like) that includes an indication that the device that transmitted the message is associated with a point of ingress and/or egress in the hazardous environment.

In some non-limiting embodiments or aspects, a device may transmit one or more messages while in a search state, the one or more messages including one or more of: data associated with an individual operating the device in the search state, data associated with a distance between a location of the device that is in the search state and another device that is in a search state or a transmit state, data associated with a tolerance (e.g., a confidence score) of a value associated with a distance between a location of the device that is in the search state and another device that is in a transmit state, data associated with a device heading of the device in the search state, data associated with a signal strength corresponding to a heading of the device in the search state, data associated with a link quality corresponding to a heading of the device in the search state, data associated with an identity of an individual operating a device at a location that is closer to the device in the search state than a location of another device, data associated with one or more identities of one or more individuals operating devices that are in a search state with a stronger (e.g., higher) value associated with a heading than one or more other individuals operating devices that are in a search state, and/or the like. Additionally, or alternatively, a device may transmit one or more messages while in a search state, the one or more messages including one or more of: data associated with an SCBA configured to be in communication with the device in the transmit state, data associated with the state of the device in the search state, data associated with an amount of time in which a device in the transmit state has been in the transmit state, data associated with a temperature measured by the device in the transmit state, data associated with a location of the device in a transmit state, data associated with the identity of the individual operating the device in the transmit state, and/or the like.

In some non-limiting embodiments or aspects, a device in a transmit state and/or a device in a search state may receive one or more messages from local monitoring device 104 and/or remote monitoring device 106. For example, a device in a transmit state and/or a device in a search state may receive one or more messages from local monitoring device 104 and/or remote monitoring device 106 including one or more of: data associated with a beacon device (e.g., a device that is in a beacon state, safety device 102 that is in a beacon state, and/or the like), data associated with an identity of an individual operating a device in a transmit state, data associated with an identity of one or more individuals operating one or more devices in a search state, data associated with a location of a device that is in a search state that is closer to the location of a device that is in a transmit state than a location of another device that is in a search state, data associated with one or more devices that have determined a value associated with a heading that is greater than one or more other devices, data associated with an indication to prompt one or more individuals to exit a structure, data associated with an indication to check in (e.g., provide input at a device to indicate that the individual operating the device is okay), and/or the like.

In some non-limiting embodiments or aspects, safety device 102 may receive one or more messages of the plurality of messages from the device (e.g., a beacon device, a radio, another safety device 102 in a transmit state, and/or the like) via a short-range wireless communication connection. For example, safety device 102 may receive the one or more messages from another safety device 102 via an antenna (e.g., a directional antenna) of safety device 102. In such an example, safety device 102 may be configured to receive the one or more messages over the short-range wireless communication connection.

In some non-limiting embodiments or aspects, safety device 102 may receive a first message at a first power level and a second message at a second power level from a device (e.g., another safety device 102 in the transmit state). For example, safety device 102 may receive the first message at the first power level and the first message may include data associated with a power level at which the first message was transmitted by the device. In this example, safety device 102 may receive a second message at a second power level from the device and the second message may include data associated with a power level at which the second message was transmitted by the device. In some non-limiting embodiments or aspects, the first power level at which the first message was transmitted may be different from the second power level at which the second message was transmitted. In some non-limiting embodiments or aspects, the first message and/or the second message may include data associated with a device identifier of the device that transmitted the message (e.g., a device identifier of safety device 102), data associated with a message identifier of the message (e.g., an identifier assigned to the message by the device that transmitted the message), and/or data associated with a time at which the message was transmitted (e.g., a time associated with a time zone, a time at which the device that transmitted the message transition from a first state (e.g., a default operating state where safety device 102 is not transmitting in a search state or in a transmit state but may periodically transmit a message that includes data associated with a location of safety device 102) to the transmit state, and/or the like), and/or the like. Additionally, or alternatively, the first message and/or the second message may include data associated with one or more safety devices 102 that are in a search state and/or data associated with one or more safety devices 102 that are searching for the device that transmitted the first message and/or the second message (e.g., data associated with a location of safety device 102 that is searching for the device that transmitted the message, data associated with a distance between a location of safety device 102 that is searching for the device that transmitted the message and a location of the device that transmitted the message, and/or the like).

In some non-limiting embodiments or aspects, safety device 102 may transition from a first state (e.g., a default operating state) to a second state (e.g., a transmit state) based on safety device 102 determining that one or more conditions exist. For example, safety device 102 may transition from the first state to the transmit state based on safety device 102 determining that safety device 102 has not moved for a period of time (e.g., thirty-seconds, one minute, and/or the like). In such an example, safety device 102 may determine that safety device 102 has not moved for a period of time based on data associated with movement of safety device 102 generated by an inertial measurement unit (IMU) of safety device 102 indicating that an individual operating safety device 102b is injured. Additionally, or alternatively, safety device 102 may transition to a beacon state based on input indicating that safety device 102 should transition to the beacon state. In such an example, safety device 102 may transition to the beacon state based on safety device 102 receiving input via an input component of safety device 102 (e.g., a button and/or the like) indicating that safety device 102 is at a point of ingress and/or egress (e.g., a location of a building such as a doorway, a door, a window, and/or the like) where one or more other safety devices 102 should navigate toward when entering and/or exiting a structure.

As shown in FIG. 3A, at step 304, process 300 may include determining alignment with a device based on the one or more RF signal parameters associated with each message. For example, safety device 102 may determine alignment with a device based on the one or more RF signal parameters associated with each message.

In some non-limiting embodiments or aspects, safety device 102 may determine an RF signal parameter of reception of a message. For example, safety device 102 may determine a power level at which a message was received, at a quality factor, and/or with a phase measurement. In some non-limiting embodiments or aspects, safety device 102 may determine data associated with an RF signal parameter of transmission. For example, safety device 102 may determine data associated with an RF signal parameter of transmission of a message based on data associated with a power level at which the message was transmitted that is included in the message.

In some non-limiting embodiments or aspects, safety device 102 may determine an indication of alignment with the device that transmitted a message. For example, safety device 102 may determine an indication of alignment of safety device 102 with the device that transmitted a message based on one or more messages received by safety device 102. In an example, safety device 102 may determine an indication of alignment of safety device 102 with the device that transmitted a message based on one or more RF signal parameters of reception of a message. In another example, safety device 102 may determine an indication of alignment of safety device 102 with the device that transmitted a message based on one or more RF signal parameters of transmission of a message. In some non-limiting embodiments or aspects, the indication of alignment may be an indication of whether a boresight of a directional antenna of safety device 102 is aligned with a primary node of radiation of an antenna (e.g., an omnidirectional antenna, a directional antenna, and/or the like) of a device (e.g., a safety device 102, another safety device 102, and/or the like) that transmitted a message. For example, the indication of alignment may be an indication of whether a boresight of a directional antenna of safety device 102 may be within +/−20° of an axis along the primary node of radiation (e.g., the boresight) of the antenna of the device that transmitted the message.

In some non-limiting embodiments or aspects, safety device 102 may determine a heading (e.g., a direction of travel) toward a device. For example, safety device 102 may determine a heading toward another safety device 102 that is in a transmit state. In such an example, the heading toward safety device 102 that is in the transmit state may be associated (e.g., may represent) with one or more of a direction, a path, and/or the like, that safety device 102 may travel along when advancing toward safety device 102 that is in the transmit state. In some non-limiting embodiments or aspects, safety device 102 may determine the heading toward safety device 102 that is in the transmit state based on the first message and/or the second message transmitted by safety device 102 that is in the transmit state. For example, safety device 102 may determine the heading toward safety device 102 that is in the transmit state based on one or more values of one or more parameters associated with the first message and/or the second message received by safety device 102. In some non-limiting embodiments or aspects, the one or more parameters associated with the first message and/or the second message received by safety device 102 may be associated with (e.g., represent) one or more signals received by safety device 102. For example, the one or more parameters associated with the first message and/or the second message may represent a signal quality (e.g., a link quality (e.g., a signal-to-noise ratio) associated with one or more signals, a received signal strength indicator (RSSI) associated with one or more signals, and/or the like) of the first and/or second message received by safety device 102. Additionally, or alternatively, the one or more parameters associated with the first message and/or the second message may represent a phase measurement associated with one or more signals of the first message and/or the second message received by safety device 102. Additionally, or alternatively, the one or more parameters associated with the first message and/or the second message may represent the first power level at which the first message and/or the second message was received by safety device 102, and/or the power level at which the first message and/or the second message was transmitted by safety device 102 that is in the transmit state. In some non-limiting embodiments or aspects, safety device 102 may determine the heading toward safety device 102 that is in the transmit state.

In some non-limiting embodiments or aspects, safety device 102 may determine the one or more values of one or more parameters associated with the first message received by safety device 102 and/or the second message received by safety device 102. For example, safety device 102 may determine the one or more values of the one or more parameters associated with the first message received by safety device 102 and/or the second message received by safety device 102 based on data associated with the one or more parameters generated by an antenna (e.g., by a transceiver module of an antenna such as a transceiver module of an omnidirectional antenna and/or a transceiver module of directional antenna). In some non-limiting embodiments or aspects, one or more processors of safety device 102 may receive the data associated with the one or more parameters generated by the antenna based on the antenna receiving the one or more messages.

In some non-limiting embodiments or aspects, safety device 102 may determine the first power level at which the first message was received based on data associated with a power level at which the first message was received and safety device 102 may determine the second power level at which the second message was received based on data associated with the second message. For example, safety device 102 may determine the first power level at which the first message was received based on safety device 102 receiving data from an antenna (e.g., from a transceiver module of an omnidirectional antenna or from a transceiver module of a directional antenna) of safety device 102 that is in the transmit state. In such an example, the data associated with the power level received from the antenna may represent the power level at which the first message was received (e.g., data associated with a received signal strength indicator (RSSI), and/or the like). Additionally, or alternatively, safety device 102 may determine the second power level at which the second message was received based on safety device 102 receiving data associated with the power level received from the antenna of safety device 102, the data associated with the power level at which the second message was received (e.g., data associated with an RSSI and/or the like).

In some non-limiting embodiments or aspects, safety device 102 may determine an indication of alignment with the device that transmitted a message based on a first alignment value and a second alignment value. For example, safety device 102 may determine an indication of alignment with the device that transmitted a message based on safety device 102 determining a first alignment value (e.g., a value representing a power level at which a message was received, a value representing an average of power levels at which a plurality of messages were received, a value representing a power level at which a message was received that was normalized (e.g., converted from one value to a corresponding (e.g., scaled) second value), a value representing an average of power levels at which a plurality of messages were received that was normalized, and/or the like) and a second alignment value. In such an example, the first alignment value may correspond to the first message and the second alignment value may correspond to the second message. In some non-limiting embodiments or aspects, safety device 102 may determine the first alignment value based on safety device 102 multiplying the first power level at which the first message was received by a first scaling factor. For example, safety device 102 may determine the first alignment value based on safety device 102*a* multiplying the first power level at which the first message was received by a first scaling factor, the first scaling factor corresponding to messages transmitted at the first power level by safety device 102 in the transmit state. Additionally, or alternatively, safety device 102*a* may determine the second alignment value based on safety device 102 multiplying the second power level at which the second message was received by a second scaling factor. For example, safety device 102 may determine the second alignment value based on safety device 102 multiplying the second power level at which the second message was received by a second scaling factor. In such an example, the second scaling factor may correspond to messages transmitted at the second power level by safety device 102 that is in the transmit state. In some non-limiting embodiments or aspects, safety device 102 may determine the alignment with the device that transmitted a message based on the first alignment value and the second alignment value. For example, safety device 102 may determine the alignment with the device that transmitted a message based on safety device 102 adding the first alignment value and the second alignment value to generate a value representing alignment toward safety device 102 that is in the transmit state.

In some non-limiting embodiments or aspects, safety device 102 may determine the heading toward safety device 102 that is in the transmit state based on a first heading value and a second heading value. For example, safety device 102 may determine the heading toward safety device 102 that is in the transmit state based on safety device 102 determining a first heading value (e.g., a value representing a power level at which a message was received, a value representing an average of power levels at which a plurality of messages were received, a value representing a power level at which a message was received that was normalized (e.g., converted from one value to a corresponding (e.g., scaled) second value), a value representing an average of power levels at which a plurality of messages were received that was normalized, and/or the like) and a second heading value. In such an example, the first heading value may correspond to the first message and the second heading value may correspond to the second message. In some non-limiting embodiments or aspects, safety device 102 may determine the first heading value based on safety device 102 multiplying the first power level at which the first message was received by a first scaling factor. For example, safety device 102 may determine the first heading value based on safety device 102*a* multiplying the first power level at which the first message was received by a first scaling factor, the first scaling factor corresponding to messages transmitted at the first power level by safety device 102 in the transmit state. Additionally, or alternatively, safety device 102a may determine the second heading value based on safety device 102 multiplying the second power level at which the second message was received by a second scaling factor. For example, safety device 102 may determine the second heading value based on safety device 102 multiplying the second power level at which the second message was received by a second scaling factor. In such an example, the second scaling factor may correspond to messages transmitted at the second power level by safety device 102 that is in the transmit state. In some non-limiting embodiments or aspects, safety device 102 may determine the heading toward safety device 102 that is in the transmit state based on the first heading value and the second heading value. For example, safety device 102 may determine the heading toward safety device 102 that is in the transmit state based on safety device 102 adding the first heading value and the second heading value to generate a value representing a heading toward safety device 102 that is in the transmit state.

In some non-limiting embodiments or aspects, safety device 102 may determine an indication of alignment with the device that transmitted a message based on the first alignment value, the second alignment value, and a third alignment value. For example, safety device 102 may determine the indication of alignment with the device that transmitted a message based on safety device 102 determining the first alignment value, the second alignment value, and a third alignment value. In such an example, safety device 102 may determine the first alignment value and the second alignment value as described above, and safety device 102 may determine the third alignment value based on safety device 102 determining that a third message was not received from the device that transmitted the first message and the second message. In some non-limiting embodiments or aspects, safety device 102 may determine that the third alignment value corresponds to a predetermined value (e.g., a value associated with a message that was not received, a value associated with a message that was not received at one or more power levels, and/or the like). For example, safety device 102 may determine that the third alignment value corresponds to a predetermined value based on safety device 102 determining that the third message was not received from the device that transmitted the first message and the second message. In some non-limiting embodiments or aspects, safety device 102 may determine the alignment with the device that transmitted a message based on safety device 102 adding the first alignment value, the second alignment value, and the third alignment value to generate a value representing an alignment toward the device that transmitted the first message and the second message.

In some non-limiting embodiments or aspects, safety device 102 may determine the heading toward the device in the transmit state based on the first heading value, the second heading value, and a third heading value. For example, safety device 102 may determine the heading toward safety device 102 that is in the transmit state based on safety device 102 determining the first heading value, the second heading value, and a third heading value. In such an example, safety device 102 may determine the first heading value and the second heading value as described above, and safety device 102 may determine the third heading value based on safety device 102 determining that a third message was not received from safety device 102 that is in the transmit state. In some non-limiting embodiments or aspects, safety device 102 may determine that the third heading value corresponds to a predetermined value (e.g., a value associated with a message that was not received, a value associated with a message that was not received at one or more power levels, and/or the like). For example, safety device 102 may determine that the third heading value corresponds to a predetermined value based on safety device 102 determining that the third message was not received from safety device 102 that is in the transmit state. In some non-limiting embodiments or aspects, safety device 102 may determine the heading toward safety device 102 based on safety device 102 adding the first heading value, the second heading value, and the third heading value to generate a value representing a heading toward safety device 102 that is in the transmit state.

In some non-limiting embodiments or aspects, safety device 102 may receive a third message at a third power level. For example, safety device 102 may receive a third message at a third power level from safety device 102 that is in the transmit state. In some non-limiting embodiments or aspects, the third message may include data associated with a power level at which the third message was transmitted by safety device 102.

In some non-limiting embodiments or aspects, safety device 102 may determine that the power level at which the third message was transmitted by the device that transmitted the first message and the second message corresponds to the power level at which the first message was transmitted by the device that transmitted the first message and the second message or the power level at which the second message was transmitted by the device that transmitted the first message and the second message. For example, safety device 102 may determine that the power level at which the third message was transmitted by the device that transmitted the first message and the second message corresponds to the power level at which the first message was transmitted by the device that transmitted the first message and the second message or the power level at which the second message was transmitted by the device that transmitted the first message and the second message based on safety device 102 comparing the power level at which the third message was transmitted to the power level at which the first message was transmitted or the power level at which the second message was transmitted. In some non-limiting embodiments or aspects, safety device 102 may determine that the third message is a duplicate message that corresponds to the first message or the second message. For example, safety device 102 may determine that the third message is a duplicate message that corresponds to the first message or the second message based on safety device 102 determining that the power level at which the third message was transmitted by the device that transmitted the first message and the second message corresponds to the power level at which the first message was transmitted by the device that transmitted the first message and the second message or the power level at which the second message was transmitted by the device that transmitted the first message and the second message. Additionally, or alternatively, safety device 102 may determine that the third message is a duplicate message that corresponds to the first message or the second message based on data associated with the first message, data associated with the second message, and/or data associated with the third message. For example, safety device 102 may compare the data associated with the first message, data associated with the second message, and/or data associated with the third message (e.g., data associated with the message identifiers included in the first message, the second message, and the third message) and safety device 102 may determine that the third message is a duplicate message that corresponds to the first message or the second message. In such an example, safety device 102 may determine that the third message is a duplicate message that corresponds to the first message or the second message based on safety device 102 determining that a portion or all of the data associated with the message identifiers included in the first message or the second message is associated (e.g., matches) with data included in the third message.

In some non-limiting embodiments or aspects, safety device 102 may determine the alignment with the device that transmitted a message independent of (e.g., without) the third message. For example, safety device 102 may determine the alignment with the device that transmitted a message independent of the third message, where the third message is a duplicate of the first message or the second message. In such an example, safety device 102 may determine the heading toward alignment with the device that transmitted a message based on safety device 102 determining that the third message is a duplicate of the first message or the second message. Additionally, or alternatively, safety device 102 may determine the alignment with the device that transmitted a message based on safety device 102 determining that the third message is a duplicate message of a message that was not received. For example, safety device 102 may determine the heading toward alignment with the device that transmitted a message based on safety device 102 determining that the third message corresponds to the first message or the second message, and safety device 102 determining that the first message or the second message that corresponds to the third message was not received. In such an example, safety device 102 may determine the alignment with the device that transmitted a message based on safety device 102 substituting the third message for the first message or the second message that corresponds to the third message.

In some non-limiting embodiments or aspects, safety device 102 may determine the heading toward the device in the transmit state independent of (e.g., without) the third message. For example, safety device 102 may determine the heading toward safety device 102 that is in the transmit state independent of the third message, where the third message is a duplicate of the first message or the second message. In such an example, safety device 102 may determine the heading toward safety device 102 that is in the transmit state based on safety device 102 determining that the third message is a duplicate of the first message or the second message. Additionally, or alternatively, safety device 102 may determine the heading toward safety device 102 that is in the transmit state based on safety device 102 determining that the third message is a duplicate message of a message that was not received. For example, safety device 102 may determine the heading toward safety device 102 that is in the transmit state based on safety device 102 determining that the third message corresponds to the first message or the second message, and safety device 102 determining that the first message or the second message that corresponds to the third message was not received. In such an example, safety device 102 may determine the heading toward safety device 102 that is in the transmit state based on safety device 102 substituting the third message for the first message or the second message that corresponds to the third message.

As shown in FIG. 3A, at step 306, process 300 may include outputting data associated with an indication of alignment with a device. For example, safety device 102 may output data associated with an indication of alignment with the device (e.g., another device, another safety device 102, a safety device 102 that is in a transmit state, and/or the like). In some non-limiting embodiments or aspects, safety device 102 may output data associated with a visual indication of alignment with the device (e.g., a binary value of whether safety device 102 is aligned with a device, a value from a range of values indicating whether safety device 102 is aligned with a device, and/or the like). Additionally, or alternatively, safety device 102 may output data associated with an audible indication of alignment with the device (e.g., a tone, a series of tones, a tone emitted at a first volume, a series of tones emitted at one or more volumes, and/or the like).

In some non-limiting embodiments or aspects, safety device 102*a* may output data associated with an indication of alignment with a device to cause one or more components of safety device 102*a* to provide the indication of alignment with a device via the one or more components. For example, safety device 102 may output data associated with an indication of alignment with a device to cause a display device of safety device 102 to display the indication of alignment with a device. Additionally, or alternatively, safety device 102 may output data with an indication of alignment with a device to cause a speaker (e.g., a speaker included in safety device 102, a speaker connected to safety device 102 via a wired and/or wireless connection, and/or the like) to generate the audible indication of the indication of alignment with a device.

In some non-limiting embodiments or aspects, safety device 102 may output data associated with an indication of the heading. For example, safety device 102 may output data associated with an indication of the heading. In such an example, safety device 102 may output data associated with an indication of the heading toward safety device 102 that is in the transmit state. In some non-limiting embodiments or aspects, safety device 102 may output data associated with a visual indication of the heading toward safety device 102 that is in the transmit state (e.g., an arrow representing a heading, a point along a plurality of points that represent a plurality of headings, a path representing a heading, and/or the like). Additionally, or alternatively, safety device 102 may output data associated with an audible indication of the heading toward safety device 102 that is in the transmit state (e.g., a tone, a series of tones, a tone emitted at a first volume, a series of tones emitted at one or more volumes, and/or the like).

In some non-limiting embodiments or aspects, safety device 102 may receive data associated with a distance between the location of safety device 102 and safety device 102 that is in the transmit state. For example, safety device 102 may receive data via a ranging subsystem, the data associated with a distance between the location of safety device 102 and the location of safety device 102 that is in the transmit state. In some non-limiting embodiments or aspects, the ranging subsystem may include one or more omnidirectional antennae (e.g., two omnidirectional antennae (e.g., two omnidirectional antennae that are in a cross-polarized configuration), two directional antennae, a radio comprising a phase measurement unit, a processor (e.g., a microprocessor) having instructions thereon configured to cause the processor to execute one or more algorithms to derive the distance, and/or the like). Examples of ranging subsystems may include the Decawaves DW1000 module, the Nanotrons NA5TR1, and/or the like. In some non-limiting embodiments or aspects, the ranging subsystem may incorporate a phase measurement unit built into a radio such as an 802.15.1 and/or an 802.15.4 radio. Continuous waveforms may be transmitted between the radios at discrete steps (e.g., 1 MHz) across a 2.4 GHz spectrum and the phase measurements may be determined the continuous wave (CW) of each discrete step. Once the discrete phases are read, a deconvolution method such as an IFFT, or a subspace based technique such as MUSIC algorithm, may be determined to derive the distance. In some non-limiting embodiments or aspects, antennae included in the ranging subsystem (e.g., one or more omnidirectional antennae and/or one or more omnidirectional antennae) may be configured to transmit and/or receive messages in a 2.4 GHz band.

In some non-limiting embodiments or aspects, safety device 102 may output data associated with an indication of the distance between the location of safety device 102 and the location of safety device 102 that is in the transmit state when safety device 102 outputs data associated with the indication of the heading. In some non-limiting embodiments or aspects, safety device 102a may output data associated with an indication of the heading to cause one or more components of safety device 102a to provide the indication of the heading via the one or more components. For example, safety device 102 may output data associated with an indication of the heading to cause a display device of safety device 102 to display the indication of the heading. Additionally, or alternatively, safety device 102 may output data with an indication of the heading to cause a speaker (e.g., a speaker included in safety device 102, a speaker connected to safety device 102 via a wired and/or wireless connection, and/or the like) to generate the audible indication of the heading toward the device in the transmit state.

Referring now to FIGS. 3B-3H, FIGS. 3B-3H are a flowchart of a non-limiting embodiment or aspect of an implementation 315 relating to a process for providing output to an individual associated with a hazardous environment. As illustrated in FIGS. 3B-3H, implementation 315 may include safety device 102a and safety device 102b.

Figure 3B:
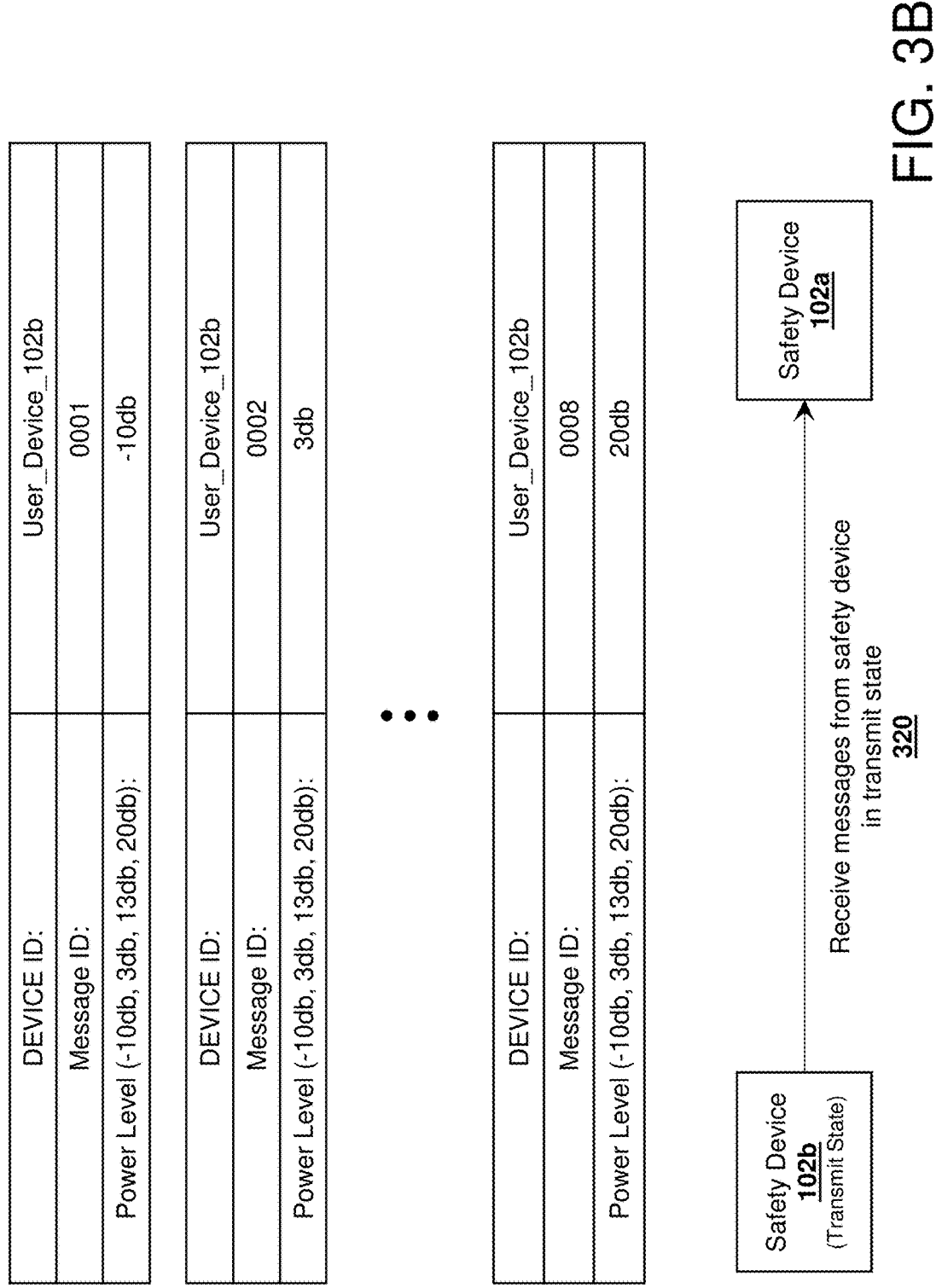

As shown by reference number 320 in FIG. 3B, safety device 102a may receive messages from safety device 102b while safety device 102b is in a transmit state. For example, safety device 102a may receive messages from safety device 102b while safety device 102b is in a transmit state via a round-robin scheme (e.g., a first message may be transmitted at a first power level, a second message may be transmitted at a second power level, a third message may be transmitted at a third power level, a fourth message may be transmitted at a fourth power level, and the one or more messages may include data associated with a device identifier (e.g., User_Device_102b) specifying that safety device 102b transmitted the first message, data associated with a first message identifier (e.g., 0001) identifying the first message from among a plurality of messages and/or specifying the message in a sequence from among the plurality of messages, and data associated with (e.g., representing) a power level (e.g., −10 db, 3 db, 13 db, 20 db, and/or the like) at which the first message was transmitted by safety device 102b). In some non-limiting embodiments or aspects, safety device 102a may receive messages from safety device 102b while safety device 102a is turned from a first position (e.g., a first hand-held position) to a second position (e.g., a second hand-held position). In some non-limiting embodiments or aspects, safety device 102a may determine that safety device 102b is within range of safety device 102b (e.g., is within an area associated with a radiation pattern of one or more antennae of safety device 102b). For example, safety device 102a may determine that safety device 102b is within range of safety device 102b and safety device 102a may determine an alignment based on messages received from safety device 102b while in range of safety device 102b. In another example, safety device 102a may determine that safety device 102b and safety device 102a may determine a heading based on messages received from safety device 102b while in range of safety device 102b. Additionally, or alternatively, safety device 102a may determine that safety device 102b is not within range of safety device 102b and safety device 102a may determine an alignment independent of messages received from safety device 102b while in range of safety device 102b. Additionally, or alternatively, safety device 102a may determine that safety device 102b is not within range of safety device 102b and safety device 102a may determine a heading independent of messages received from safety device 102b while in range of safety device 102b. In some non-limiting embodiments or aspects, safety device 102a may receive messages transmitted by safety device 102b in a round-robin scheme (e.g., first message transmitted at −10 db, second message transmitted at 3 db, third message transmitted at 13 db, fourth message transmitted at 20 db, fifth message transmitted at −10 db, and so on).

As shown by reference number 325 in FIG. 3C, safety device 102a may determine values associated with power levels at which each message was received. For example, safety device 102a may determine a power level (e.g., a power level represented as an RSSI value, a power level represented by an RSSI value from among a range of RSSI values (e.g., from −124 to 4), and/or the like) at which each message of a plurality of messages were received from safety device 102b. In such an example, safety device 102a may determine the power level at which each message of a plurality of messages were received from safety device 102b based on a transceiver module of safety device 102a generating data associated with the power level at which each message of the plurality of messages were received (e.g., data associated with a power level represented as an RSSI value, a power level represented by an RSSI value from among a range of RSSI values (e.g., from −124 to 4), and/or the like). In some non-limiting embodiments or aspects, safety device 102a may determine an ordering of the one or more messages received from safety device 102b. For example, safety device 102a may determine an ordering of messages based on the data associated with each message identifier included in each message. In such an example, the message identifiers may represent a counter, the counter numbering each message transmitted by safety device 102b in sequence.

Figure 3D:
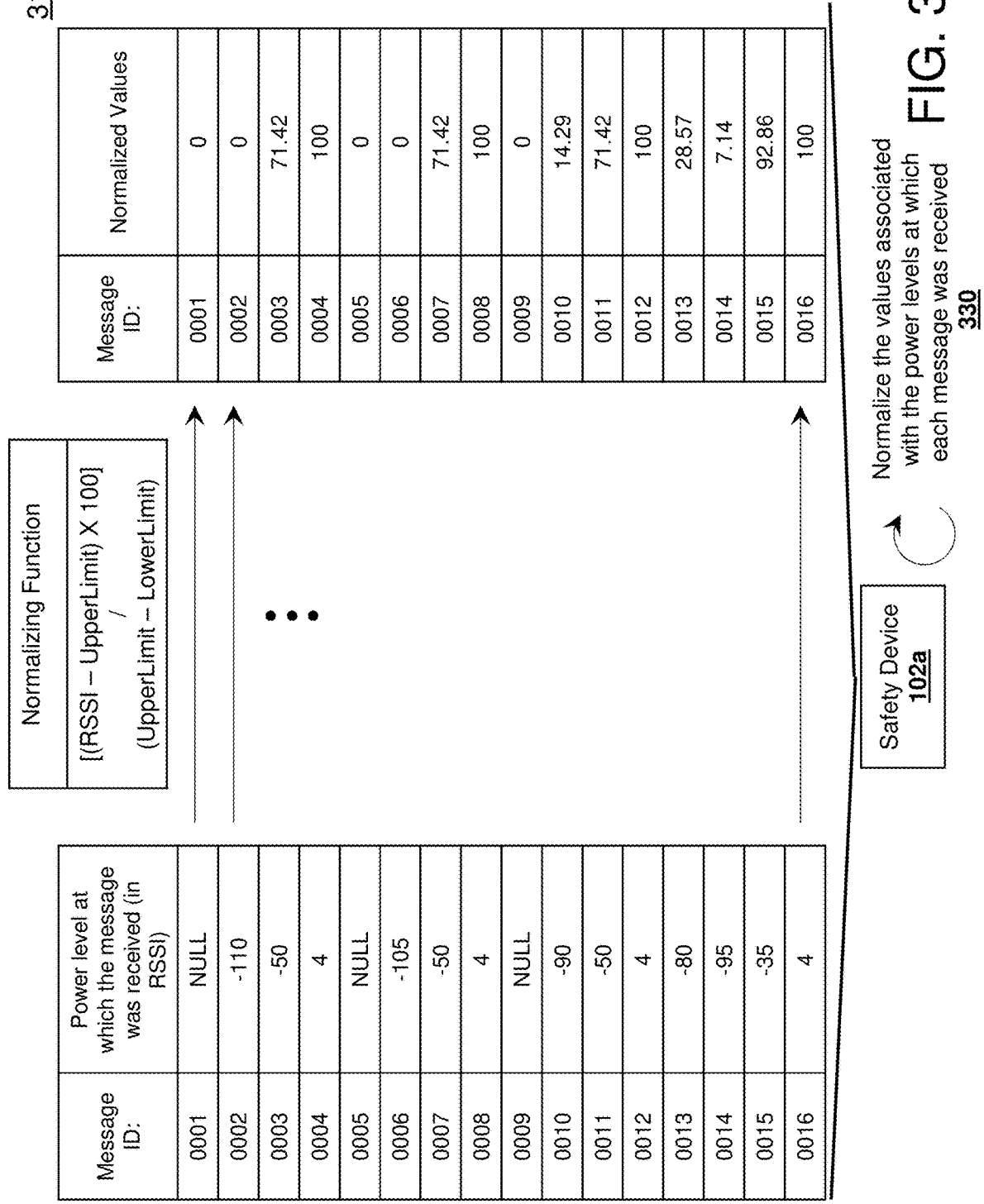

As shown by reference number 330 in FIG. 3D, safety device 102a may normalize the values associated with the power levels at which each message was received. For example, safety device 102a may normalize the values associated with the power levels at which each message was received using a normalizing function (e.g., [(RSSI−UpperLimit)×100]/(UpperLimit−LowerLimit)). In such an example, safety device 102a may normalize the values associated with the power levels at which each message was received using a normalizing function to generate normalized values for each message that was received. Additionally, or alternatively, safety device 102a may normalize the values associated with the power levels at which each message was received to generate normalized values for each message that was received based on one or more thresholds. For example, safety device 102a may normalize the values associated with the power levels at which each message was received to generate normalized values for each message that was received based on safety device 102a comparing the value associated with the power level at which the message was received to an upper limit (e.g., −30) and/or a lower limit (e.g., −100). In such an example, the upper limit may correspond to a predetermined normalized value (e.g., 100) and the lower limit may correspond to a predetermined normalized value (e.g., 0).

Figure 3E:
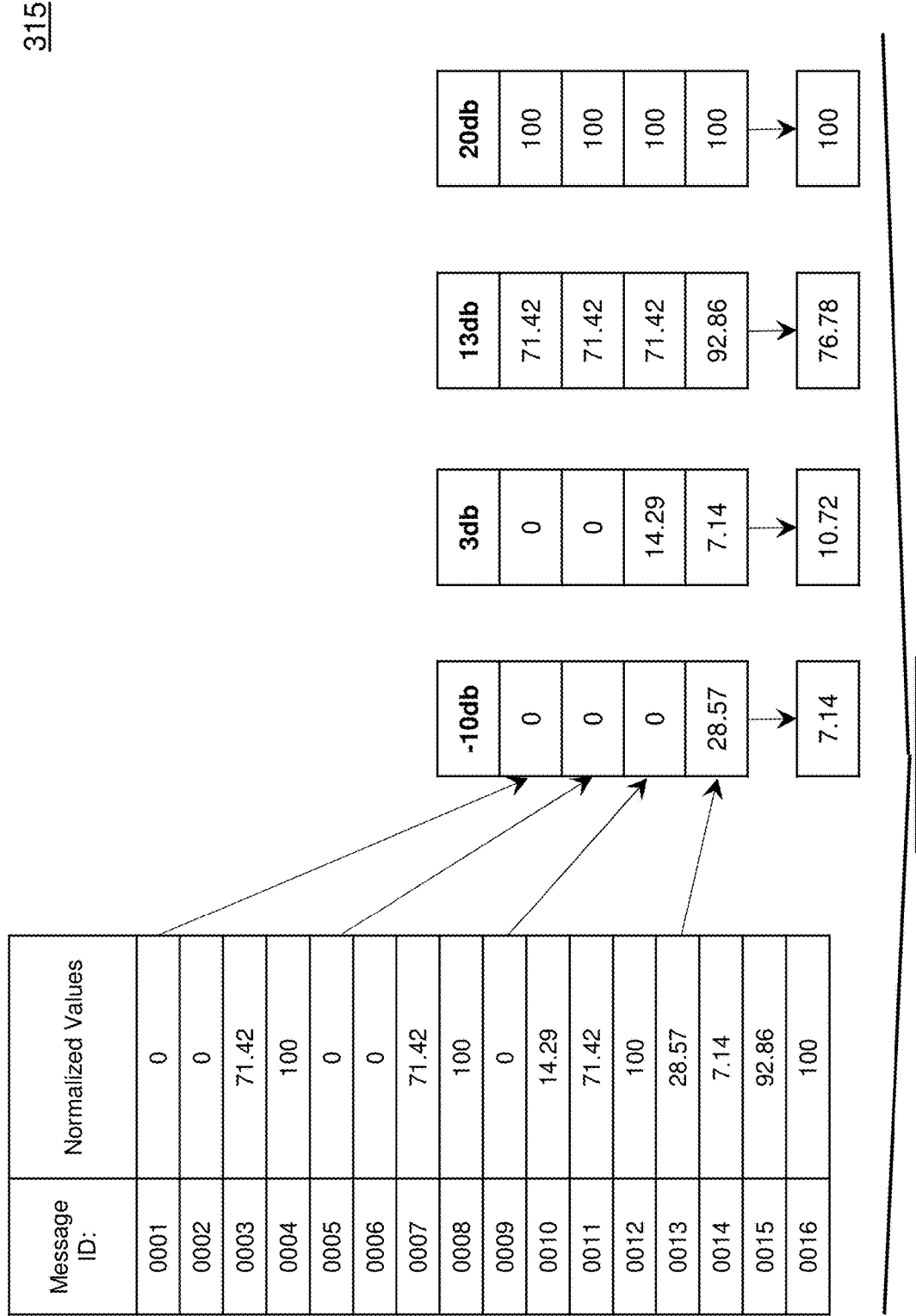

As shown by reference number 335 in FIG. 3E, safety device 102a may determine a rolling average for each power level. For example, safety device 102a may determine a rolling average of normalized values corresponding to messages transmitted to safety device 102a at one or more power levels. In an example, safety device 102a may determine a rolling average of normalized values corresponding to the last four messages (e.g., the last four −10 db messages, the last four 3 db messages, the last four 13 db messages, the last four 20 db messages, and/or the like).

Figure 3F:
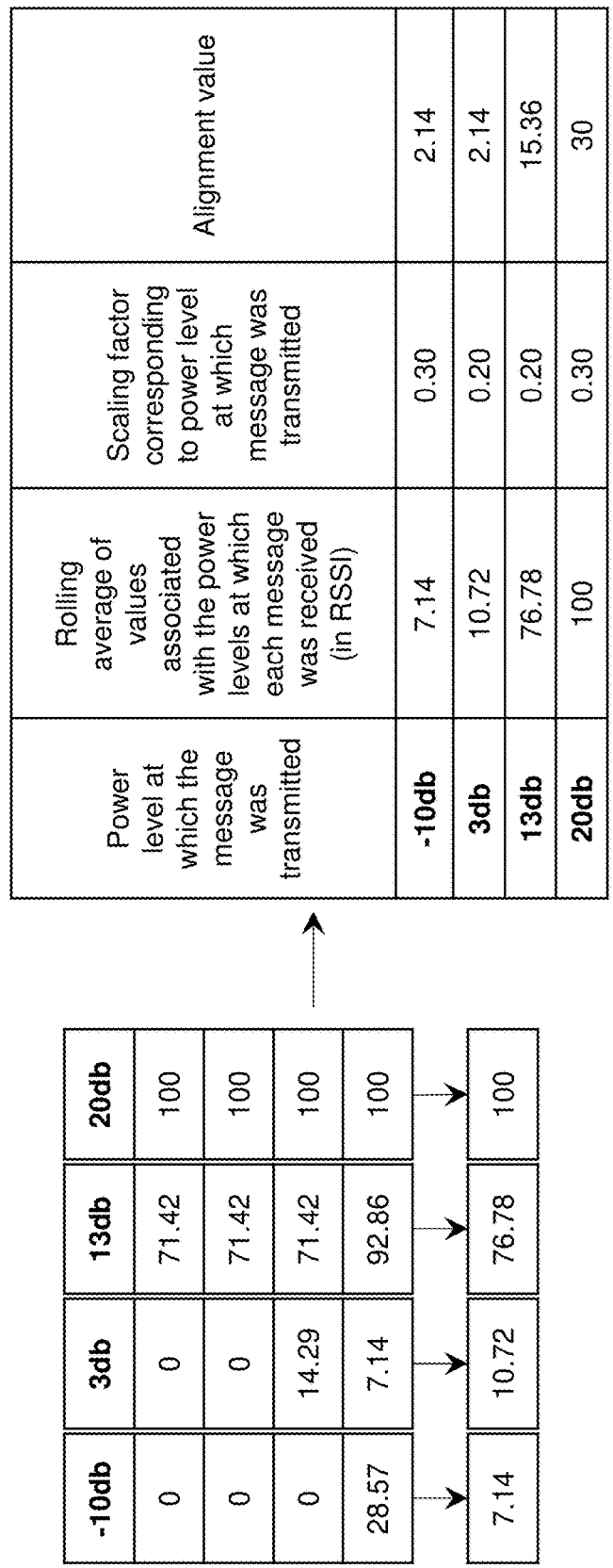

As shown by reference number 340 in FIG. 3F, safety device 102a may determine alignment values for each of the rolling averages of values associated with the power levels at which each message was received. For example, safety device 102a may determine alignment values for each of the rolling averages of values associated with the power levels at which each message was received based on safety device 102a multiplying the rolling average of normalized values corresponding to messages transmitted to safety device 102a at one or more power levels to scaling factors corresponding to the power level at which the message was transmitted by safety device 102b (e.g., −10 db=0.30; 3 db=0.20; 13 db=0.20; 20 db=0.30, and/or the like). In such an example, safety device 102a may determine the scaling factors based on safety device 102a comparing the data associated with the power level at which each message was transmitted by safety device 102b included in each message to a list of power levels corresponding to one or more scaling factors.

Figure 3G:
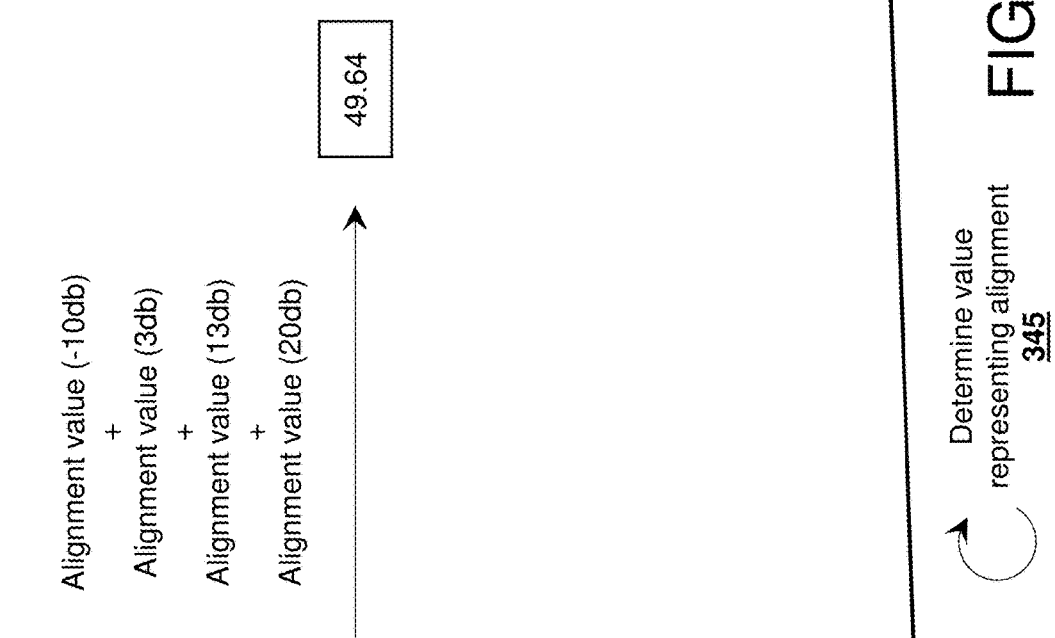
Figure 3G:

As shown by reference number 345 in FIG. 3G, safety device 102a may determine a value representing an alignment. For example, safety device 102a may add one or more alignment values corresponding to power levels at which one or more messages were transmitted to generate a value representing an alignment (e.g., 49.64).

Figure 3H:
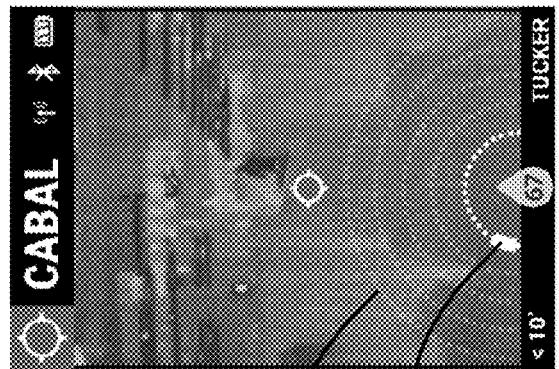

As shown by reference number 350 in FIG. 3H, safety device 102a may display an indication of the alignment. For example, safety device 102a may display an indication of the alignment toward safety device 102b via a display device of safety device 102a. In some non-limiting embodiments or aspects, safety device 102a may compare the value representing the alignment to one or more values in a lookup table. Where safety device 102a determines that the value representing the alignment corresponds to a value associated with an indication of the alignment included in the lookup table, safety device 102a may generate data associated with the indication of the alignment to transmit to a display device of safety device 102a. For example, safety device 102a may generate data associated with the indication of the alignment, the data configured to cause a display device to display the indication of the alignment, and safety device 102a may transmit the data associated with the indication of the alignment to the display device. Additionally, or alternatively, safety device 102a may display an indication of the heading toward safety device 102b via a display device of safety device 102a. In some non-limiting embodiments or aspects, safety device 102a may compare the value representing the heading to one or more values in a lookup table. Where safety device 102a determines that the value representing the heading corresponds to a value associated with an indication of the heading included in the lookup table, safety device 102a may generate data associated with the indication of the heading to transmit to a display device of safety device 102a. For example, safety device 102a may generate data associated with the indication of the heading, the data configured to cause a display device to display the indication of the heading, and safety device 102a may transmit the data associated with the indication of the heading to the display device.

Figure 4A:
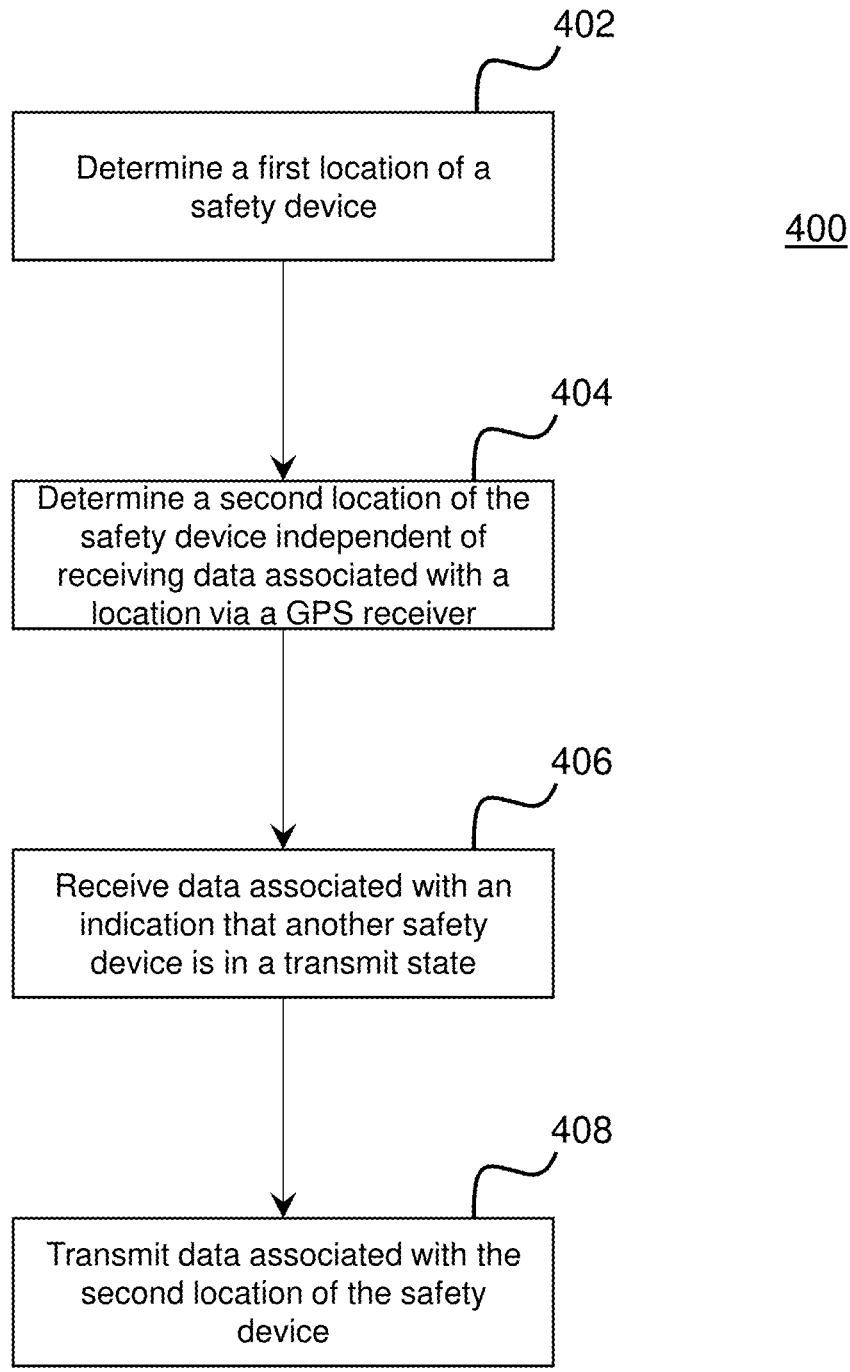
FIG. 4A is a flowchart of a non-limiting aspect or embodiment of a process for providing output to an individual associated with a hazardous environment.

Referring now to FIG. 4A, FIG. 4A is a flowchart of a non-limiting aspect or embodiment of a process 400 for providing output to an individual associated with a hazardous environment. In some non-limiting embodiments or aspects, one or more of the functions described with respect to process 400 may be performed (e.g., completely, partially, etc.) by safety device 102a. In some non-limiting embodiments or aspects, one or more of the steps of process 400 may be performed (e.g., completely, partially, and/or the like) by another device or a group of devices separate from and/or including safety device 102a, such as one or more devices of safety devices 102, local monitoring device 104, and/or remote monitoring device 106. For example, one or more steps of process 400 may be performed (e.g., completely, partially, and/or the like) by local monitoring device 104 and/or remote monitoring device 106 based on one or more devices of safety devices 102, local monitoring device 104, and/or remote monitoring device 106 transmitting a message, data that was included in a message, and/or the like, as described herein to local monitoring device 104 and/or remote monitoring device 106. Additionally, or alternatively, one or more steps of process 400 may be performed (e.g., completely, partially, and/or the like) by local monitoring device 104 and/or remote monitoring device 106 based on one or more devices of safety devices 102, local monitoring device 104, and/or remote monitoring device 106 transmitting (e.g., repeating the transmission) a message, data that was included in a message, and/or the like, received from one or more other devices of safety devices 102, local monitoring device 104, and/or remote monitoring device 106 as described herein to local monitoring device 104 and/or remote monitoring device 106.

As shown in FIG. 4A, at step 402, process 400 may include determining a first location of a safety device. For example, safety device 102 may determine a first location of safety device 102. In such an example, the first location of safety device 102 may include an absolute location of safety device 102. In some non-limiting embodiments or aspects, safety device 102 may determine an absolute location of safety device 102. For example, safety device 102 may determine an absolute location of safety device 102 based on safety device 102 receiving data associated with the location of safety device 102 generated by a global position system (GPS) receiver and/or data associated with the location of safety device 102 generated by an inertial measurement unit (IMU) included in safety device 102. In some non-limiting embodiments or aspects, the absolute location may be associated with a location of a device relative to the earth. As used herein, the term "absolute location" may refer to an estimated location of a device that is determined based on data associated with the location of a device generated by a GPS receiver and data associated with the location of the device generated by an IMU.

In some non-limiting embodiments or aspects, safety device 102 may receive data associated with a location of safety device 102. For example, safety device 102 may receive data associated with a location of safety device 102 generated by a GPS receiver. Additionally, or alternatively, safety device 102 may receive data associated with a location of safety device 102 generated by an IMU. In some non-limiting embodiments or aspects, the GPS receiver and/or the IMU may be included in safety device 102. In some non-limiting embodiments or aspects, safety device 102 may receive data associated with a location of safety device 102 generated by one or more components of an IMU independent of safety device 102 receiving data associated with a location of safety device 102 generated by one or more components of a GPS receiver.

In some non-limiting embodiments or aspects, safety device 102 may receive data associated with movement of safety device 102. For example, safety device 102 may receive data associated with the movement of safety device 102 from a first location to a second location. In some non-limiting embodiments or aspects, safety device 102 may not receive data associated with a location of safety device 102 generated by a GPS receiver as safety device 102 moves from the first location to the second location. For example, safety device 102 may not receive data associated with an absolute location of safety device 102 generated by the GPS receiver of safety device 102 as safety device 102 moves from the first location to the second location. In some non-limiting embodiments or aspects, safety device 102 may receive data associated with the movement of safety device 102 generated by the IMU. For example, safety device 102 may receive data associated with the movement of the device generated by the IMU of safety device 102. In some non-limiting embodiments or aspects, safety device 102 may receive data associated with movement of safety device 102 from the first position to the second position, where the second position is associated with a hazardous environment (e.g., a loss of signal environment in which data associated with the location of safety device 102 cannot be generated by a GPS receiver and/or communication network 110).

As shown in FIG. 4A, at step 404, process 400 may include determining a second location of a safety device independent of receiving data associated with a location generated by a GPS receiver. For example, safety device 102 may determine a second location of safety device 102. In such an example, the second location of safety device 102 may include a relative location of safety device 102. As used herein, the term "relative location" may refer to an estimated location of a device that is determined based on data associated with the location of a device generated by an IMU independent of data associated with the location of the device generated by a GPS receiver. In some non-limiting embodiments or aspects, safety device 102 may determine the second location of safety device 102 based on (e.g., during and/or after) safety device 102 receiving the data associated with movement of safety device 102. In such an example, safety device 102 may determine the second location of safety device 102 based on safety device 102 receiving the data associated with movement of safety device 102 generated by the IMU of safety device 102 independent of safety device 102 receiving data associated with movement of safety device 102 generated by the GPS receiver of safety device 102. In some non-limiting embodiments or aspects, safety device 102 may determine the second location of safety device 102 based on the first location of safety device 102 and the movement of safety device 102. For example, safety device 102 may determine the relative location of safety device 102 based on the first location of safety device 102 and the data associated with movement of safety device 102.

As shown in FIG. 4A, at step 406, process 400 may include receiving data associated with an indication that another safety device is in a transmit state. For example, safety device 102 may receive data associated with an indication that a safety device (e.g., the other safety device 102) is in a transmit state. In some non-limiting embodiments or aspects, safety device 102 may receive a message including data associated with the indication that safety device 102 that is in the transmit state. For example, safety device 102 may receive a message including data associated with a device identifier of safety device 102 that is in the transmit state, data associated with a message identifier associated with the message, data associated with a power level at which the message was transmitted by safety device 102 that is in the transmit state, data associated with the transmit state, data associated with a time at which the message was transmitted by safety device 102 that is in the transmit state, and/or the like. In some non-limiting embodiments or aspects, safety device 102 may receive the data associated with the indication that safety device 102 is in the transmit state from safety device 102 that is in the transmit state. Additionally, or alternatively, safety device 102 may receive the data associated with the indication that safety device 102 is in the transmit state from local monitoring device 104 and/or remote monitoring device 106. In some non-limiting embodiments or aspects, local monitoring device 104 may include another safety device (e.g., safety device 102 that is in a search state) configured to be in communication with safety device 102, safety device 102 that is in the transmit state, one or more other safety devices 102, remote monitoring device 106, and/or the like.

As shown in FIG. 4A, at step 408, process 400 may include transmitting data associated with the second location of a safety device. For example, safety device 102 may transmit data associated with the relative location of safety device 102. In some non-limiting embodiments or aspects, safety device 102 may transmit data associated with the second location of safety device 102 to safety device 102 that is in the transmit state, to safety devices 102 configured to be in communication with safety device 102 and/or safety device 102 that is in the transmit state, to local monitoring device 104, and/or to remote monitoring device 106. In some non-limiting embodiments or aspects, safety device 102 may transmit a message including the data associated with the second location of safety device 102. Additionally, or alternatively, safety device 102 may include data associated with a device identifier of safety device 102, data associated with a message identifier associated with the message, data associated with a device state of safety device 102, data associated with a time at which the message was transmitted, and/or the like in the message including the data associated with the second location of safety device 102.

In some non-limiting embodiments or aspects, where safety device 102 that received the data associated with the location of safety device 102 is the safety device 102 that is in the transmit state, safety device 102 may transmit a plurality of messages. For example, where safety device 102 is the safety device 102 that is in the transmit state, safety device 102 that is in the transmit state may transmit a plurality of messages comprising data associated with a power level at which the one or more messages were transmitted by safety device 102 that is in the transmit state and the data associated with the location of safety device 102 that is in the transmit state.

In some non-limiting embodiments or aspects, safety device 102 may receive a plurality of messages from safety device 102 that is in the transmit state and safety device 102 may transmit (e.g., repeat a portion or all of) data associated with the one or more messages received from safety device 102 that is in the transmit state and/or data associated with the location of safety device 102 to local monitoring device 104 and/or remote monitoring device 106. For example, safety device 102 may receive a plurality of messages from safety device 102 that is in the transmit state and safety device 102 may transmit data associated with the one or more messages received from safety device 102 that is in the transmit state and/or data associated with the location of safety device 102 to local monitoring device 104 via a short-range wireless communication connection and/or via communication network 110. Additionally, or alternatively, safety device 102 may receive a plurality of messages from safety device 102 that is in the transmit state and safety device 102 may transmit (e.g., repeat a portion or all of) data associated with the one or more messages received from safety device 102 that is in the transmit state and/or data associated with the location of safety device 102 to remote monitoring device 106 via communication network 110.

In some non-limiting embodiments or aspects, safety device 102a may receive data associated with safety device 102 that is not in a transmit state. For example, safety device 102 may receive data associated with safety device 102 that is not in a transmit state, where the data associated with safety device 102 that is not in a transmit state includes data associated with a location of safety device 102 that is not in a transmit state. In such an example, the location of safety device 102 that is not in a transmit state may be an absolute location or a relative location of safety device 102 that is not in a transmit state. In some non-limiting embodiments or aspects, safety device 102 may receive the data associated with safety device 102 that is not in a transmit state based on safety device 102 transmitting data associated with an indication that safety device 102 that is in the transmit state is, in fact, in the transmit state. For example, safety device 102 may receive the data associated with safety device 102 that is not in the transmit state based on safety device 102 that is in the transmit state transmitting one or more messages, the one or more messages including data associated with an indication that safety device 102 that is in the transmit state is, in fact, in the transmit state. In such an example, the data associated with the indication that safety device 102 is in the transmit state may be configured to cause safety device 102 that is not in a transmit state to transmit the data associated with safety device 102 that is not in a transmit state.

In some non-limiting embodiments or aspects, safety device 102 may receive data associated with a first distance, the first distance being a distance from a location of safety device 102 to a location of safety device 102 that is in a transmit state. For example, safety device 102 may receive data associated with a first distance from a location of safety device 102 to a location of safety device 102 that is in a transmit state via a ranging subsystem. In such an example, safety device 102 may receive data associated with a first distance from a location of safety device 102 to a location of safety device 102 that is in a transmit state via a ranging sensor while safety device 102 is in the transmit state. Additionally, or alternatively, safety device 102 may receive data associated with a second distance. For example, safety device 102 may receive data associated with a second distance, the second distance being a distance from a location of safety device 102 to a location of safety device 102 that is not in a transmit state. For example, safety device 102 may receive data associated with a second distance from a location of safety device 102 to a location of safety device 102 that is not in a transmit state via the ranging sensor. In some non-limiting embodiments or aspects, safety device 102 may determine the second distance. For example, safety device 102 may determine the second distance based on safety device 102 comparing the location of safety device 102 to the location of safety device 102 that is not in the transmit state.

In some non-limiting embodiments or aspects, safety device 102 may determine that the location of safety device 102 is closer to the location of the safety device 102 that is in the transmit state than the location of safety device 102 that is not in the transmit state. For example, safety device 102 may determine that the location of safety device 102 is closer to the location of safety device 102 that is in the transmit state than the location of safety device 102 that is not in the transmit state. In some non-limiting embodiments or aspects, safety device 102 may determine that the location of safety device 102 is closer to the location of safety device 102 that is in the transmit state than the location of safety device 102 that is not in the transmit state based on the first distance and the second distance. In some non-limiting embodiments or aspects, safety device 102 may determine that the location of the safety device 102 is closer to the location of safety device 102 that is in the transmit state than the location of safety device 102 that is not in the transmit state based on safety device 102 comparing the first distance and the second distance. For example, safety device 102 may compare the first distance and the second distance, and safety device 102 may determine that the first distance is greater than, equal to, and/or less than the second distance. In an example, safety device 102 may determine that the first distance is less than the second distance and safety device 102 may determine that the location of safety device 102 is closer to the location of safety device 102 that is in the transmit state as opposed to the location of safety device 102 that is not in the transmit state. Additionally, or alternatively, safety device 102 may determine that the first distance is greater than and/or equal to the second distance and safety device 102 may determine that the location of safety device 102 is farther to the location of safety device 102 that is in the transmit state as opposed to the location of safety device 102 that is not in the transmit state.

In some non-limiting embodiments or aspects, safety device 102 may cause a safety device to transition to a search state. For example, safety device 102 may cause safety device 102 and/or safety device 102 that is not in the transmit state to transition to a search state. In such an example, safety device 102 may cause safety device 102 to transition to a search state based on safety device 102 determining that the location of safety device 102 is closer to the location of safety device 102 that is in the transmit state as opposed to the location of safety device 102 that is not in the transmit state. Additionally, or alternatively, safety device 102 may cause safety device 102 that is not in the transmit state to transition to a search state. For example, safety device 102 may cause safety device 102 that is not in a transmit state to transition to a search state based on safety device 102 determining that the location of safety device 102 is farther to the location of safety device 102 that is in the transmit state as opposed to the location of safety device 102 that is not in the transmit state. In such an example, safety device 102 may transmit data associated with transitioning safety device 102 that is not in the transmit state to the search state, the data configured to cause safety device 102 that is not in the transmit state to transition to the search state.

In some non-limiting embodiments or aspects, safety device 102 may be configured to transition safety device 102 to a search state based on data associated with the indication that safety device 102 that is in a transmit state is, in fact, in a transmit state. For example, safety device 102 may be configured to transition safety device 102 to a search state based on safety device 102 receiving the data associated with an indication that safety device 102 that is in the transmit state is, in fact, in a transmit state. In some non-limiting embodiments or aspects, when in the search state, safety device 102 may be configured to broadcast one or more messages including data associated with the location of safety device 102 and/or the first distance between the location of safety device 102 and the location of safety device 102 that is in the transmit state. For example, when in the search state, safety device 102 may be configured to broadcast one or more messages including data associated with the location of safety device 102 (e.g., a relative location of safety device 102 and/or an absolute location of safety device 102). In such an example, safety device 102 may additionally, or alternatively, include data associated with the first distance between the location of safety device 102 and the location of safety device 102 that is in the transmit state.

In some non-limiting embodiments or aspects, safety device 102 may receive data associated with a location of safety device 102 that is in a transmit state and safety device 102 may receive data associated with a location of local monitoring device 104. For example, safety device 102 may receive data associated with a relative location and/or an absolute location of safety device 102 that is in a transmit state and safety device 102 may receive data associated with a relative location and/or an absolute location of local monitoring device 104. In such an example, safety device 102 may receive data associated with a distance from the location of safety device 102 that is in the transmit state to the location of safety device 102 and/or a distance from local monitoring device 104 to the location of safety device 102. In some non-limiting embodiments or aspects, safety device 102 may determine an area in which safety device 102 that is in the transmit state is located. For example, safety device 102 may determine an area in which safety device 102 that is in the transmit state is located based on the location of safety device 102 that is in the transmit state, the location of safety device 102, and/or the location of local monitoring device 104. Additionally, or alternatively, safety device 102 may determine an area in which safety device 102 that is in the transmit state is not located. For example, safety device 102 may determine an area in which safety device 102 that is in the transmit state is not located based on the location of safety device 102 that is in the transmit state, the location of safety device 102, and/or the location of local monitoring device 104. In some non-limiting embodiments or aspects, local monitoring device 104 may include another safety device 102 that is configured to be in communication with one or more of safety devices 102. Additionally, or alternatively, local monitoring device 104 may include a beacon device (e.g., another safety device 102 that is in a beacon state). For example, local monitoring device 104 may be configured to be in communication with one or more of safety devices 102 that are in a beacon state. In such an example, one or more safety devices (e.g., one or more of safety devices 102) may be configured to transition to an exit state and provide output via one or more components of the one or more safety devices in a manner similar to a safety device in a search state to guide the safety device 102 in the exit state toward the safety device in the beacon state.

In some non-limiting embodiments or aspects, safety device 102 may receive data associated with a location of safety device 102, data associated with a location of safety device 102 that is in a transmit state, and/or data associated with a location of local monitoring device 104, and safety device 102 may generate a map. For example, safety device 102 may receive data associated with a location of safety device 102 (e.g., an absolute location and/or a relative location of safety device 102a), data associated with a location of safety device 102 that is in a transmit state (e.g., data associated with an absolute location and/or a relative location of safety device 102 that is in a transmit state), and/or data associated with a location of local monitoring device 104 (e.g., an absolute location and/or a relative location of local monitoring device 104), and safety device 102 may generate a map based on the location of one or more of safety device 102, safety device 102 that is in a transmit state, and/or local monitoring device 104. In some non-limiting embodiments or aspects, safety device 102 may receive data associated with a distance between the location of safety device 102 and the location of safety device 102 that is in the transmit state, a distance between the location of safety device 102 and the location of local monitoring device 104, and/or a distance between the location of safety device 102 that is in the transmit state and the location of local monitoring device 104. For example, safety device 102 may receive data associated with a distance between the location of safety device 102 and safety device 102 that is in the transmit state, a distance between the location of safety device 102 and the location of local monitoring device 104 and/or a distance between safety device 102 that is in the transmit state and the location of local monitoring device 104, and safety device 102 may generate the map based on the distance between the location of safety device 102 and safety device 102 that is in the transmit state, the distance between the location of safety device 102 and the location of local monitoring device 104 and/or the distance between safety device 102 that is in the transmit state and the location of local monitoring device 104. In such an example, safety device 102 may receive the data associated with a distance between the location of safety device 102 and the location of safety device 102 that is in the transmit state, a distance between the location of safety device 102 and the location of local monitoring device 104, and/or a distance between the location of safety device 102 that is in the transmit state and the location of local monitoring device 104 in addition to, or alternative to, the data associated with the location of safety device 102, the data associated with the location of safety device 102 that is in the transmit state, and/or the data associated with the location of local monitoring device 104.

Referring now to FIGS. 4B-4H, FIGS. 4B-4H are diagrams of a non-limiting embodiment or aspect of an implementation 415 relating to a process for providing output to an individual associated with a hazardous environment. As illustrated in FIGS. 4B-4H, implementation 415 may include safety device 102a, safety device 102b, local monitoring device 104, and remote monitoring device 106.

Figure 4B:
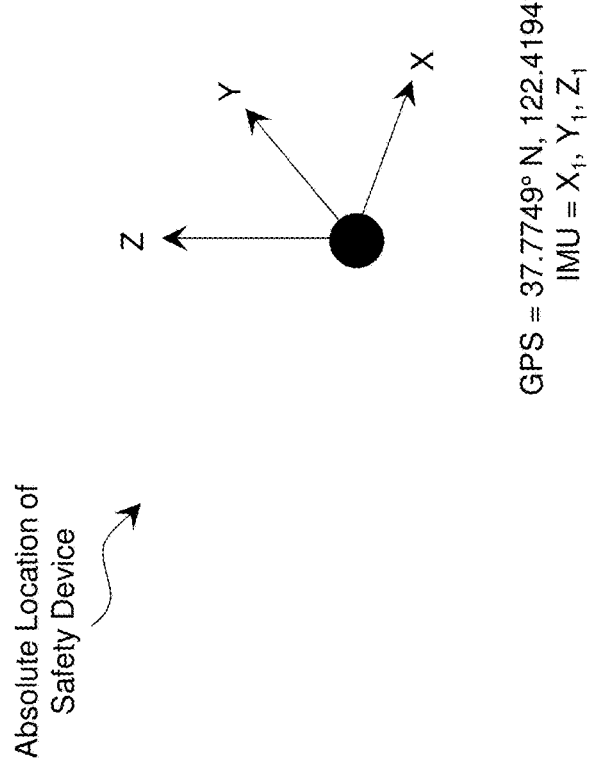

As shown in FIG. 4B, a safety device (e.g., safety device 102a) may be located at an absolute location. For example, safety device 102a may be located at an absolute location, the absolute location determined based on data associated with a location generated by a GPS receiver (e.g., latitude and longitude coordinates) and data associated with a location generated by an IMU (e.g., X, Y, and Z values representing an orientation of the safety device relative to a vector representing magnetic north and a vector representing gravity, data associated with a Quaternion or Euler Vector, and/or the like).

Figure 4C:
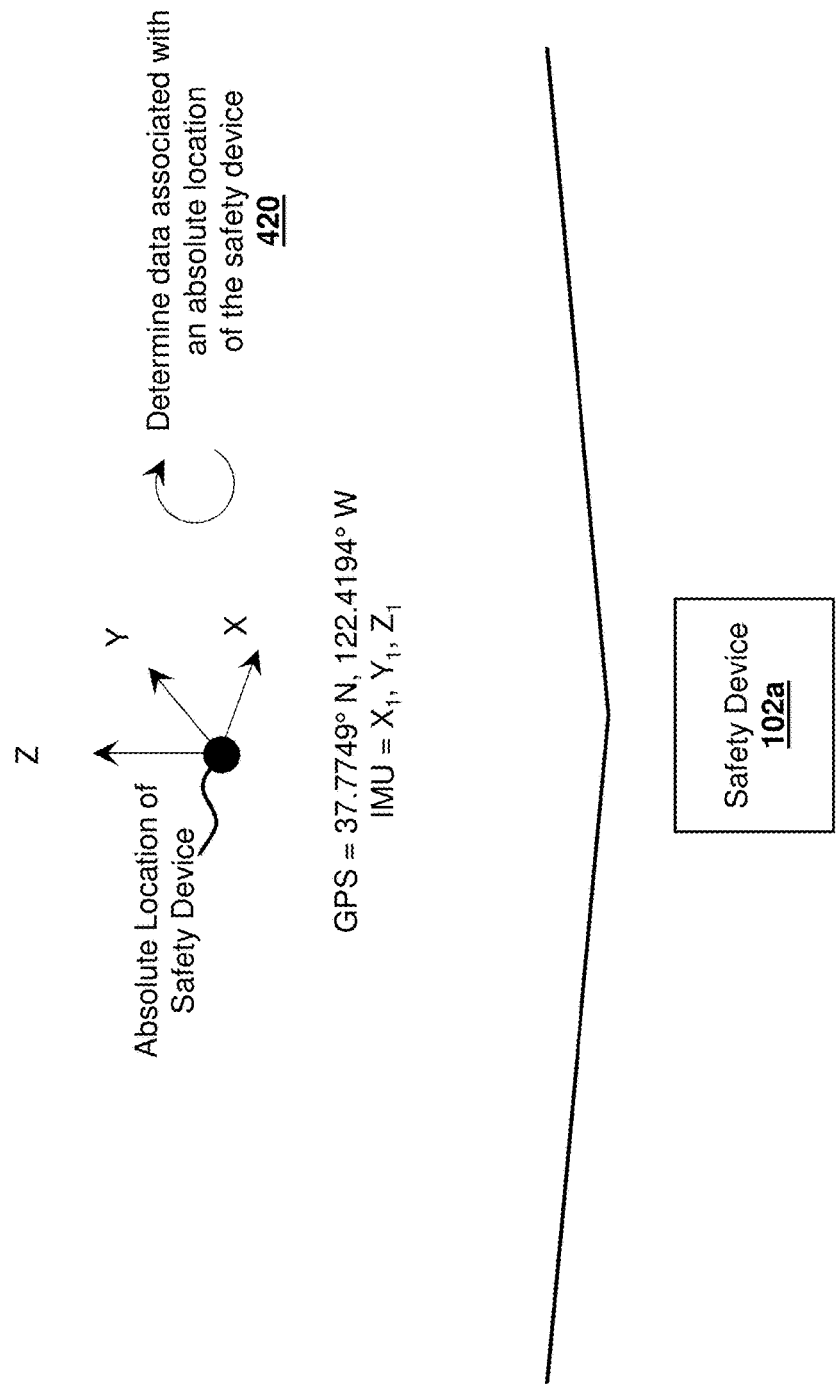

As shown by reference number 420 in FIG. 4C, safety device 102a may determine data associated with an absolute location of the safety device. For example, safety device 102a may determine data associated with an absolute location of safety device 102a based on data associated with the location of safety device 102a (e.g., 37.7749° N, 122.4194° W) generated by a global position system (GPS) receiver included in safety device 102a and safety device 102a may determine the data associated with the absolute location of safety device 102a based on data associated with the location of safety device 102a (e.g., X, Y, Z measurements) generated by an inertial measurement unit (IMU) included in safety device 102a.

Figure 4D:
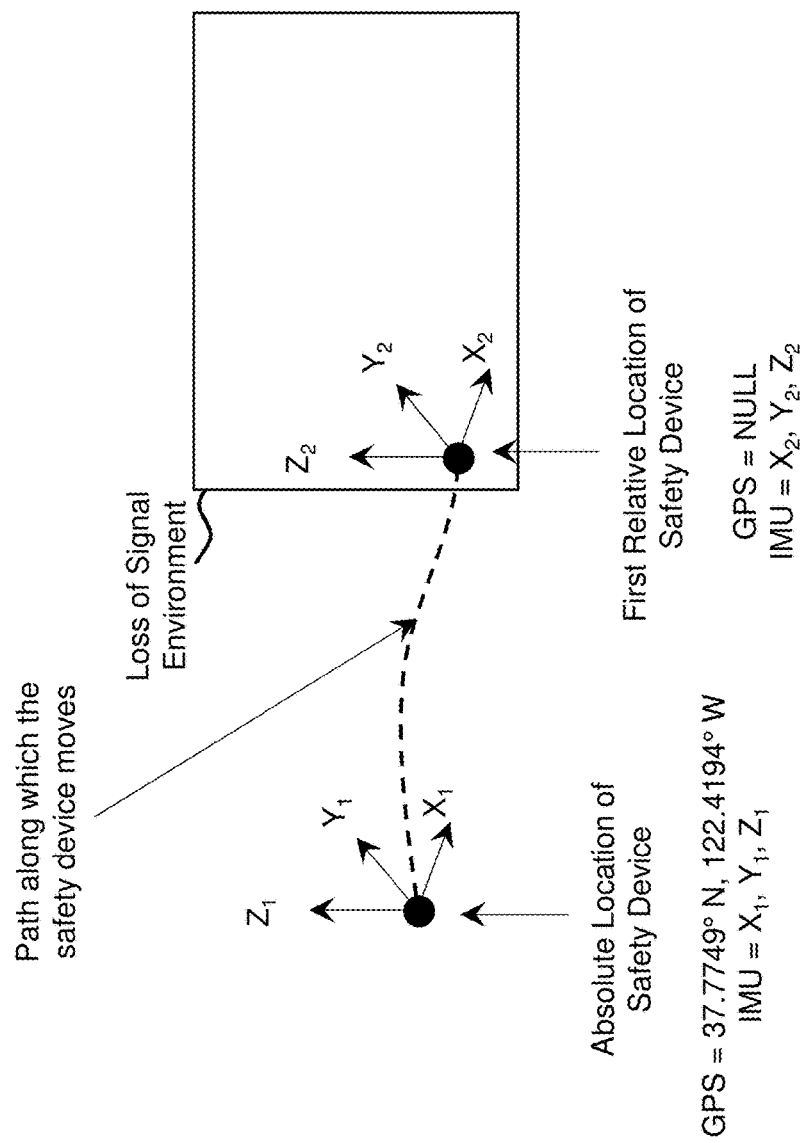

As shown in FIG. 4D, a safety device (e.g., safety device 102a) may be at a first relative location. For example, a safety device may be at a first relative location after the safety device is moved from the absolute location of the safety device to the first relative location. The first relative location may be a location different from an absolute location. In such an example, a safety device at the first relative location may be in a loss of signal environment, and safety device 102a may not be able to receive data associated with the location of the safety device generated by a GPS receiver. In this example, safety device 102a may determine the first relative location based on data associated with the location of safety device 102a generated by the IMU included in safety device 102a independent of data associated with the location of safety device 102a generated by the GPS receiver included in safety device 102a.

Figure 4E:
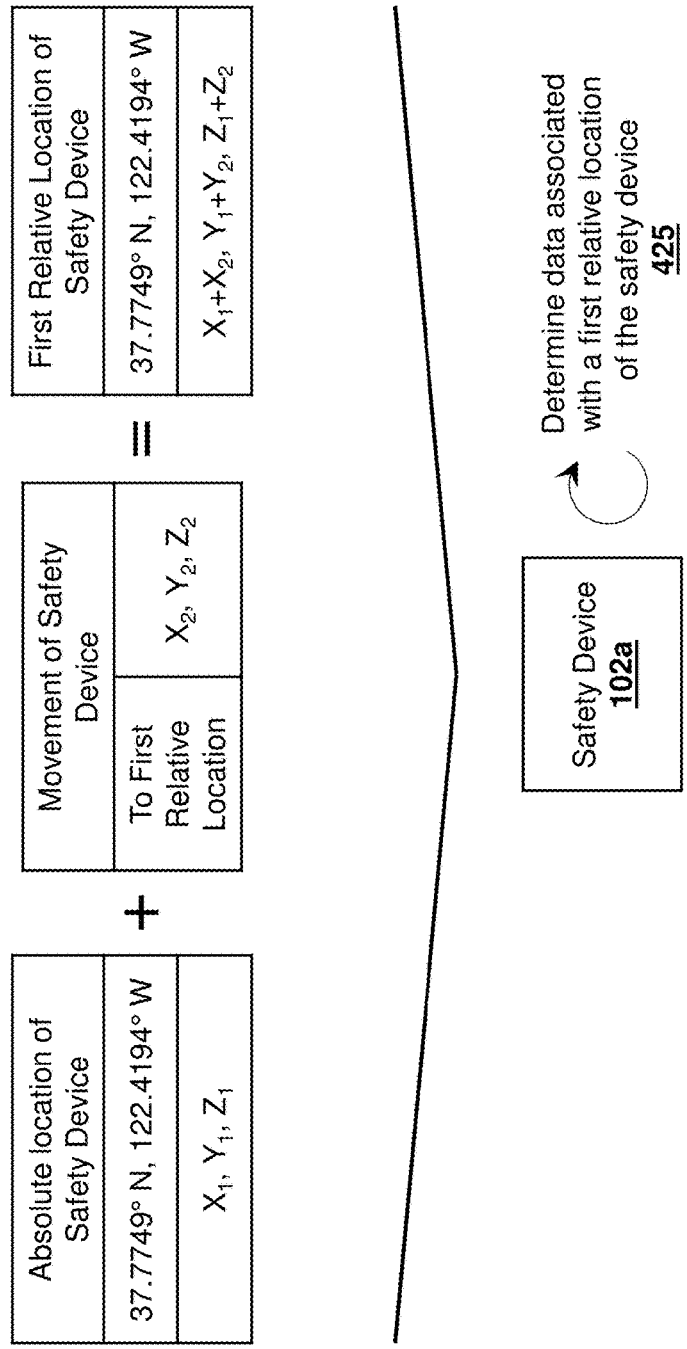

As shown by reference number 425 in FIG. 4E, safety device 102a may determine data associated with a first relative location of the safety device. For example, safety device 102a may determine data associated with the first relative location of safety device 102a based on data associated with movement of safety device 102a generated by the IMU of safety device 102a. In such an example, safety device 102a may determine data associated with the first relative location of safety device 102a independent of data generated by a GPS receiver of safety device 102a (e.g., when safety device 102a enters a building).

Figure 4F:
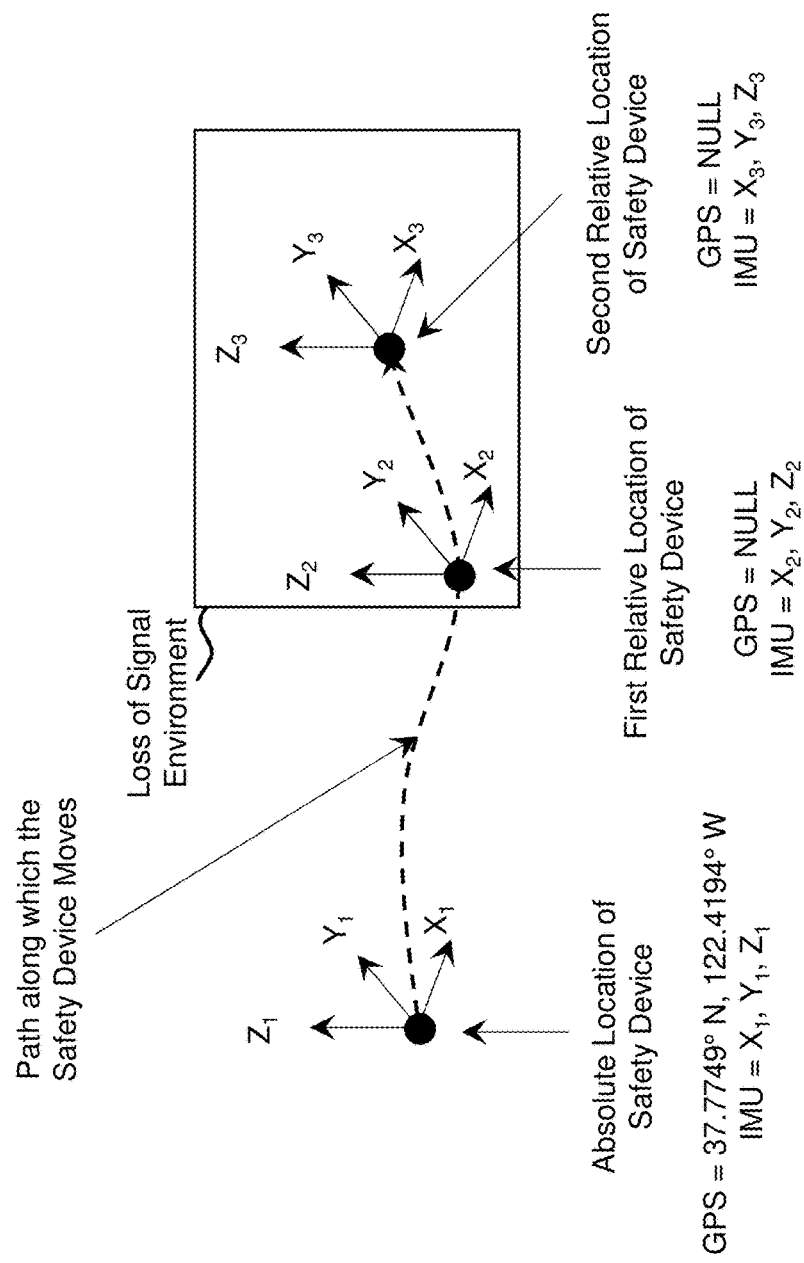

As shown in FIG. 4F, a safety device (e.g., safety device 102a) may be at a second relative location. For example, a safety device 102a may be at a second relative location after the safety device is moved from the first relative location of the safety device to the second relative location. The second relative location may be a location different from the first relative location and/or the absolute location. In such an example, a safety device at the second relative location may be in a loss of signal environment, and may not be able to receive data associated with the location of the safety device generated by GPS receiver.

As shown by reference number 430 in FIG. 4G, safety device 102a may determine data associated with a second relative location of the safety device. For example, safety device 102a may determine data associated with the second relative location of safety device 102a based on data associated with movement of safety device 102a generated by the IMU of safety device 102a. In such an example, safety device 102a may determine data associated with the second relative location of safety device 102a independent of data received generated by a GPS receiver of safety device 102a (e.g., when safety device 102a enters a building).

Figure 4H:
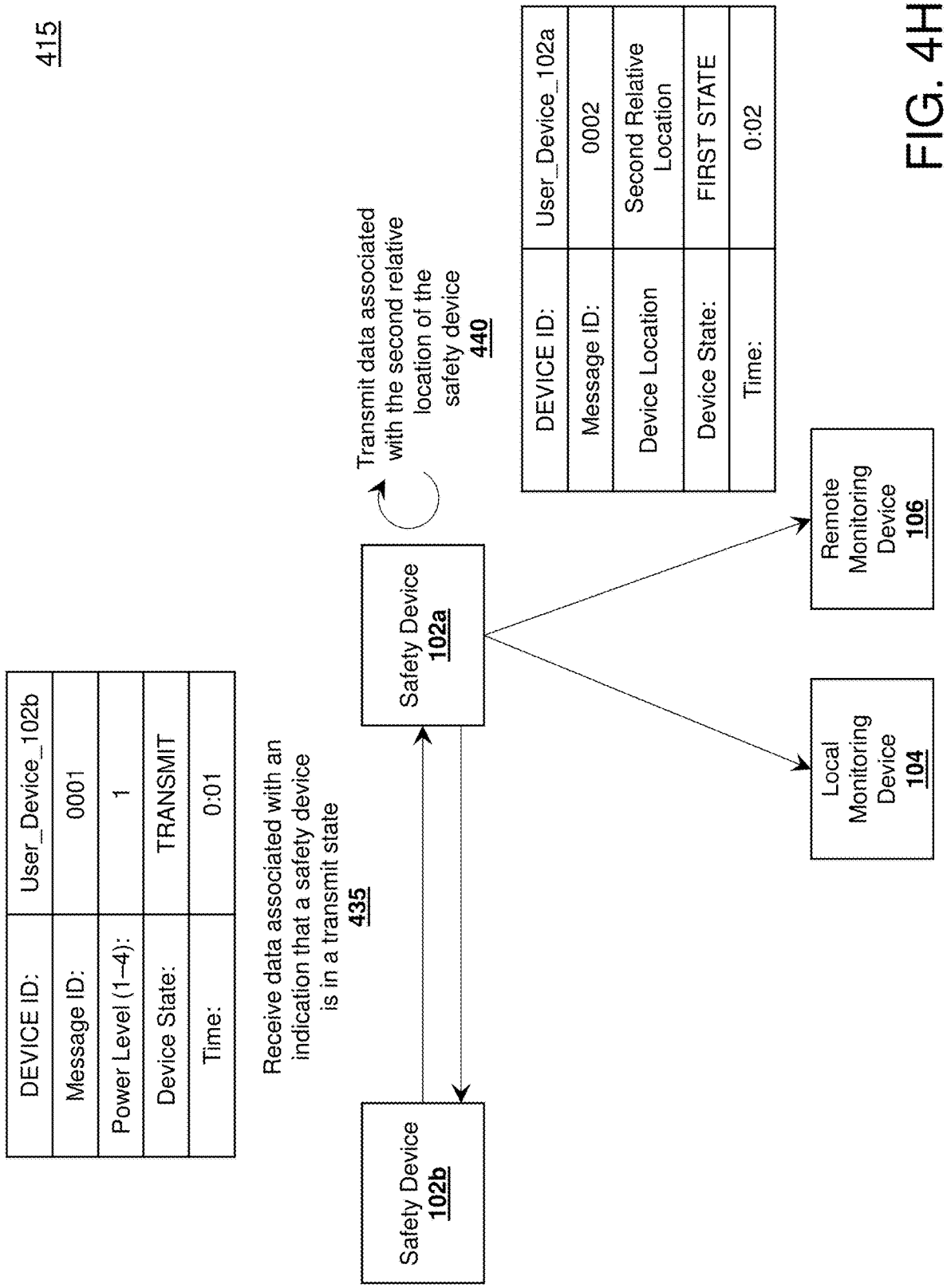

As shown by reference number 435 in FIG. 4H, safety device 102a may receive data associated with an indication that a safety device is in a transmit state. For example, safety device 102a may receive data associated with an indication that safety device 102b is in a transmit state while safety device 102a is not receiving data generated by the GPS receiver of safety device 102a. In some non-limiting embodiments or aspects, the data associated with an indication that safety device 102b is in a transmit state may be included in a message transmitted by safety device 102b. For example, safety device 102b may transmit a message associated with a device identifier (e.g., User_Device_102b) of safety device 102b in the transmit state, data associated with a message identifier (e.g., 0001) associated with the message, data associated with a power level (e.g., 1) at which the message was transmitted by safety device 102b in the transmit state, data associated with the transmit state (a string specifying the transmit state such as, for example, ("TRANSMIT") of safety device 102b in the transmit state, data associated with a time (e.g., 0:01) at which the message was transmitted by safety device 102b, data associated with a distance between the location of safety device 102a and the location of safety device 102b, and/or the like.

As shown by reference number 440 in FIG. 4H, safety device 102a may transmit data associated with the second relative location of the safety device. For example, safety device 102a may transmit data associated with the second relative location of safety device 102a based on safety device 102a receiving the data associated with an indication that safety device 102b is in a transmit state. In some non-limiting embodiments or aspects, safety device 102a may transmit data associated with the second relative location of safety device 102a to safety device 102b, another safety device (e.g., one or more of safety devices 102c-102n), local monitoring device 104, and/or remote monitoring device 106. In some non-limiting embodiments or aspects, the data associated with the second relative location of safety device 102a may include a device identifier (e.g., User_Device_102a) of safety device 102a, data associated with a message identifier (e.g., 0002) associated with the message, data associated with a location (e.g., data specifying the "Second Relative Location"), data associated with a device state (e.g., "FIRST STATE") of safety device 102a, data associated with a time (e.g., 0:02) at which the message was transmitted by safety device 102a, and/or the like.

Figure 5A:
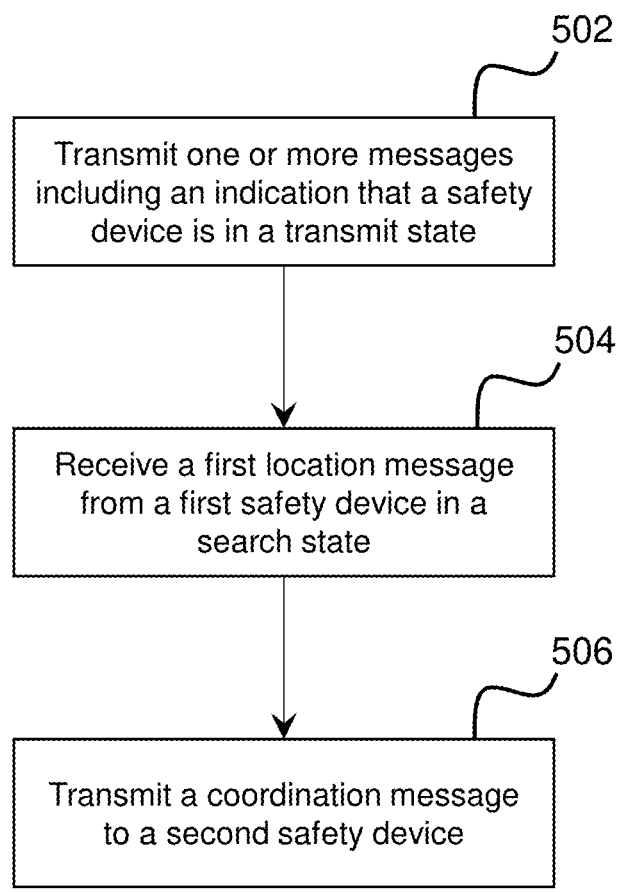
FIG. 5A is a flowchart of a non-limiting aspect or embodiment of a process for providing output to an individual associated with a hazardous environment.

Referring now to FIG. 5A, illustrated is a flowchart of a non-limiting aspect or embodiment of a process 500 for providing output to an individual associated with a hazardous environment. In some non-limiting embodiments or aspects, one or more of the functions described with respect to process 500 may be performed (e.g., completely, partially, etc.) by safety device 102a. In some non-limiting embodiments or aspects, one or more of the steps of process 500 may be performed (e.g., completely, partially, and/or the like) by another device or a group of devices separate from and/or including safety device 102a, such as one or more devices of safety devices 102b, local monitoring device 104, and/or remote monitoring device 106. For example, one or more steps of process 500 may be performed (e.g., completely, partially, and/or the like) by local monitoring device 104 and/or remote monitoring device 106 based on one or more devices of safety devices 102, local monitoring device 104, and/or remote monitoring device 106 transmitting a message, data that was included in a message, and/or the like, as described herein to local monitoring device 104 and/or remote monitoring device 106. Additionally, or alternatively, one or more steps of process 500 may be performed (e.g., completely, partially, and/or the like) by local monitoring device 104 and/or remote monitoring device 106 based on one or more devices of safety devices 102, local monitoring device 104, and/or remote monitoring device 106 transmitting (e.g., repeating the transmission) a message, data that was included in a message, and/or the like, received from one or more other devices of safety devices 102, local monitoring device 104, and/or remote monitoring device 106 as described herein to local monitoring device 104 and/or remote monitoring device 106.

As shown in FIG. 5A, at step 502, process 500 may include transmitting one or more messages including an indication that a safety device is in a transmit state. For example, safety device 102 may transmit one or more messages including an indication that safety device 102 is in a transmit state. In such an example, safety device 102 may transmit the one or more messages, where the one or more messages include one or more of data associated with a device identifier specifying that safety device 102 transmitted the one or more messages, data associated with a first message identifier identifying the message from among a plurality of messages and/or specifying the message in a sequence from among the plurality of messages, data associated with a power level at which the one or more messages were transmitted, and/or data associated with a time at which the one or more messages were transmitted.

As shown in FIG. 5A, at step 504, process 500 may include receiving a first location message from a first safety device that is in a search state. For example, safety device 102 may receive a first location message from safety device 102 that is in a search state. In some non-limiting embodiments or aspects, safety device 102 that is in a search state may transmit the first location message based on (e.g., in response to) receiving the one or more messages including the indication that safety device 102 is in a transmit state. In some non-limiting embodiments or aspects, the first location message may include one or more of data associated with a device identifier specifying that safety device 102 that is in a search state transmitted the one or more messages, data associated with a message identifier identifying the message from among a plurality of messages and/or specifying the message in a sequence from among the plurality of messages, data associated with a location of safety device 102 that is in a search state (e.g., an absolute location of safety device 102 that is in a search state or a relative location of safety device 102 that is in a search state), data associated with a distance between the location of safety device 102 and the location of safety device 102 that is in a search state, data associated with a state of safety device 102 that is in a search state, and/or data associated with a time at which the one or more messages were transmitted.

In some non-limiting embodiments or aspects, safety device 102 may receive a notification message from local monitoring device 104 and/or remote monitoring device 106. For example, safety device 102 may receive a notification message from local monitoring device 104 and/or remote monitoring device 106, the notification message including data associated with a request to capture data associated with a distance between a location of safety device 102 and a location of one or more other safety devices 102. In some non-limiting embodiments or aspects, safety device 102 may display a prompt based on safety device 102 receiving the notification message. For example, safety device 102 may receive the notification message and safety device 102 may display the prompt. In such an example, the prompt may include an indication for the individual operating safety device 102 to move safety device 102 (e.g., wave safety device 102 in an arc). In some non-limiting embodiments or aspects, safety device 102 may receive data associated with a distance between a location of safety device 102 and one or more other locations of one or more other safety devices 102 based on safety device 102 displaying the prompt. For example, safety device 102 may receive data associated with a distance between a location of safety device 102 and one or more other locations of one or more other safety devices 102 via a ranging sensor. In some non-limiting embodiments or aspects, safety device 102 may transmit the data to local monitoring device 104 and/or remote monitoring device 106.

In some non-limiting embodiments or aspects, safety device 102 may receive a second location message from another safety device 102 that is in a search state. In some non-limiting embodiments or aspects, another safety device 102 that is in a search state may transmit the second location message based on (e.g., in response to) the another safety device 102 that is in a search state receiving the one or more messages including the indication that safety device 102 is in a transmit state. In some non-limiting embodiments or aspects, the second location message may include one or more of data associated with a device identifier specifying that the another safety device 102 that is in a search state transmitted the one or more messages, data associated with a message identifier identifying the message from among a plurality of messages and/or specifying the message in a sequence from among the plurality of messages, data associated with a location of the another safety device 102 that is in a search state (e.g., an absolute location and/or a relative location of the another safety device 102 that is in a search state), data associated with a distance between the location of safety device 102 and the location of the another safety device 102 that is in a search state, data associated with a state of the another safety device 102 that is in a search state, and/or data associated with a time at which the one or more messages were transmitted.

In some non-limiting embodiments or aspects, safety device 102 may determine a first distance between the location of safety device 102 and the location of safety device 102 that is in a search state. For example, safety device 102 may determine the first distance between the location of safety device 102 and the location of safety device 102 that is in the search state based on the data associated with the location of safety device 102 and the data associated with the location of safety device 102 that is in the transmit state included in the first location message. Additionally, or alternatively, safety device 102 may determine a second distance between the location of safety device 102 and the location of the another safety device 102 that is in a search state. For example, safety device 102 may determine the second distance between the location of safety device 102 and the location of the another safety device 102 that is in a search state based on the data associated with the location of safety device 102 and the data associated with the location of the another safety device 102 that is in a search state included in the second location message.

In some non-limiting embodiments or aspects, safety device 102 may receive data associated with the first distance between the location of safety device 102 and the location of safety device 102 that is in the search state. For example, safety device 102 may receive data associated with the first distance between the location of safety device 102 and the location of safety device 102 that is in a search state via a ranging sensor. In such an example, the ranging sensor may be included in safety device 102 and/or safety device 102 that is in a search state. Additionally, or alternatively, the data associated with the first distance between the location of safety device 102 and the location of safety device 102 that is in a search state may be received via the first location message, as described herein. In some non-limiting embodiments or aspects, safety device 102 may receive data associated with the second distance between the location of safety device 102 and the location of the another safety device 102 that is in a search state. For example, safety device 102 may receive data associated with the second distance between the location of safety device 102 and the location of the another safety device 102 that is in a search state via a ranging sensor. In such an example, the ranging sensor may be included in safety device 102 and/or safety device 102*c*. Additionally, or alternatively, the data associated with the second distance between the location of safety device 102 and the location of the another safety device 102 that is in a search state may be received via the second location message, as described herein.

In some non-limiting embodiments or aspects, safety device 102 may determine whether the location of safety device 102 that is in a search state or the location of the another safety device 102 that is in a search state is closer to the location of safety device 102. For example, safety device 102 may determine whether the location of safety device 102 that is in a search state or the location of the another safety device 102 that is in a search state is closer to the location of safety device 102 based on the first distance between the location of safety device 102 and the location of safety device 102 that is in a search state and the second distance between the location of safety device 102 and the location of safety device 102*c*. In such an example, safety device 102 may determine whether the location of safety device 102 that is in a search state or the location of the another safety device 102 that is in a search state is closer to the location of safety device 102 based on safety device 102 comparing the first distance between the location of safety device 102 and the location of safety device 102 that is in a search state to the second distance between the location of safety device 102.

In some non-limiting embodiments or aspects, safety device 102 may determine an absolute location of safety device 102. For example, safety device 102 may determine an absolute location of safety device 102 based on data included in the first location message and/or data included in the second location message. In such an example, safety device 102 may determine an absolute location of safety device 102 based on data associated with the location of safety device 102 that is in a search state included in the first location message and/or data associated with the location of the another safety device 102 that is in a search state included in the second location message. Additionally, or alternatively, safety device 102 may determine an absolute location of safety device 102 based on data associated with the first distance between the location of safety device 102 and the location of safety device 102 that is in a search state and/or data associated with the second distance between the location of safety device 102 and the location of the another safety device 102 that is in a search state As shown in FIG. 5A, at step 506, process 500 may include transmitting a coordination message to a second safety device. For example, safety device 102 may transmit a coordination message to safety device 102*c*. In some non-limiting embodiments or aspects, safety device 102 may transmit the coordination message to the another safety device 102 that is in a search state, where the coordination message comprises data associated with the location of safety device 102 that is in a search state relative to the location of safety device 102 (e.g., a distance between the location of safety device 102 and the location of safety device 102 that is in a search state and/or the like). In some non-limiting embodiments or aspects, the coordination message may include data associated with an indication that safety device 102*c* should transition to a search state. For example, safety device 102 may include data associated with an indication that the another safety device 102 that is in a search state should transition to a search state based on safety device 102 determining that the location of the another safety device 102 that is in a search state is closer to the location of safety device 102 than the location of safety device 102 that is in a search state. In some non-limiting embodiments or aspects, the coordination message may include one or more identifiers of one or more safety devices in a search state. For example, the coordination message may include one or more identifiers of one or more safety devices in a search state and are searching for safety device 102. In some non-limiting embodiments or aspects, safety device 102 may transmit data associated with a prompt to transition to a search state. For example, safety device 102 may transmit data associated with a prompt to transition to a search state to the another safety device 102 that is in a search state. In such an example, safety device 102 may transmit data associated with a prompt to transition to the search state to the another safety device 102 that is in a search state based on safety device 102 determining that the location of safety device 102 that is in a search state or the location of the another safety device 102 that is in a search state is closer to the location of safety device 102.

In some non-limiting embodiments or aspects, safety device 102 may transmit the coordination message to the another safety device 102 that is in a search state, where the coordination message includes data associated with a location of safety device 102 that is in a search state. For example, safety device 102 may transmit the coordination message, where the coordination message includes data associated with an absolute location of safety device 102 that is in a search state and/or data associated with a relative location of safety device 102 that is in a search state. In such an example, the coordination message may be configured to cause the another safety device 102 that is in a search state to display an indication of the location of safety device 102 that is in a search state on a display device of the another safety device 102 that is in a search state.

Figure 5C:
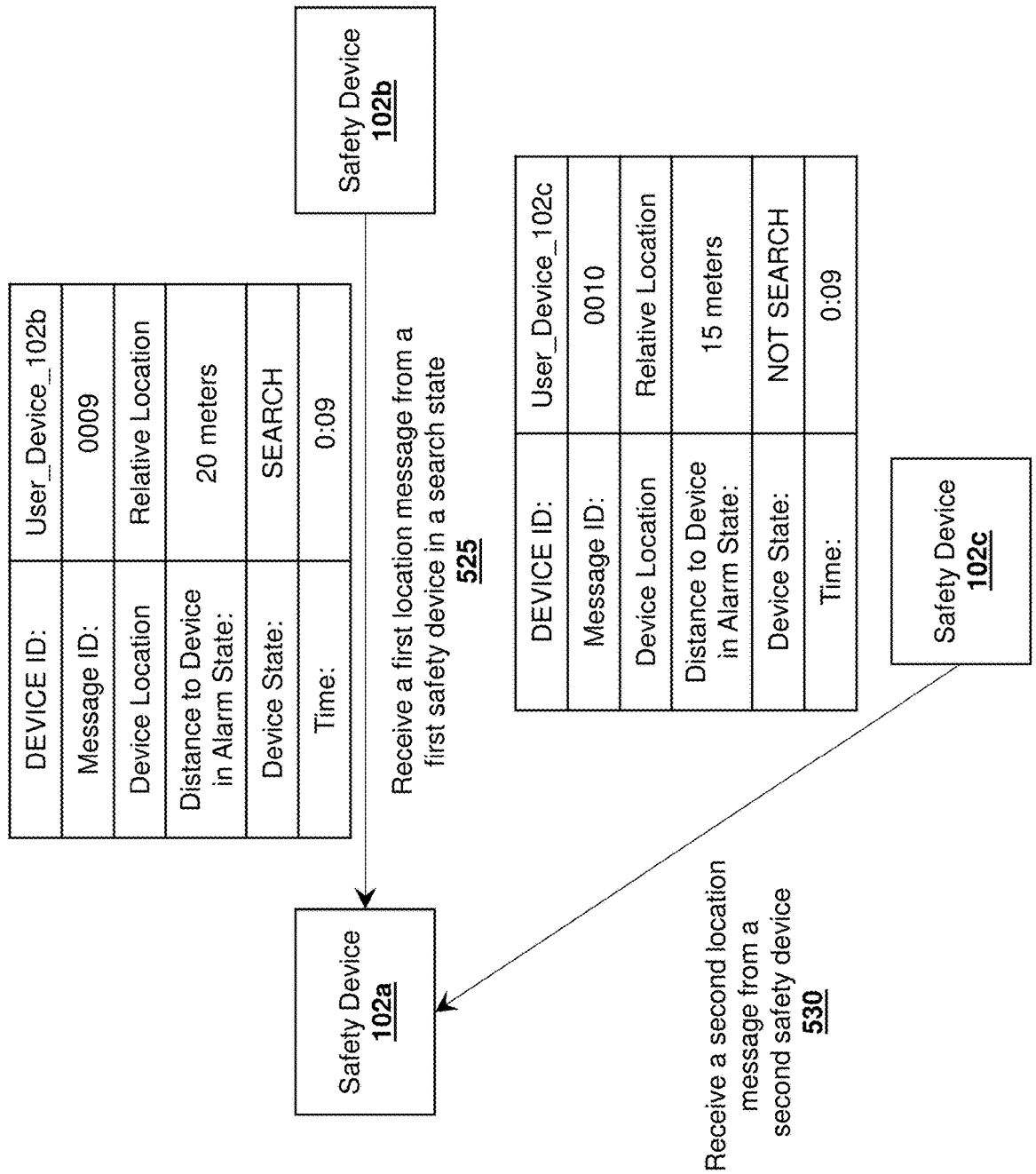
Figure 5D:
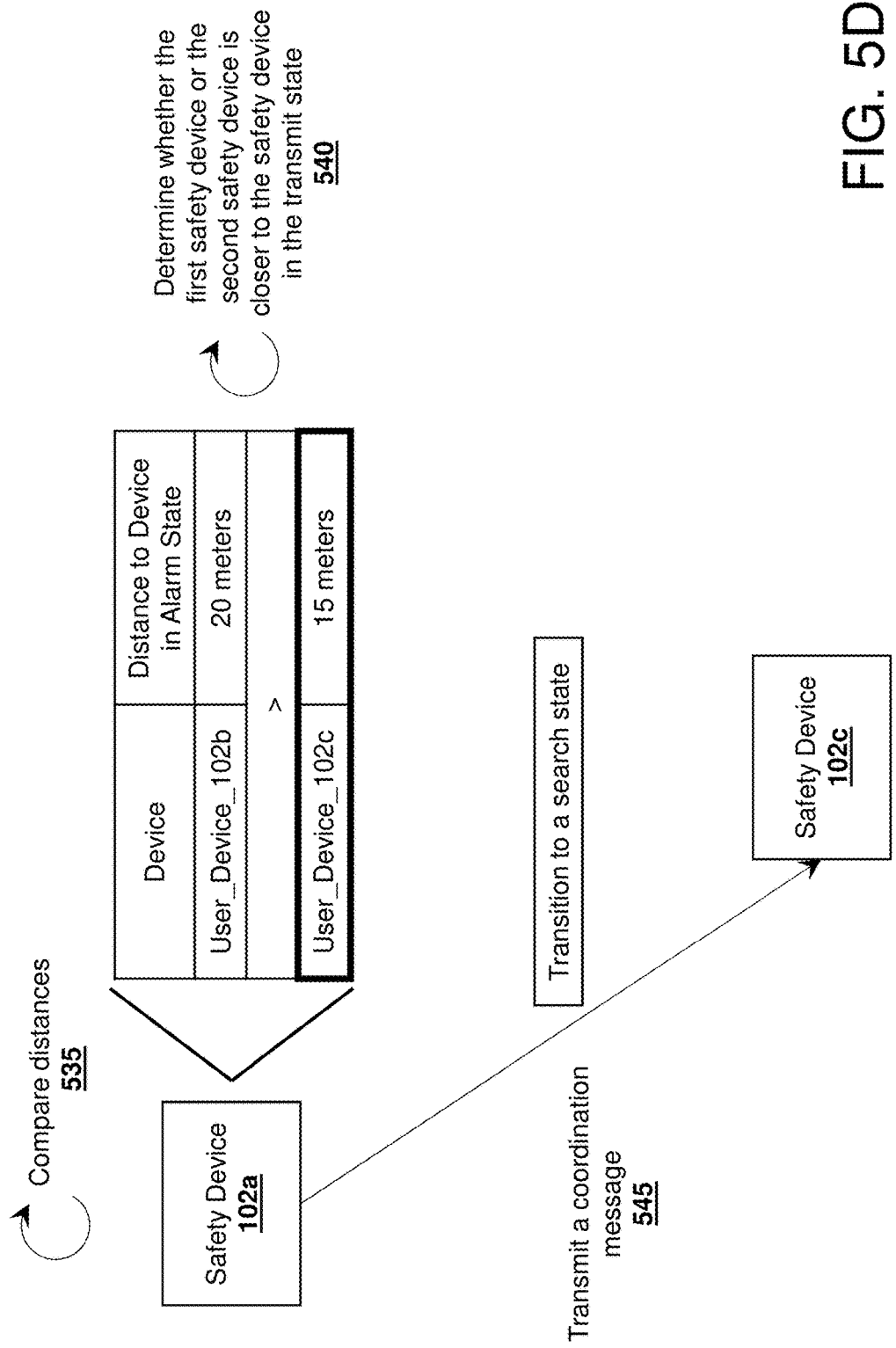

Referring now to FIGS. 5B-5D, FIGS. 5B-5D are diagrams of a non-limiting embodiment or aspect of an implementation 515 relating to a process for providing output to an individual associated with a hazardous environment. As illustrated in FIGS. 5B-5D, implementation 515 may include safety device 102*a*, safety device 102*b*, and safety device 102*c*.

As shown by reference number 520 in FIG. 5B, safety device 102*a* may transmit one or more messages including an indication that a safety device is in a transmit state. For example, safety device 102*a* may transmit one or more messages including an indication that safety device 102*a* is in an alarm state. In some non-limiting embodiments or aspects, the one or more messages may include data associated with a device identifier (e.g., User_Device_102*a*) specifying that safety device 102*a* transmitted the one or more messages, data associated with a first message identifier (e.g., 0001) identifying the message from among a plurality of messages and/or specifying the message in a sequence from among the plurality of messages, data associated with a state (e.g., "ALARM") of safety device 102*a*, data associated with a power level (e.g., 1) at which the one or more messages were transmitted by safety device 102*a*, and/or data associated with a time (e.g., 0:01) at which the one or more messages were transmitted by safety device 102*a*.

As shown by reference number 525 in FIG. 5C, safety device 102*a* may receive a first location message from a first safety device in a search state. For example, safety device 102*a* may receive a first location message from safety device 102b based on (e.g., in response to) safety device 102a transmitting the one or more messages including the indication that safety device 102a is in the alarm state to safety device 102b. In such an example, the first location message may include one or more of data associated with a device identifier (e.g., User_Device_102b) specifying that safety device 102b transmitted the first location message, data associated with a message identifier (e.g., 0009) identifying the first location message from among a plurality of messages and/or specifying the first location message in a sequence from among the plurality of messages (e.g., a plurality of location messages), data associated with a location of safety device 102b (e.g., Relative Location), data associated with a distance (e.g., 20 meters) between the location of safety device 102a and the location of safety device 102b, data associated with a state (e.g., "SEARCH") of safety device 102b, and/or data associated with a time (e.g., 0:09) at which the first location message was transmitted by safety device 102b, and/or the like.

As shown by reference number 530 in FIG. 5C, safety device 102a may receive a second location message from a second safety device. For example, safety device 102a may receive a second location message from safety device 102c based on (e.g., in response to) safety device 102a transmitting the one or more messages including the indication that safety device 102a is in the alarm state to safety device 102c. In such an example, the second location message may include one or more of data associated with a device identifier (e.g., User_Device_102c) specifying that safety device 102c transmitted the second location message, data associated with a message identifier (e.g., 0010) identifying the second location message from among a plurality of messages and/or specifying the second location message in a sequence from among the plurality of messages (e.g., a plurality of location messages), data associated with a location of safety device 102c (e.g., "Relative Location"), data associated with a distance (e.g., 15 meters) between the location of safety device 102a and the location of safety device 102c, data associated with a state (e.g., "NOT SEARCH") of safety device 102b, and/or data associated with a time (e.g., 0:09) at which the second location message was transmitted by safety device 102c, and/or the like.

As shown by reference number 535 in FIG. 5D, safety device 102a may compare distances. For example, safety device 102a may compare a first distance (e.g., 20 meters) between the location of safety device 102a and the location of safety device 102b and a second distance (e.g., 15 meters) between the location of safety device 102a and the location of safety device 102c.

As shown by reference number 540 in FIG. 5D, safety device 102a may determine whether the location of the first safety device or the second safety device is closer to the safety device in the transmit state. For example, safety device 102a may determine the location of safety device 102a based on safety device 102a comparing the first distance between the location of safety device 102a and the location of safety device 102b to the second distance between the location of safety device 102a and the location of safety device 102c.

As shown by reference number 545 in FIG. 5D, safety device 102a may transmit a coordination message. For example, safety device 102a may transmit a coordination message including data associated with an indication that safety device 102c should transition to a search state. In some non-limiting embodiments or aspects, safety device 102a may transmit the coordination message to safety device 102c based on safety device 102a determining that the location of safety device 102c is closer to the location of safety device 102a than the location of safety device 102b.

Figure 6A:
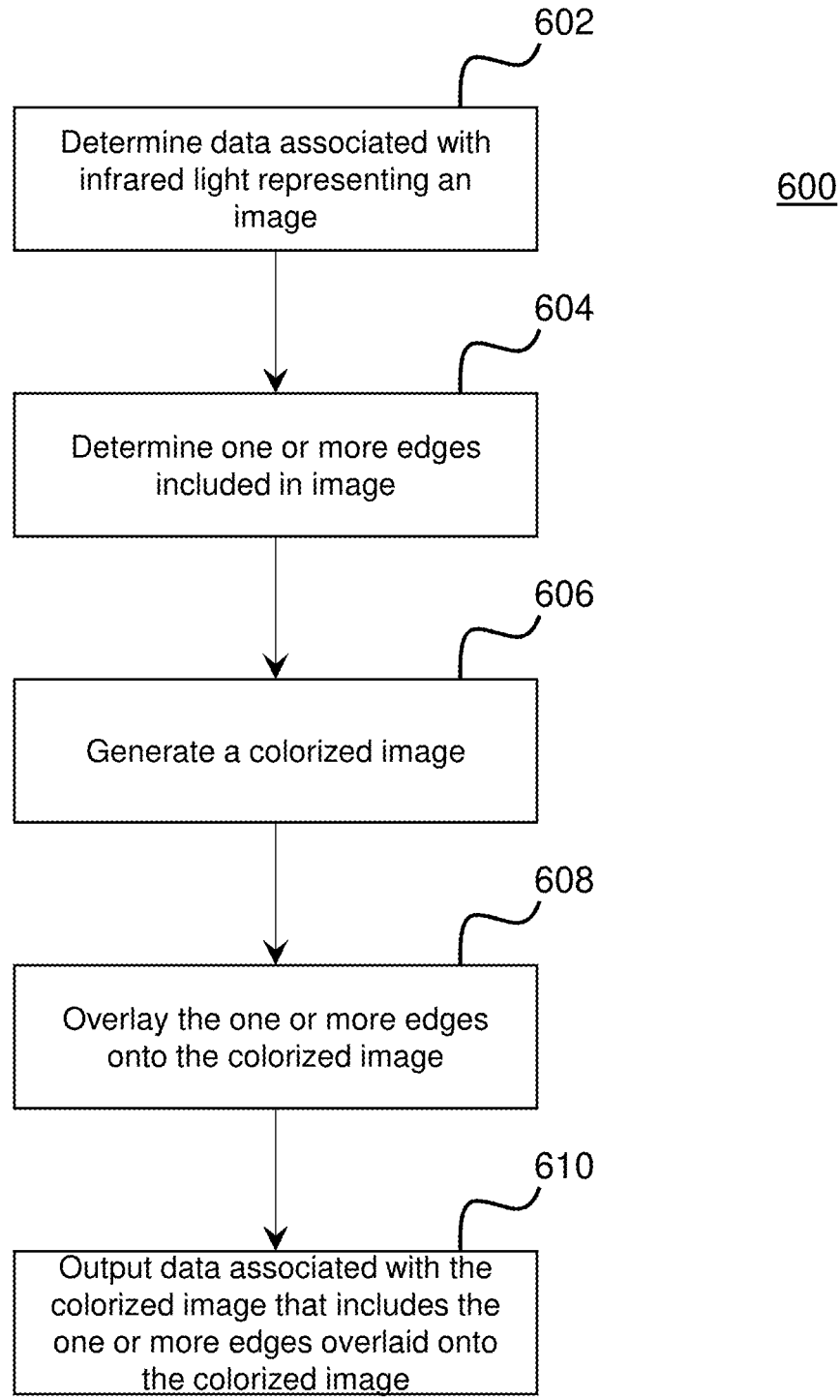
FIG. 6A is a flowchart of a non-limiting aspect or embodiment of a process for providing output to an individual associated with a hazardous environment.

Referring now to FIG. 6A, FIG. 6A is a flowchart of a non-limiting aspect or embodiment of a process 600 for providing output to an individual associated with a hazardous environment. In some non-limiting embodiments or aspects, one or more of the functions described with respect to process 600 may be performed (e.g., completely, partially, etc.) by safety device 102a. In some non-limiting embodiments or aspects, one or more of the steps of process 600 may be performed (e.g., completely, partially, and/or the like) by another device or a group of devices separate from and/or including safety device 102a, such as one or more devices of safety devices 102b-102n, local monitoring device 104, and/or remote monitoring device 106. For example, one or more steps of process 600 may be performed (e.g., completely, partially, and/or the like) by local monitoring device 104 and/or remote monitoring device 106 based on one or more devices of safety devices 102, local monitoring device 104, and/or remote monitoring device 106 transmitting a message, data that was included in a message, and/or the like, as described herein to local monitoring device 104 and/or remote monitoring device 106. Additionally, or alternatively, one or more steps of process 600 may be performed (e.g., completely, partially, and/or the like) by local monitoring device 104 and/or remote monitoring device 106 based on one or more devices of safety devices 102, local monitoring device 104, and/or remote monitoring device 106 transmitting (e.g., repeating the transmission) a message, data that was included in a message, and/or the like, received from one or more other devices of safety devices 102, local monitoring device 104, and/or remote monitoring device 106 as described herein to local monitoring device 104 and/or remote monitoring device 106.

As shown in FIG. 6A, at step 602, process 600 may include determining data associated with infrared light. For example, safety device 102 may determine data associated with infrared light representing an image. In some non-limiting embodiments or aspects, safety device 102 may determine the data associated with the infrared light based on an output of an infrared sensor. For example, safety device 102 may determine the data associated with the infrared light based on an output of an infrared sensor of a thermal imager included in safety device 102. In some non-limiting embodiments or aspects, safety device 102 may receive data associated with infrared light captured by the thermal imager. For example, safety device 102 may receive data associated with infrared light captured by the infrared sensor of the thermal imager. In some non-limiting embodiments or aspects, the data associated with the infrared light may represent an image. For example, the data associated with the infrared light may represent one or more values corresponding to one or more positions (e.g., one or more pixels) in an image. In such an example, the image may be an image having a resolution of 206×156 and/or the like with a format of 12 bits per pixel and/or the like. In some non-limiting embodiments or aspects, the data associated with the infrared light may represent one or more values corresponding to one or more positions in an image, each value of the one or more values corresponding to a temperature of a portion of an object included in the thermal image. In some non-limiting embodiments or aspects, the image may be a greyscale image. For example, safety device 102 may generate a greyscale image based on the infrared light. In such an example, safety device 102 may generate the greyscale image based on the infrared light detected by the thermal imager. In some non-limiting embodiments or aspects, the greyscale image may include an array of values, the array of values corresponding to pixels associated with the greyscale image. In some non-limiting embodiments or aspects, safety device 102 may generate the greyscale image using a Gaussian filter algorithm.

As shown in FIG. 6A, at step 604, process 600 may include determining one or more edges included in the image. For example, safety device 102 may determine one or more edges included in the image. In such an example, the one or more edges included in the image may correspond to one or more edges of one or more objects in a field of view of the thermal imager. In some non-limiting embodiments or aspects, safety device 102 may determine the one or more edges included in the image using an edge detection algorithm. For example, safety device 102 may determine the one or more edges included in the image using a Canny edge detection algorithm. In some non-limiting embodiments or aspects, a Canny edge detection algorithm may include a Canny edge detection algorithm with a high threshold (e.g., a threshold associated with a difference, such as a gradient, in values of adjacent pixels) that is used to define an edge and a low threshold (e.g., a threshold associated with a difference, such as a gradient, in values of adjacent pixels) that is used to define what is not an edge, a Sobel edge detection algorithm, a Prewitt edge detection algorithm, a Roberts edge detection algorithm, and/or the like). In some non-limiting embodiments or aspects, pairs of values corresponding to the high threshold of a Canny edge detection algorithm and the low threshold of a Canny edge detection algorithm may include 12, 12, and, 65, 10, and/or the like. In some non-limiting embodiments or aspects, the one or more edges included in the image may include one or more non-linear edges (e.g., one or more arcs, curves, and/or the like) and/or one or more linear edges (e.g., one or more lines, one or more parallel lines, one or more intersecting lines, and/or the like).

In some non-limiting embodiments or aspects, safety device 102 may determine one or more regions included in the image. For example, safety device 102 may determine one or more regions included in the image that correspond to one or more temperatures (e.g., one or more temperatures such as 80 degrees, 98.6 degrees, 120 degrees, and/or the like, one or more ranges of temperatures such as 80-90 degrees, 90-110 degrees, more than 120 degrees, and/or the like, and/or the like). In some non-limiting embodiments or aspects, safety device 102 may determine one or more regions included in the image based on one or more pixels and/or the one or more edges included in the greyscale image. For example, safety device 102 may determine one or more regions included in the greyscale image using an edge detection algorithm. Additionally, or alternatively, safety device 102 may determine the one or more regions included in the image using an image segmentation algorithm (e.g., a region merging algorithm, a region growing algorithm, and/or the like).

In some non-limiting embodiments or aspects, safety device 102 may identify one or more straight edges. For example, safety device 102 may identify one or more straight edges from among the one or more edges included in the image. In such an example, safety device 102 may identify the one or more straight edges from among the one or more edges included in the image, the one or more straight edges corresponding to the one or more edges of the one or more objects in the field of view of the thermal imager. In some non-limiting embodiments or aspects, safety device 102 may identify the one or more straight edges using a straight line detection algorithm. For example, safety device 102 may identify the one or more straight edges using a Hough transform, a convolution-based technique (e.g., a technique involving the use of one or more convolution masks), and/or the like. In some non-limiting embodiments or aspects, safety device 102 may identify one or more sets of straight edges. For example, safety device 102 may identify one or more sets of straight edges from among the one or more edges included in the image and/or from among the one or more straight edges included in the one or more edges in the image. In such an example, safety device 102 may identify the one or more sets of straight edges from among the one or more edges included in the image, the one or more sets of straight edges corresponding to the one or more edges of the one or more objects in the field of view of the thermal imager based on safety device 102 comparing an angle associated with each straight edge with an angle of each other straight edge. In this example, the angle associated with each straight edge may be determined based on a formula (e.g., angle=a tan2 (x1−x0, y1−y0)). In some non-limiting embodiments or aspects, safety device 102 may determine that two or more straight edges are included in a set of straight edges based on safety device 102 determining that each straight edge of the set of straight edges is associated with an angle within a range of angles (e.g., +/− three degrees from an angle). In some non-limiting embodiments or aspects, one or more sets of straight edges may be associated with a predefined signature (e.g., a pattern associated with an ingress and/or egress point, a doorway, a window, and/or the like). In some non-limiting embodiments or aspects, safety device 102 may identify the one or more sets of straight edges using a straight line detection algorithm, as described herein.

As shown in FIG. 6A, at step 606, process 600 may include generating a colorized image. For example, safety device 102 may generate a colorized image based on the data associated with the infrared light. In such an example, safety device 102 may generate a colorized image by mapping each value associated with infrared light of each pixel in the image to a corresponding color (e.g., a greyscale color, an RGB color, a CMYK color, and/or the like). For example, safety device 102 may generate a colorized image by mapping each value of each position in the image to a corresponding greyscale color, a corresponding CMYK color, a corresponding RGB color, and/or the like. In some non-limiting embodiments or aspects, one or more ranges of values included in the greyscale image may correspond to one or more colors. For example, a first range of values included in the greyscale image (e.g., a first range of values representing colors in a greyscale scale) may correspond to a first color (e.g., a first color in a range of colors in a CMYK scale), and a second range of values included in the greyscale image (e.g., a second range of values representing colors in the greyscale scale) may correspond to a second color (e.g., a second color in a range of colors in the CMYK scale). In some non-limiting embodiments or aspects, safety device 102 may generate the colorized image while (e.g., in parallel to, before, and/or after) safety device 102 determines the one or more edges included in the image. For example, safety device 102 may copy data associated with the image and colorize the image while safety device 102 determines the one or more edges included in the image.

As shown in FIG. 6A, at step 608, process 600 may include overlaying the one or more edges onto the colorized image. For example, safety device 102a may overlay the one or more edges onto the colorized image. In such an example, safety device 102a may overlay the one or more edges onto the colorized image based on safety device 102a determining the one or more edges included in the image and/or safety device 102a generating the colorized image. For example, safety device 102a may overlay the one or more edges onto the colorized image after safety device 102a determines the one or more edges included in the image. Additionally, or alternatively, safety device 102a may overlay the one or more edges onto the colorized image after safety device 102a generates the colorized image. In some non-limiting embodiments or aspects, safety device 102a may overlay the one or more straight edges corresponding to the one or more edges of the one or more objects in the field of view of the thermal image onto the colorized image. Additionally, or alternatively, safety device 102a may overlay the one or more sets of straight edges corresponding to the one or more edges of the one or more objects in the field of view of the thermal image onto the colorized image. Additionally, or alternatively, safety device 102a may overlay the one or more non-linear edges corresponding to the one or more edges of the one or more objects in the field of view of the thermal image onto the colorized image.

In some non-limiting embodiments or aspects, safety device 102a may overlay the one or more regions included in the image that correspond to one or more temperatures onto the colorized image. For example, safety device 102a may overlay the one or more regions included in the image onto the colorized image. In such an example, safety device 102a may overlay the one or more regions included in the image onto the colorized image based on safety device 102a determining the one or more regions included in the image included in the greyscale image and/or safety device 102a colorizing the image to generate the colorized image. For example, safety device 102a may overlay the one or more regions included in the image onto the colorized image after safety device 102a determines the one or more regions included in the image. Additionally, or alternatively, safety device 102a may overlay the one or more regions included in the image onto the colorized image after safety device 102a generates the colorized image. In some non-limiting embodiments or aspects, safety device 102a may overlay a first region corresponding to a first temperature in a first color and a second region corresponding to a second temperature in a second color, the first color being different from the second color.

In some non-limiting embodiments or aspects, safety device 102a may overlay the one or more edges onto the colorized image in one or more colors. For example, safety device 102a may overlay the one or more straight edges onto the colorized image in a first color. In such an example, the first color may be associated with (e.g., may correspond to) a type of edge (e.g., a straight edge). In another example, safety device 102a may overlay the one or more sets of straight edges onto the colorized image in a second color. In such an example, the second color may be associated with (e.g., may correspond to) a type of edge (e.g., straight edges included in a set of straight edges). The first color may be different from the second color. In another example, safety device 102a may overlay the one or more non-linear edges onto the colorized image in a third color. In such an example, the third color may be associated with (e.g., may correspond to) a type of edge (e.g., non-linear edges). The third color may be different from the first color and/or the second color. In some non-limiting embodiments or aspects, safety device 102a may overlay the one or more regions onto the colorized image in a fourth color. For example, safety device 102a may overlay the one or more regions onto the colorized image in a fourth color that may be the same as and/or different from the first color, the second color, and/or the third color.

As shown in FIG. 6A, at step 610, process 600 may include outputting data associated with the colorized image that includes the one or more edges overlaid onto the colorized image. For example, safety device 102a may output data associated with the colorized image that includes the one or more edges overlaid onto the colorized image. In such an example, safety device 102a may output the data associated with the colorized image that includes the one or more edges overlaid onto the colorized image based on safety device 102a overlaying the one or more edges onto the colorized image. In some non-limiting embodiments or aspects, safety device 102a may output the data associated with the colorized image that includes the one or more edges overlaid onto the colorized image by providing the data associated with the colorized image that includes the one or more edges overlaid onto the colorized image to one or more components (e.g., a display device) of safety device 102a. In some non-limiting embodiments or aspects, the data associated with the colorized image that includes the one or more edges overlaid onto the colorized image may be configured to cause one or more components of safety device 102a to display the colorized image that includes the one or more edges overlaid onto the colorized image. For example, the data associated with the colorized image that includes the one or more edges overlaid onto the colorized image may be configured to cause a display device of safety device 102a to display the colorized image that includes the one or more edges overlaid onto the colorized image based on (e.g., in response to) receipt of the data associated with the colorized image that includes the one or more edges overlaid onto the colorized image.

In some non-limiting embodiments or aspects, safety device 102 may resize the colorized image that includes the one or more edges overlaid onto the colorized image. For example, safety device 102 may resize the colorized image that includes the one or more edges overlaid onto the colorized image based on (e.g., before and/or during) safety device 102 outputting data associated with the colorized image that includes the one or more edges overlaid onto the colorized image. In such an example, safety device 102 may resize the color image to fit a size of a display device (e.g., a display device having a resolution of 412×312 pixels and/or the like).

Referring now to FIGS. 6B-6H, FIGS. 6B-6H are diagrams of a non-limiting embodiment or aspect of an implementation 615 relating to a process for providing output to an individual associated with a hazardous environment. As illustrated in FIGS. 6B-6H, implementation 615 may include safety device 102a.

Figure 6B:
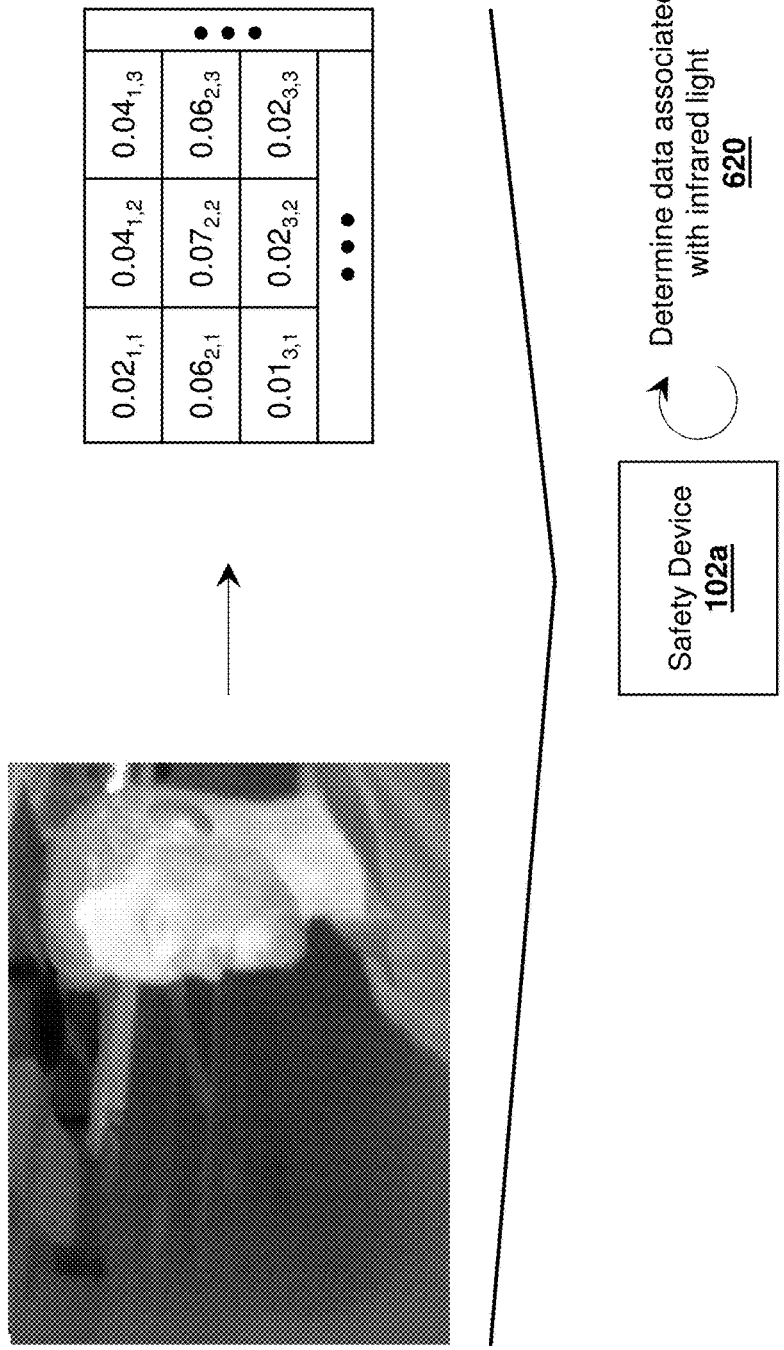

As shown by reference number 620 in FIG. 6B, safety device 102a may determine data associated with infrared light. For example, safety device 102a may determine data associated with infrared light received via a thermal imager. In such an example, safety device 102a may receive the data associated with the infrared light via a thermal imager included in safety device 102a. In some non-limiting embodiments or aspects, the data associated with the infrared light may represent one or more values corresponding to one or more pixels of an image (e.g., a greyscale image). In some non-limiting embodiments or aspects, safety device 102a may generate a greyscale image based on the data associated with the infrared light. For example, safety device 102a may generate a greyscale image based on safety device 102a determining data associated infrared light. In some non-limiting embodiments or aspects, safety device 102a may generate a greyscale image based on the infrared light detected by a thermal imager. For example, safety device 102a may generate a greyscale image based on the infrared light detected by a thermal imager included in safety device 102a. In some non-limiting embodiments or aspects, the greyscale image may include one or more pixels having one or more values, respectively. The one or more values may represent shades of grey, from black to white. The shades of grey may correspond to one or more temperatures of one or more objects in a field of view of the thermal imager.

Figure 6C:

As shown by reference number 625 in FIG. 6C, safety device 102a may determine one or more edges based on the infrared light. For example, safety device 102a may determine one or more edges based on the image, where the image represents the infrared light received at the thermal imager. In some non-limiting embodiments or aspects, safety device 102a may determine the one or more edges using a Canny edge detection algorithm, as described herein. The one or more edges may include one or more non-linear edges, one or more straight edges, and/or one or more sets of straight edges.

As shown by reference number 630 in FIG. 6D, safety device 102a may identify one or more non-linear edges. For example, safety device 102a may identify one or more non-linear edges from among the one or more edges detected using the Canny edge detection algorithm. The one or more non-linear edges may correspond to one or more non-linear edges of one or more objects in a field of view of the thermal imager (e.g., a chin of an individual and/or the like).

As shown by reference number 635 in FIG. 6E, safety device 102a may identify one or more straight edges. For example, safety device 102a may identify one or more straight edges from among the one or more edges detected using the Canny edge detection algorithm. In such an example, safety device 102a may identify the one or more straight edges based on a Hough transform, as described herein. The one or more straight edges may correspond to one or more straight edges of one or more objects in a field of view of the thermal imager (e.g., a border of a light fixture and/or the like).

Figure 6F:

As shown by reference number 640 in FIG. 6F, safety device 102a may generate a colorized image. For example, safety device 102a may generate a colorized image based on safety device 102a mapping each value of each position in the image represented by the data associated with the infrared light to a corresponding color. In some non-limiting embodiments or aspects, safety device 102a may generate a colorized image based on safety device 102a mapping each value of each position in the image represented by the data associated with the infrared light to a corresponding color based on a histogram (e.g., using a histogram-based colorization technique such as histogram regression). Each color may correspond to one or more temperatures.

Figure 6G:
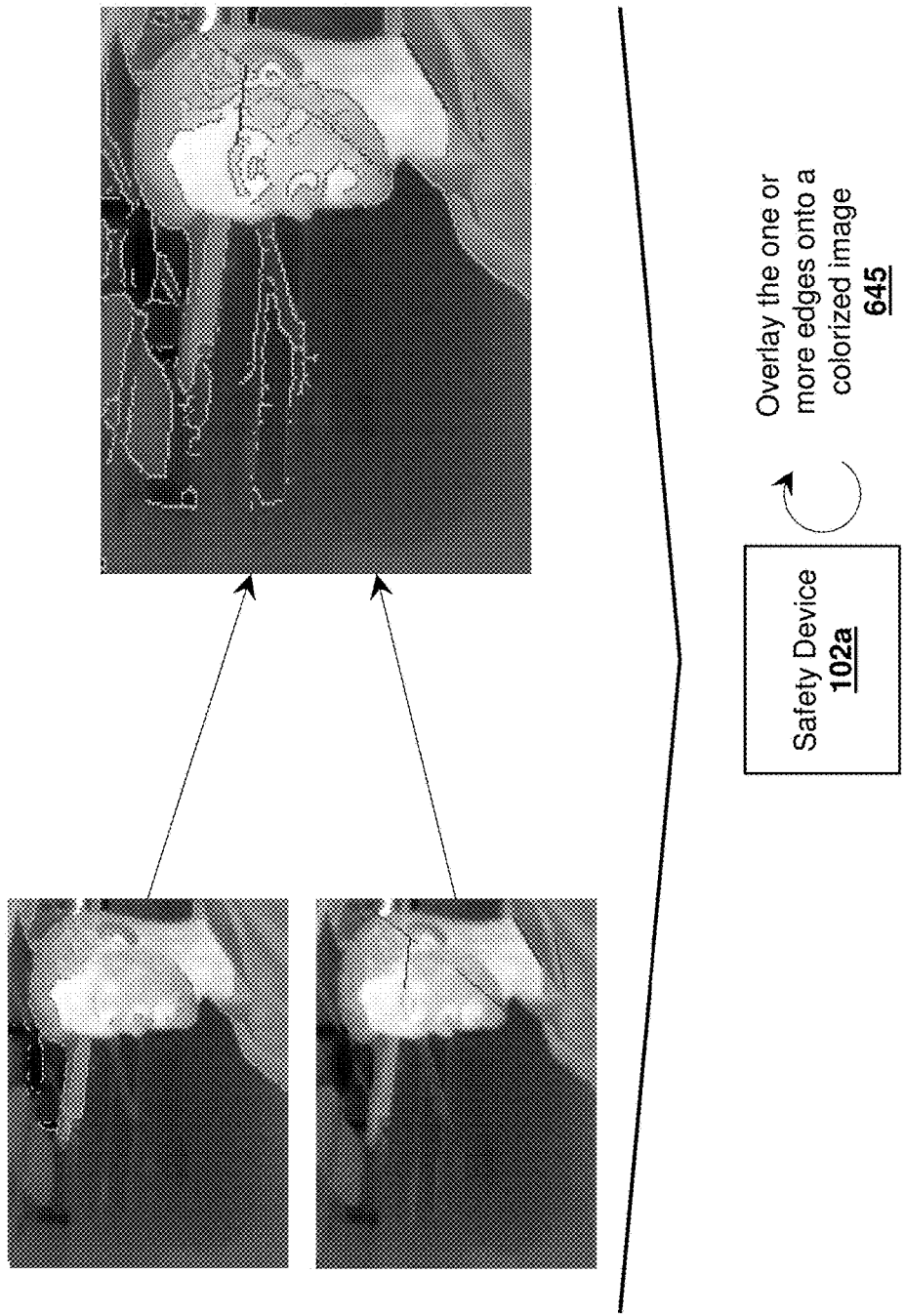

As shown by reference number 645 in FIG. 6G, safety device 102a may overlay one or more edges onto the colorized image. For example, safety device 102a may overlay one or more non-linear edges, one or more straight edges, and/or one or more sets of straight edges onto the colorized image. In such an example, safety device 102a may overlay the one or more non-linear edges in a first color, the one or more straight edges in a second color, and/or the one or more sets of straight edges in the second color or a third color.

Figure 6H:
Figure 6H:
Figure 6H:
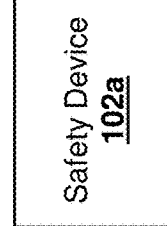
Figure 7A:
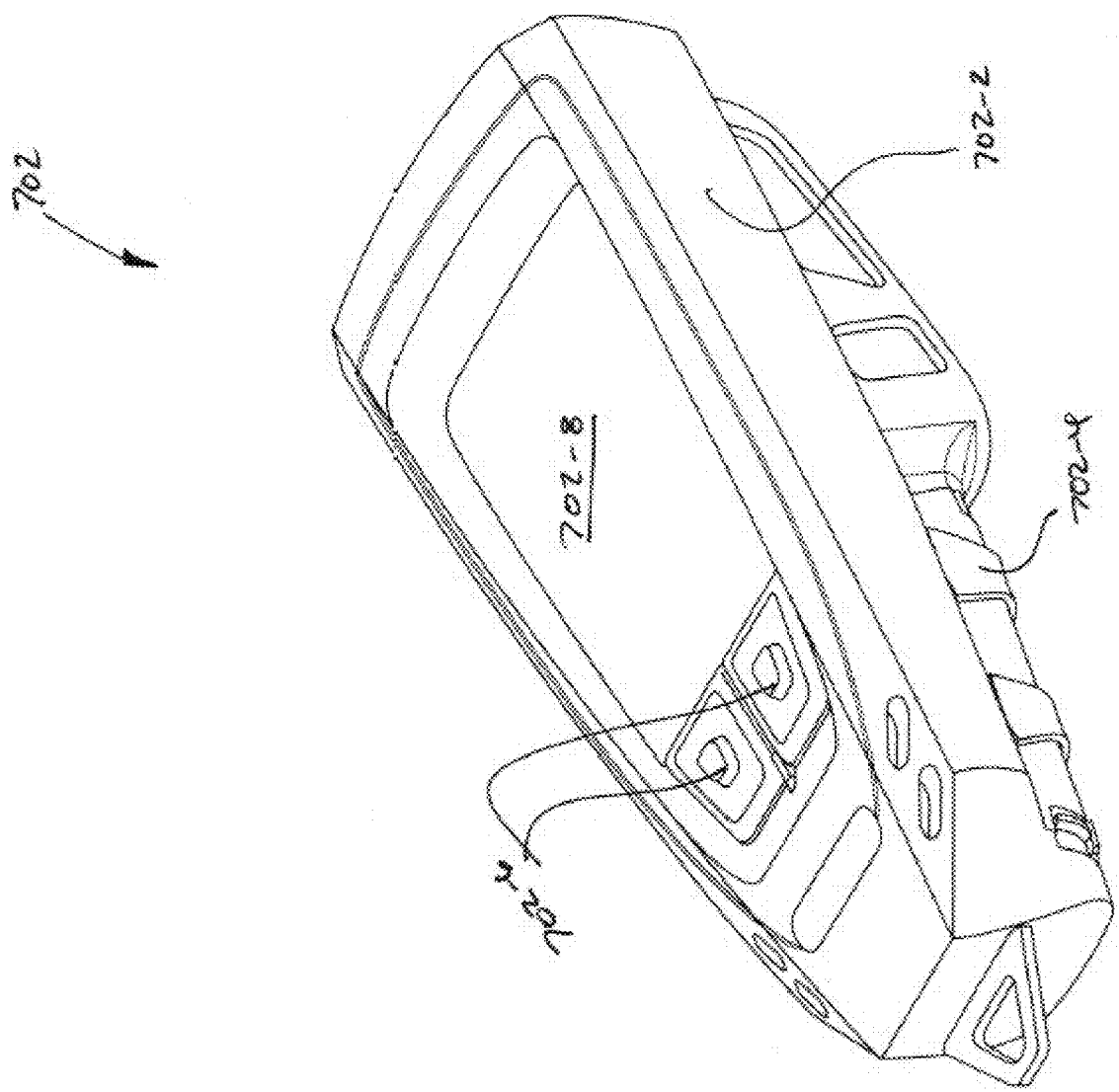
FIGS. 7A-7E are diagrams of an implementation of a non-limiting aspect or embodiment of safety device in which devices, methods, and/or computer program products as disclosed herein may be implemented.
Figure 7B:
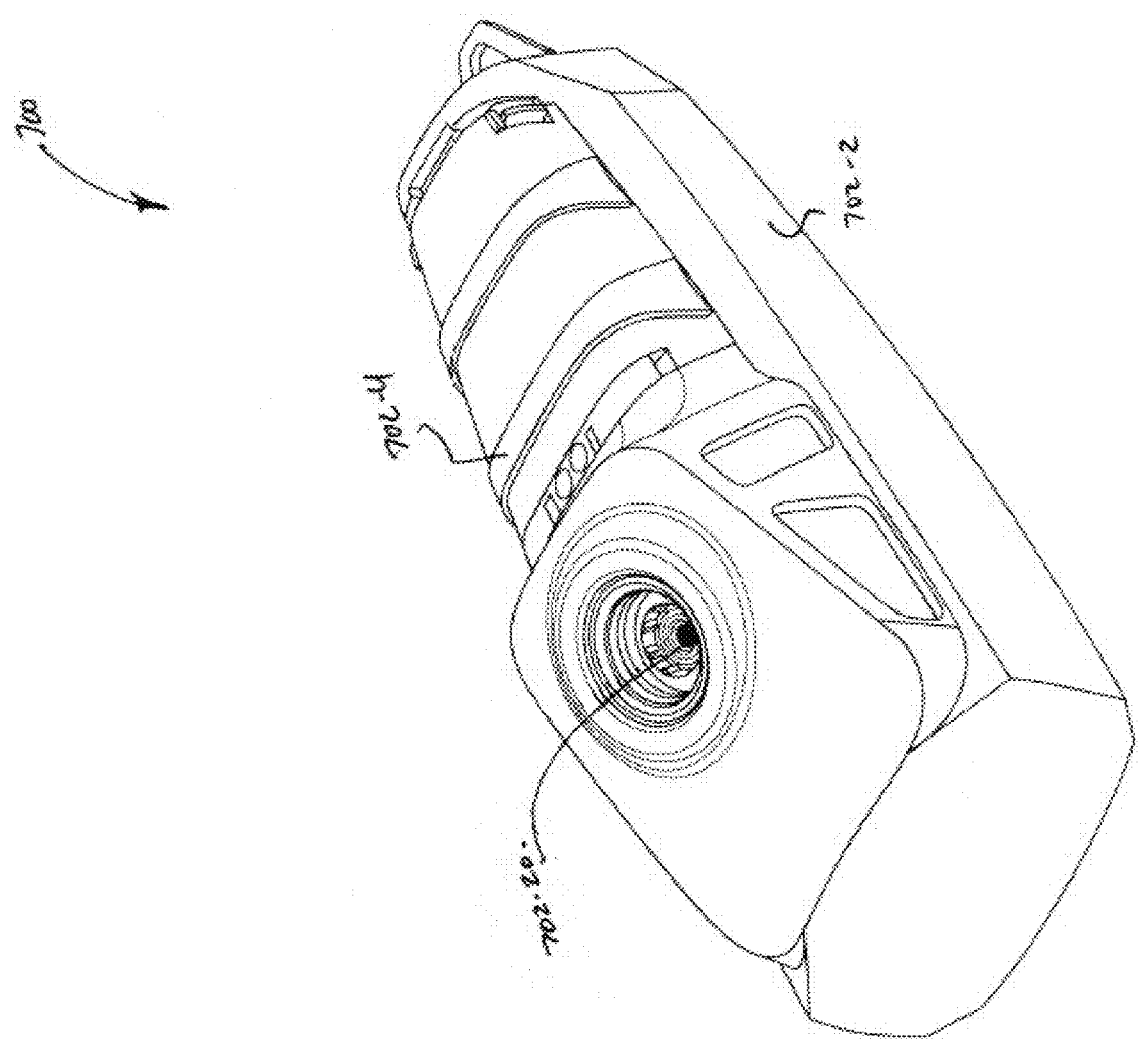
Figure 7C:
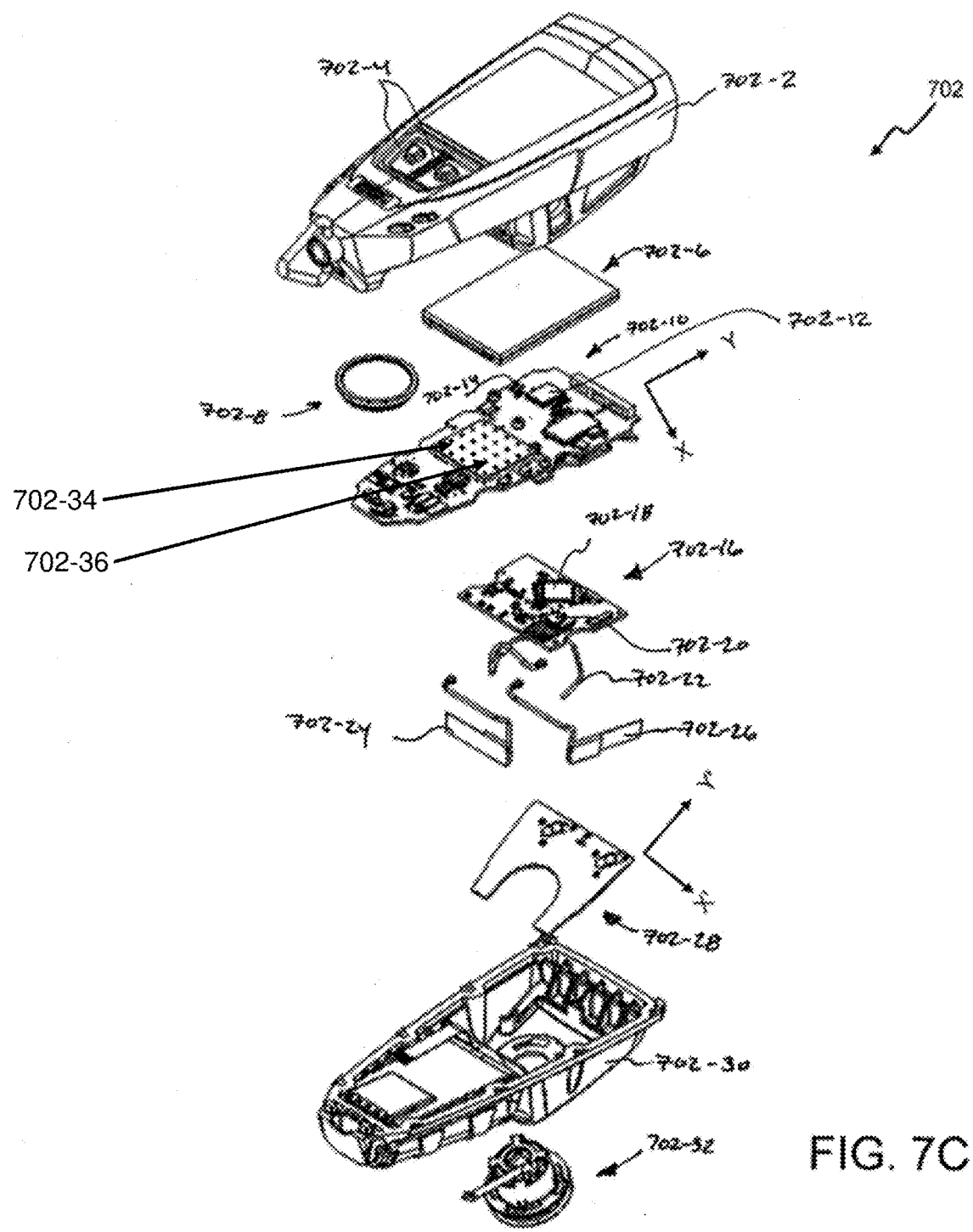
Figure 7D:
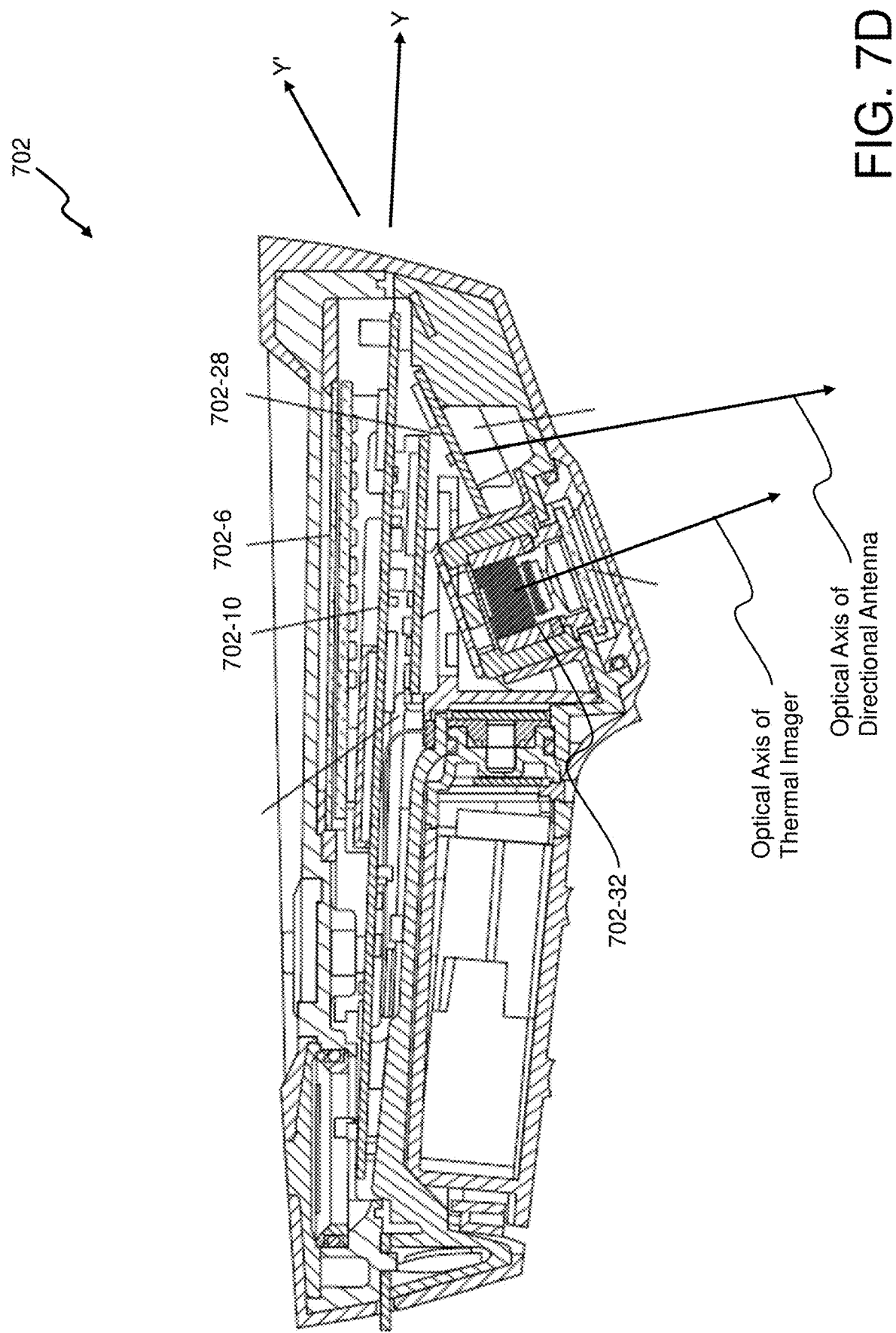
Figure 7E:
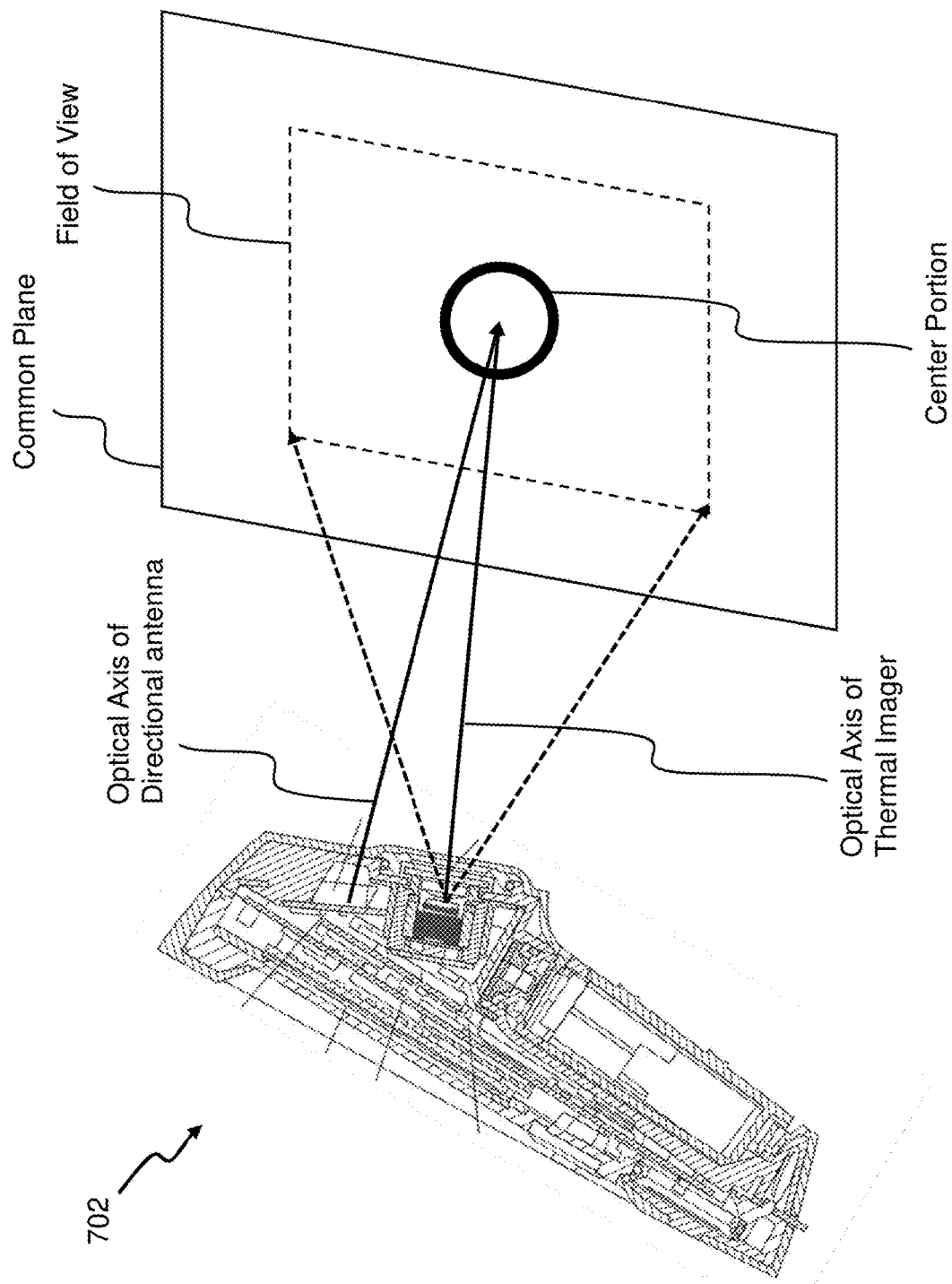

As shown by reference number 650 in FIG. 6H, safety device 102a may generate data associated with the colorized image that includes the one or more edges overlaid onto the colorized image. For example, safety device 102a may generate data associated with one or more values (e.g., RGB values), with each value corresponding to a color to be displayed at the pixel of the colorized image. In some non-limiting embodiments or aspects, safety device 102a may generate data associated with the colorized image that is configured to cause a display device to display the colorized image including the one or more edges overlaid onto the colorized image.

As shown by reference number 655 in FIG. 6H, safety device 102a may output the data associated with the colorized image. For example, safety device 102a may output the data associated with the colorized image based on safety device 102a generating the data associated with the colorized image. In such an example, the data associated with the colorized image may be configured to cause a display device of safety device 102a to display the colorized image including the one or more edges overlaid onto the colorized image.

Referring now to FIGS. 7A-7E, FIGS. 7A-7E are diagrams of a non-limiting embodiment of a safety device 702 in which systems, methods, and/or computer program products as disclosed herein may be implemented. As shown in FIGS. 7A-7E, safety device 702 may include outer housing 702-2, input components 702-4, display device 702-6, audio output device 702-8, printed circuit board (PCB) 702-10, GPS receiver 702-12, GPS antenna 702-14, second board 702-16, ranging microprocessor 702-18, ranging transceiver 702-20, low-band omnidirectional antenna 702-22, first omnidirectional antenna 702-24, second omnidirectional antenna 702-26, directional antenna 702-28, power source housing 702-30, thermal imager 702-32, processor 702-34, and memory 702-36.

Outer housing 702-2 may be configured to be coupled to power source housing 702-30. For example, outer housing 702-2 may be configured to be coupled to power source housing 702-30 via a snap-fit connection, via one or more fasteners, and/or the like. In some non-limiting embodiments or aspects, outer housing 702-2 and/or power source housing 702-30 may directly or indirectly support input components 702-4, display device 702-6, audio output device 702-8, PCB 702-10, GPS receiver 702-12, GPS antenna 702-14, second board 702-16, ranging microprocessor 702-18, ranging transceiver 702-20, low-band omnidirectional antenna 702-22, first omnidirectional antenna 702-24, second omnidirectional antenna 702-26, directional antenna 702-28, thermal imager 702-32, processor 702-34, and/or memory 702-36. For example, outer housing 702-2 and/or power source housing 702-30 may be directly and/or operably coupled to GPS receiver 702-12, GPS antenna 702-14, second board 702-16, ranging microprocessor 702-18, ranging transceiver 702-20, low-band omnidirectional antenna 702-22, first omnidirectional antenna 702-24, second omnidirectional antenna 702-26, directional antenna 702-28, thermal imager 702-32, processor 702-34, and/or memory 702-36. In some non-limiting embodiments or aspects, outer housing 702-2 and/or power source housing 702-30 may support PCB 702-10, second board 702-16, and/or directional antenna 702-28 such that a first plane X, Y associated with PCB 702-10 and/or second board 702-16 intersects a second plane X', Y' associated with a board included in directional antenna 702-28 at an angle of ±Y°. In some non-limiting embodiments or aspects, the angle of ±Y° may be an angle within a range of about ±Θ° to ±90°. In some non-limiting embodiments or aspects, outer housing 702-2 and/or power source housing 702-30 may include a metal ring extending at least partially therefrom to enable safety device 702 to be coupled to a harness and/or the like. Additionally, or alternatively, outer housing 702-2 and/or power source housing 702-30 may rotatably support a metal ring extending at least partially therefrom to enable safety device 702 to be coupled to a harness and/or the like.

Input component 702-4 may include one or more electrical components and/or one or more devices capable of being in communication with processor 702-34 of safety device 702. For example, input component 702-4 may include one or more buttons (e.g., hardware buttons, capacitive buttons, and/or the like) configured to receive input from an individual and transmit a signal associated with the input to processor 702-34. Input component 702-4 may be the same as or similar to input component 210, as described herein.

Display device 702-6 may include one or more electrical components and/or one or more devices capable of being in communication with processor 702-34 of safety device 702. For example, display device 702-6 may include one or more output devices for presenting information (e.g., one or more images). In some non-limiting embodiments or aspects, display device 702-6 may include a liquid crystal display (LCD), a light-emitting diode (LED) display, and/or the like. In some non-limiting embodiments or aspects, display device 702-6 may be the same as, or similar to, output component 212, as described herein. In some non-limiting embodiments or aspects, display device 702-6 may be configured to receive data associated with an output and display device 702-6 may be configured to display one or more images based on the data associated with the output, as described herein. Display device 702-6 may have a layer of protective glass disposed thereon.

Audio output device 702-8 may include one or more electrical components and/or one or more devices capable of being in communication with processor 702-34. For example, audio output device 702-8 may include output hardware configured to output one or more audible tones such as a speaker (e.g., a piezo-electric speaker, a coil-driven speaker, and/or the like).

PCB 702-10 may include a circuit board that mechanically and/or electrically connects one or more components of safety device 702. For example, PCB 702-10 may include a circuit board made of fiberglass, composite epoxy, other laminate materials, and/or the like. In some non-limiting embodiments or aspects, PCB 702-10 may directly or indirectly support and/or connect audio output device 702-8, GPS receiver 702-12, GPS antenna 702-14, second board 702-16, ranging microprocessor 702-18, ranging transceiver 702-20, low-band omnidirectional antenna 702-22, first omnidirectional antenna 702-24, second omnidirectional antenna 702-26, directional antenna 702-28, power source housing 702-30, thermal imager 702-32, processor 702-34, and memory 702-36. In some non-limiting embodiments or aspects, PCB 702-10 may extend along a first plane associated with (e.g., defined by) an axis X-Y. In some non-limiting embodiments or aspects, safety device 702 may include a layer of signal absorbent material (e.g., a foam absorber, tuned frequency absorbers such as the MR11-0002-20 or the MR11-0003-20 from MAST Technologies, cavity resonance absorbers such as the MR21-0009-02, carbon conductive coatings, injection molded thermoplastic absorbers such as the Eccosorb from Laird, and/or the like). For example, safety device 702 may include a layer of signal absorbent material configured to absorb signals. In such an example, safety device 702 may include a layer of signal absorbent material configured to absorb signals directed toward the one or more directional antennae in a direction that the one or more directional antennae are not configured to receive the signals from. In some non-limiting embodiments or aspects, PCB 702-10 may include a layer of signal absorbent material disposed about a first side and/or a second side of PCB 702-10.

GPS receiver 702-12, may include one or more electrical components and/or one or more devices capable of being in communication with processor 702-34. In some non-limiting embodiments or aspects, GPS receiver 702-12 may include one or more processors and/or one or more memories configured to receive data via GSP antenna 702-14. In some non-limiting embodiments or aspects, GPS receiver 702-12 may generate data associated with a location of safety device 702, as described herein.

GPS antenna 702-14 may include may include one or more electrical components and/or one or more devices capable of being in communication with processor 702-34 and/or GPS receiver 702-12.

Second board 702-16 may include a circuit board that mechanically and/or electrically connects one or more components of safety device 702. For example, second board 702-16 may include a circuit board made of fiberglass, composite epoxy, other laminate materials, and/or the like. In some non-limiting embodiments or aspects, second board 702-16 may directly or indirectly support and/or connect ranging processor 702-18 and/or ranging transceiver 702-20. In some non-limiting embodiments or aspects, second board 702-16 may extend along a plane aligned with the first plane X, Y. Additionally, or alternatively, second board 702-16 may extend along a plane aligned with the second plane X', Y'.

Ranging processor 702-18 may include one or more processors (e.g., one or more processors, one or more microprocessors, and/or the like). For example, ranging processor 702-18 may include one or more electrical components and/or one or more devices capable of being in communication with input component 702-4, display device 702-6, audio output device 702-8, PCB 702-10, GPS receiver 702-12, GPS antenna 702-14, low-band omnidirectional antenna 702-22, first omnidirectional antenna 702-24, second omnidirectional antenna 702-26, directional antenna 702-28, thermal imager 702-32, processor 702-34, and/or memory 702-36. In some non-limiting embodiments or aspects, processor 702-34 may be the same as or similar to processor 204 as described herein.

Ranging transceiver 702-20 may include one or more processors (e.g., one or more processors, one or more microprocessors, and/or the like). For example, ranging transceiver 702-20 may include one or more electrical components and/or one or more devices capable of being in communication with input component 702-4, display device 702-6, audio output device 702-8, PCB 702-10, GPS receiver 702-12, GPS antenna 702-14, low-band omnidirectional antenna 702-22, first omnidirectional antenna 702-24, second omnidirectional antenna 702-26, directional antenna 702-28, thermal imager 702-32, processor 702-34, and/or memory 702-36.

Low-band omnidirectional antenna 702-22 may include one or more electrical components and/or one or more devices capable of being in communication with processor 702-34. For example, low-band omnidirectional antenna 702-22 may include an oriented dipole antenna, a discone antenna, a mast radiator, a horizontal loop antenna, and/or the like. In some non-limiting embodiments or aspects, low-band omnidirectional antenna 702-22 may be configured to transmit and/or receive signals at a frequency below the gigahertz (GHz) frequencies (e.g., frequencies below the 1 GHz frequency). In some non-limiting embodiments or aspects, low-band omnidirectional antenna 702-22 may be configured to transmit one or more messages at one or more power levels. For example, low-band omnidirectional antenna 702-22 may be configured to transmit one or more messages at one or more power levels while safety device 702 is in a transmit state and/or while safety device 702 is not in a transmit state.

First omnidirectional antenna 702-24 may include one or more electrical components and/or one or more devices capable of being in communication with processor 702-34. For example, first omnidirectional antenna 702-24 may include an oriented dipole antenna, a discone antenna, a mast radiator, a horizontal loop antenna, and/or the like. In some non-limiting embodiments or aspects, first omnidirectional antenna 702-24 may be associated with a first radiation field. In some non-limiting embodiments or aspects, first omnidirectional antenna 702-24 may be supported by one or more of safety device 702 such that the first radiation field associated with first omnidirectional antenna 702-24 does not correspond (e.g., completely, partially, and/or the like) to the second radiation field associated with second omnidirectional antenna 702-26. In some non-limiting embodiments or aspects, first omnidirectional antenna 702-24 may be configured to transmit one or more messages at one or more power levels. For example, first omnidirectional antenna 702-24 may be configured to transmit one or more messages at one or more power levels while safety device 702 is in a transmit state and/or while safety device 702 is not in a transmit state.

Second omnidirectional antenna 702-26 may include one or more electrical components and/or one or more devices capable of being in communication with processor 702-34. For example, second omnidirectional antenna 702-26 may include an oriented dipole antenna, a discone antenna, a mast radiator, a horizontal loop antenna, and/or the like. In some non-limiting embodiments or aspects, second omnidirectional antenna 702-26 may be associated with a second radiation field. In some non-limiting embodiments or aspects, second omnidirectional antenna 702-26 may be supported by one or more of safety device 702 such that the second radiation field associated with first omnidirectional antenna 702-24 does not correspond (e.g., completely, partially, and/or the like) to the first radiation field associated with first omnidirectional antenna 702-24. In some non-limiting embodiments or aspects, second omnidirectional antenna 702-26 may be configured to transmit one or more messages at one or more power levels. For example, second omnidirectional antenna 702-26 may be configured to transmit one or more messages at one or more power levels while safety device 702 is in a transmit state and/or while safety device 702 is not in a transmit state.

Directional antenna 702-28 may include one or more electrical components and/or one or more devices capable of being in communication with processor 702-34. For example, directional antenna 702-28 may include a patch antenna, a panel antenna, and/or the like. In some non-limiting embodiments or aspects, directional antenna 702-28 may be aligned with thermal imager 702-32. For example, a boresight of directional antenna 702-28 may be aligned (e.g., may run parallel to, may run in fixed relation to, and/or the like) with an optical axis of thermal imager 702-32. Directional antenna 702-28 may include a circuit board that extends along a second plane associated with (e.g., defined by) an axis X'-Y'. In some non-limiting embodiments or aspects, the first plane and the second plane may intersect at an angle of ±Θ° from the first plane to the second plane, wherein Θ is in a range of about 0 to 90. In some non-limiting embodiments or aspects, the boresight of directional antenna 702-28 may be orthogonal to the second plane.

Thermal imager 702-32, may include one or more electrical components and/or one or more devices capable of being in communication with processor 702-34. For example, thermal imager 702-32 may include a short wavelength infrared imager, a mid-wavelength infrared imager, a long wavelength infrared imager, and/or the like. In some non-limiting embodiments or aspects, thermal imager 702-32 may be supported by outer housing 702-2 and/or power source housing 702-30. Additionally, or alternatively, thermal imager 702-32 may be supported by directional antenna 702-28 (e.g., by a circuit board of directional antenna 702-28). In some non-limiting embodiments or aspects, thermal imager 702-32 may be aligned with directional antenna 702-28. For example, an optical axis of thermal imager 702-32 may be aligned (e.g., may run parallel to, may run in fixed relation to, and/or the like) with a boresight of directional antenna 702-28. In some non-limiting embodiments or aspects, the optical axis of thermal imager 702-32 may be orthogonal to the second plane. In some non-limiting embodiments or aspects, the optical axis of thermal imager 702-32 may be aligned with the boresight of directional antenna 702-28 such that a center portion of a field of view associated with thermal imager 702-32 intersects the boresight of the one or more directional antennae 702-28. See FIG. 7E.

Processor 702-34 may include one or more electrical components and/or one or more devices capable of being in communication with input components 702-4, display device 702-6, audio output device 702-8, PCB 702-10, GPS receiver 702-12, GPS antenna 702-14, second board 702-16, ranging microprocessor 702-18, ranging transceiver 702-20, low-band omnidirectional antenna 702-22, first omnidirectional antenna 702-24, second omnidirectional antenna 702-26, directional antenna 702-28, power source housing 702-30, thermal imager 702-32, and memory 702-36. For example, processor 702-34 may be the same as or similar to processor 204 as described herein.

Memory 702-36 may include one or more electrical components and/or one or more devices capable of being in communication with input component 702-4, display device 702-6, audio output device 702-8, PCB 702-10, GPS receiver 702-12, GPS antenna 702-14, low-band omnidirectional antenna 702-22, first omnidirectional antenna 702-24, second omnidirectional antenna 702-26, directional antenna 702-28, thermal imager 702-32, and/or processor 702-34. For example, memory 702-36 may be the same as or similar to memory 206 as described herein.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A safety device, comprising:
   a thermal imager configured to detect infrared light;
   one or more directional antennae, and
   one or more processors programmed or configured to:
   receive one or more messages via the one or more directional antennae,
   determine one or more radio frequency (RF) signal parameters associated with the one or more messages, and
   output data associated with an indication of an alignment with a device in a transmit state based on the one or more RF signal parameters associated with the one or more messages,
   wherein the thermal imager is aligned with the one or more directional antennae such that an optical axis of the thermal imager is aligned with a boresight of the one or more directional antennae.

2. The safety device of claim 1, further comprising:
   one or more omnidirectional antennae configured to transmit one or more messages at one or more power levels, the one or more messages including one or more of:
   data associated with a device identifier,
   data associated with a transmit period,
   data associated with a state of one or more devices in communication with the safety device, and
   data associated with one or more safety devices that are in a search state.

3. The safety device of claim 2, wherein the one or more omnidirectional antennae comprises:
   a first omnidirectional antenna associated with a first radiation field; and
   a second omnidirectional antenna associated with a second radiation field,
   wherein the first omnidirectional antenna and the second omnidirectional antenna are positioned about the safety device such that the first radiation field does not correspond to the second radiation field.

4. The safety device of claim 1, further comprising:
   a display device;
   wherein, when receiving the one or more messages via the one or more directional antennae, the one or more processors are programmed or configured to receive data associated with an indication of a heading toward a device in a transmit state, and
   wherein the one or more processors are further programmed or configured to:
   receive data associated with infrared light detected by the thermal imager, and
   output data associated with an image based on the indication of the heading toward the device in the transmit state and the infrared light detected by the thermal imager, the data associated with the image configured to cause the display device to display the image.

5. The safety device of claim 1, further comprising:
   a display device;
   a digital camera configured to receive one or more digital images;
   wherein, when receiving the one or more messages via the one or more directional antennae, the one or more processors are programmed or configured to receive data associated with an indication of a heading toward a device in a transmit state, and
   wherein the one or more processors are further programmed or configured to:
   receive, from the thermal imager, data associated with infrared light detected by the thermal imager,
   receive, from the digital camera, data associated with one or more digital images captured by the digital camera, and
   output data associated with an image based on the indication of the heading toward the device in the transmit state, the infrared light detected by the thermal imager, and the one or more digital images captured by the digital camera, the data associated with the image configured to cause the display device to display the image.

6. The safety device of claim 1, further comprising:
   a housing;
   a display device extending along a first plane; and
   a circuit board disposed in the housing, the circuit board including the thermal imager and the one or more directional antennae disposed thereon, the circuit board extending along a second plane that is associated with a common plane,
   wherein the first plane is parallel to or intersects the second plane at an angle of $\pm\Theta°$ from the first plane to the second plane, wherein $\Theta$ is in a range of about 0 to 90.

7. The safety device of claim 6, wherein the one or more directional antennae are included on the circuit board extending along the second plane, and wherein the boresight of the one or more directional antennae is substantially orthogonal to the second plane.

8. The safety device of claim 6, further comprising:
   a signal-absorbing material included in the housing, the signal-absorbing material configured to absorb signals directed toward the one or more directional antennae in a direction that the one or more directional antennae are not configured to receive the signals from.

9. A safety device, comprising:
   a thermal imager configured to detect infrared light;
   one or more directional antennae, and
   one or more processors programmed or configured to:
   receive one or more messages via the one or more directional antennae,
   determine data associated with one or more parameters at which the one or more messages were received, and
   output data associated with an indication of a heading toward a device in a transmit state based on values of the one or more parameters at which the one or more messages were received,
   wherein an optical axis of the thermal imager is aligned with a boresight of the one or more directional antennae.

10. The safety device of claim 9, further comprising:
    one or more omnidirectional antennae configured to transmit one or more messages at one or more power levels, the one or more messages including one or more of:
    data associated with a device identifier,
    data associated with a transmit period,
    data associated with a state of one or more devices in communication with the safety device, and
    data associated with one or more safety devices that are in a search state.

11. The safety device of claim 10, wherein the one or more omnidirectional antennae comprises:
a first omnidirectional antenna associated with a first radiation field; and
a second omnidirectional antenna associated with a second radiation field,
wherein the first omnidirectional antenna and the second omnidirectional antenna are positioned about the safety device such that the first radiation field does not correspond to the second radiation field.

12. The safety device of claim 10, wherein the one or more omnidirectional antennae comprises:
a first omnidirectional antenna associated with a first polarization; and
a second omnidirectional antenna associated with a second polarization,
wherein the first omnidirectional antenna is positioned in the safety device relative to the second omnidirectional antenna such that the first polarization is at least partially unaligned with the second polarization.

13. The safety device of claim 9, further comprising:
a display device;
wherein, when receiving the one or more messages via the one or more directional antennae, the one or more processors are programmed or configured to receive data associated with an indication of a heading toward a device in a transmit state, and
wherein the one or more processors are further programmed or configured to:
receive data associated with infrared light detected by the thermal imager, and
output data associated with an image based on the indication of the heading toward the device in the transmit state and the infrared light detected by the thermal imager, the data associated with the image configured to cause the display device to display the image.

14. The safety device of claim 9, further comprising:
a housing including a display device extending along a first plane; and
a circuit board disposed in the housing, the circuit board including the thermal imager and a digital camera disposed thereon, the circuit board extending along a second plane,
wherein the first plane is parallel to or intersects the second plane at an angle of $\pm\Theta°$ from the first plane to the second plane, wherein $\Theta$ is in a range of about 0 to 90.

15. The safety device of claim 14, wherein the one or more directional antennae are included on the circuit board extending along the second plane, and wherein the boresight of the one or more directional antennae is substantially orthogonal to the second plane.

16. A safety device, comprising:
a thermal imager configured to detect infrared light;
one or more directional antennae, and
one or more processors programmed or configured to:
receive one or more messages via the one or more directional antennae,
determine one or more power levels at which the one or more messages were received, and
output data associated with an indication of a heading toward a device in a transmit state based on the one or more power levels at which the one or more messages were received,
wherein an optical axis of the thermal imager is aligned with a boresight of the one or more directional antennae.

17. The safety device of claim 16, wherein the optical axis of the thermal imager is aligned with the boresight of the one or more directional antennae such that a center portion of a field of view associated with the thermal imager intersects the boresight of the one or more directional antennae.

18. The safety device of claim 16, further comprising:
a radio frequency (RF) ranging sensor, and
a display device;
wherein the one or more processors are further programmed or configured to:
receive, via the RF ranging sensor, data associated with a distance between a first location of the safety device and a second location of a device that is in a transmit state,
receive data associated with infrared light detected by the thermal imager, and
output data associated with an image based on the indication of the heading toward the device in the transmit state, the distance between the first location of the safety device and the second location of the device that is in the transmit state, and the infrared light detected by the thermal imager, the data associated with the image configured to cause the display device to display the image.

19. The safety device of claim 16, further comprising:
a housing;
a display device extending along a first plane; and
a circuit board disposed in the housing, the circuit board including the thermal imager and a digital camera disposed thereon, the circuit board extending along a second plane,
wherein the first plane is parallel to or intersects the second plane at an angle of $\pm\Theta°$ from the first plane to the second plane, wherein $\Theta$ is in a range of about 0 to 90.

20. The safety device of claim 19, wherein the one or more directional antennae are included on the circuit board, and wherein the boresight of the one or more directional antennae is orthogonal to the second plane.

* * * * *